US008626619B2

(12) United States Patent
Brady et al.

(10) Patent No.: US 8,626,619 B2
(45) **Date of Patent: *Jan. 7, 2014**

(54) INFORMATION PROCESSING SYSTEM AND METHOD FOR MANAGING AND DETERMINING TAX INFORMATION

(75) Inventors: Kevin P. Brady, Cranford, NJ (US); Shane T. Naughton, Hoboken, NJ (US)

(73) Assignee: Thomson Reuters (Tax & Accounting) Services Inc., Carrollton, TX (US)

( * ) Notice: Subject to any disclaimer, the term of this patent is extended or adjusted under 35 U.S.C. 154(b) by 352 days.

This patent is subject to a terminal disclaimer.

(21) Appl. No.: 13/194,384

(22) Filed: Jul. 29, 2011

(65) Prior Publication Data

US 2011/0288972 A1 Nov. 24, 2011

Related U.S. Application Data

(63) Continuation of application No. 12/592,388, filed on Nov. 24, 2009, now Pat. No. 7,991,660, which is a continuation of application No. 10/284,977, filed on Oct. 31, 2002, now Pat. No. 7,627,504.

(51) Int. Cl.
*G06F 17/22* (2006.01)

(52) U.S. Cl.
USPC .................. 705/31; 705/1.1; 705/30; 705/35; 709/219; 709/217

(58) Field of Classification Search
None
See application file for complete search history.

(56) References Cited

U.S. PATENT DOCUMENTS

| | | | | |
|---|---|---|---|---|
| H1830 | H * | 1/2000 | Petrimoulx et al. | 705/31 |
| 6,021,397 | A * | 2/2000 | Jones et al. | 705/36 R |
| 6,115,690 | A * | 9/2000 | Wong | 705/7.27 |
| 6,192,347 | B1 * | 2/2001 | Graff | 705/36 R |
| 6,334,146 | B1 * | 12/2001 | Parasnis et al. | 709/217 |
| 6,411,939 | B1 * | 6/2002 | Parsons | 705/35 |
| 6,513,019 | B2 * | 1/2003 | Lewis | 705/35 |
| 2002/0178039 | A1 * | 11/2002 | Kennedy | 705/7 |
| 2003/0018576 | A1 * | 1/2003 | Zuckerbrot et al. | 705/38 |
| 2003/0144930 | A1 * | 7/2003 | Kulkarni et al. | 705/31 |
| 2003/0195780 | A1 * | 10/2003 | Arora et al. | 705/7 |
| 2004/0002906 | A1 * | 1/2004 | Von Drehnen et al. | 705/31 |
| 2004/0019541 | A1 * | 1/2004 | William et al. | 705/31 |

* cited by examiner

*Primary Examiner* — Fateh Obaid
(74) *Attorney, Agent, or Firm* — Howard C. Miskin, Esq.; Gloria Tsui-Yip, Esq.

(57) ABSTRACT

A multi-user information processing system and method for managing a multi-jurisdictional entity's data for determining tax returns information and tax provision information, and for tax planning purposes. The system includes a database for storing data, a calculation engine for determining tax returns information and tax provision information based on data stored in the database, a user interface unit for creating dataset (s) and manipulating the dataset(s) for tax planning purposes, and a report engine for producing reports using information from the database.

25 Claims, 71 Drawing Sheets

Unit Provision Report

TEST CO, DEMO GROUP, 1000 ABC CORPORATION x

| | | |
|---|---|---|
| Pre-Tax Book Income | | $1,500,000 |
| - Deductible State Tax | | - $276,889 |
| MEALS & ENTERTAINMENT | $40,000 | |
| GOODWILL | $740,000 | |
| + Permanent Differences | | + $780,000 |
| Financial Taxable Income | | $2,003,111 |
| BAD DEBT RESERVES | $24,000 | |
| DEPRECIATION | $214,000 | |
| INVENTORY RESERVES | -$5,900 | |
| + Temporary Differences | | + $232,100 |
| Federal Taxable Income | | $2,235,211 |
| * Unit Tax Rate | | * 35.0000% |
| Federal Tax - Current | | $782,324 |
| R&D CREDIT | $45,000 | |
| + Tax Adjustments | | + $45,000 |
| ACCOUNTING CHANGE | $34,000 | |
| + After Tax Temp Differences | | + $34,000 |
| Total Current Federal Provision | | $861,324 |
| Begin Deferred Tax Per B/S | $974,000 | |
| Ending Deferred Tax Per B/S | -$1,089,235 | |
| Offset to Equity | $0 | |
| + Deferred Tax Provision | | - -$115,235 |
| + APB25 Adjustment | | + $0 |
| Total Federal Tax Provision | | $746,089 |
| + Total State Tax Provision | | + $214,311 |
| **Total Tax Provision** | | $960,400 |
| **Effective Tax Rate** | | 64.0267% |

FIG. 7A

Unit Effective Tax Rate Report

TEST CO, DEMO GROUP, 1000 ABC CORPORATION x

| | Income Item | US Rate | Tax Effect | Effect Rate |
|---|---|---|---|---|
| Pre-Tax Book Income | $1,500,000 | 34.0000% | $510,000 | 34.0000% |
| Current State Tax Provision | $276,889 | 66.0000% | $132,747 | 12.1831% |
| Deferred State Tax Provision | -$62,578 | 100.0000% | -$62,578 | -4.1719% |
| Total State Tax Provision | $214,311 | | $120,169 | 8.0113% |
| MEALS & ENTERTAINMENT | $40,000 | 34.0000% | $13,600 | 0.9067% |
| GOODWILL | $740,000 | 34.0000% | $251,600 | 16.7733% |
| Total Permanent Differences | $780,000 | | $265,200 | 17.6800% |
| Total Adjs to Deferred Tax Balances | $0 | | $0 | 0.0000% |
| Total Adjs to Deferred Tax BaLances (AT) | | | $0 | 0.0000% |
| R&D CREDIT | | | $45,000 | 3.0000% |
| Total Tax Adjustments | | | $45,000 | 3.0000% |
| APB25 Adjustments | | | $0 | 0.0000% |
| Effect Rates Different than Statutory | | | $20,031 | 1.3354% |
| Effect Rate Changes in Deferred | | | $0 | 0.0000% |
| Effect Rate Diffs bw Current + Deferred | | | $0 | 0.0000% |
| **Tax Provision** | | | $960,400 | 64.0267% |

FIG. 7B

Unit Deferred Balance Report (Fed Only)

TEST CO, DEMO GROUP, 1000 ABC CORPORATION x

| Temporary Difference Name | Beginning Balance | Ending Balance |
|---|---|---|
| BAD DEBT RESERVES | $105,000 | $113,400 |
| DEPRECIATION | $805,000 | $879,900 |
| INVENTORY RESERVES | $14,000 | $11,935 |
| ACCOUNTING CHANGE | $50,000 | $81,000 |
| **total:** | $974,000 | $1,089,235 |

FIG. 7C

Unit Deferred Balance Report (Fed+State)

TEST CO, DEMO GROUP, 1000 ABC CORPORATION x

| Temporary Difference Name | Beginning Balance | Ending Balance |
|---|---|---|
| BAD DEBT RESERVES | $122,550 | $132,354 |
| DEPRECIATION | $939,550 | $1,026,969 |
| INVENTORY RESERVES | $16,340 | $13,930 |
| ACCOUNTING CHANGE | $50,000 | $84,000 |
| WARRANTY RESERVE | $60,000 | $109,000 |
| **total:** | $1,188,440 | $1,366,253 |

FIG. 7D

Unit Deferred Balance Report (State Only)

TEST CO, DEMO GROUP, 1000 ABC CORPORATION x

| Temporary Difference Name | Beginning Balance | Ending Balance |
|---|---|---|
| BAD DEBT RESERVES | $17,550 | $18,954 |
| DEPRECIATION | $134,550 | $147,069 |
| INVENTORY RESERVES | $2,340 | $1,995 |
| WARRANTY RESERVE | $60,000 | $109,000 |
| **total:** | $214,440 | $277,018 |

FIG. 7E

Unit Temporary Diffs Pre-Tax

TEST CO, DEMO GROUP, 1000 ABC CORPORATION x

| Temporary Difference Name | Beginning Balance | Ending Balance |
|---|---|---|
| BAD DEBT RESERVES | $300,000 | $324,000 |
| DEPRECIATION | $2,300,000 | $2,514,000 |
| INVENTORY RESERVES | $40,000 | $34,100 |
| **total:** | $2,640,000 | $2,872,100 |

FIG. 7F

Unit Temporary Difference Summary Report

TEST CO, DEMO GROUP, 1000 ABC CORPORATION x

| Unit Name | Current Assets | Current Liabilities | Non-Current Assets | Non-Current Liabilities |
|---|---|---|---|---|
| ABC CORPORATION x | $1,089,235 | $0 | $0 | $0 |
| total: | $1,089,235 | $0 | $0 | $0 |
| | current: | $1,089,235 | non-current: | $0 |

FIG. 7G

Unit Liability Report

TEST CO, DEMO GROUP, 1000 ABC CORPORATION x

| Unit Name | Beginning Balance | Payments | Refunds | Adjustments | CTP | Curr Adj | Ending Balance |
|---|---|---|---|---|---|---|---|
| ABC CORPORATION x | $70,000 | -$30,000 | $90,000 | $0 | $1,138,213 | $0 | $1,268,213 |
| total: | $70,000 | -$30,000 | $90,000 | $0 | $1,138,213 | $0 | $1,268,213 |

FIG. 7H

Unit Foreign/Domestic Summary Report

TEST CO, DEMO GROUP, 1000 ABC CORPORATION x

| | | |
|---|---|---|
| Federal: | | |
| Current | $861,324 | |
| Deferred | -$115,235 | |
| Equity Adjustment | $0 | |
| Total Federal: | | $746,089 |
| State: | | |
| Current | $276,889 | |
| Deferred | -$62,578 | |
| Equity Adjustment | $0 | |
| Total State: | | $214,311 |
| Foreign: | | |
| Current | $0 | |
| Deferred | $0 | |
| Equity Adjustment | $0 | |
| Total Foreign: | | $0 |
| **Total Tax Provision:** | | $960,400 |

| | Pre-Tax Book Income | Total Tax Provision |
|---|---|---|
| Domestic: | $1,500,000 | $960,400 |
| Foreign: | $0 | $0 |
| **Total:** | $1,500,000 | $960,400 |

FIG. 7I

Unit Input Report (Local Currency)

TEST CO, DEMO GROUP, 1000 ABC CORPORATION x

| | | | | | |
|---|---|---|---|---|---|
| Pre-Tax Book Income | 1,500,000 | | | | |
| Unit Tax Rate | 35.0000% | | | | |
| Beginning Deferred Tax Rate | 35.0000% | | | | |
| Ending Deferred Tax Rate | 35.0000% | | | | |
| Permanent Differences: | | | | | |
| MEALS & ENTERTAINMENT | 40,000 | | | | |
| GOODWILL | 740,000 | | | | |
| Total Permanent Differences | 780,000 | | | | |
| Temporary Differences: | | | | | |
| BAD DEBT RESERVES | 300,000 | 24,000 | 0 | 35% | 35% |
| DEPRECIATION | 2,300,000 | 214,000 | 0 | 35% | 35% |
| INVENTORY RESERVES | 40,000 | -5,900 | 0 | 35% | 35% |
| Total Temporary Differences | 2,640,000 | 232,100 | 0 | | |
| After Tax Temporary Differences: | | | | | |
| ACCOUNTING CHANGE | 50,000 | 34,000 | 0 | | |
| Total After Tax Temporary Differences | 50,000 | 34,000 | 0 | | |
| Tax Adjustments: | | | | | |
| R&D CREDIT | 45,000 | | | | |
| Total Tax Adjustments | 45,000 | | | | |

FIG. 7J

Unit State Provision Summary Report

TEST CO, DEMO GROUP, 1000 ABC CORPORATION x

| | | |
|---|---|---|
| Adjusted Federal Taxable Income | | $2,512,100 |
| New Jersey | $276,889 | |
| Current State Tax Provision | | $276,889 |
| BAD DEBT RESERVES | -$1,404 | |
| DEPRECIATION | -$12,519 | |
| INVENTORY RESERVES | $345 | |
| WARRANTY RESERVE | -$49,000 | |
| State Deferred Provision | | -$62,578 |
| Equity Adjustment | | $0 |
| **Total State Tax Provision** | | $214,311 |

FIG. 7K

Consolidated Provision Report view summary

TEST CO, DEMO GROUP

| | | |
|---|---|---|
| Pre-Tax Book Income | | $11,533,333 |
| - Deductible State Tax | | - $276,889 |
| MEALS & ENTERTAINMENT | $40,000 | |
| GOODWILL | $740,000 | |
| NON-DEDUCTIBLE EXPENSES | $56,000 | |
| + Permanent Differences | | + $836,000 |
| Financial Taxable Income | | $12,092,444 |
| ADJUSTMENT TO DEFERRED BALANCES | $20,000 | |
| BAD DEBT RESERVES | $24,000 | |
| DEPRECIATION | $252,000 | |
| DEFERRED COMPENSATION | $120,000 | |
| INVENTORY RESERVES | $25,967 | |
| + Temporary Differences | | + $441,967 |
| Federal Taxable Income | | $12,534,411 |
| Federal Tax - Current | | $4,235,364 |
| R&D CREDIT | $45,000 | |
| + Tax Adjustments | | + $45,000 |
| ACCOUNTING CHANGE | $34,000 | |
| + After Tax Temp Differences | | + $34,000 |
| Total Current Federal Provision | | $4,314,364 |
| Begin Deferred Tax Per B/S | $1,328,800 | |
| Ending Deferred Tax Per B/S | -$1,658,935 | |
| Offset to Equity | $7,733 | |
| + Deferred Tax Provision | | + -$322,402 |
| + APB25 Adjustment | | + $0 |
| Total Federal Tax Provision | | $3,991,962 |
| + Total State Tax Provision | | + $214,311 |
| **Total Tax Provision** | | $4,206,273 |
| **Effective Tax Rate** | | 36.4706% |

FIG. 8A

Consolidated Effective Tax Rate Report

TEST CO, DEMO GROUP

| | Income Item | US Rate | Tax Effect | Effect Rate |
|---|---|---|---|---|
| Pre-Tax Book Income | $11,533,333 | 34.0000% | $3,921,333 | 34.0000% |
| Current State Tax Provision | $276,889 | 66.0000% | $182,747 | 1.5845% |
| Deferred State Tax Provision | -$62,578 | 100.0000% | -$62,578 | -0.5426% |
| Total State Tax Provision | $214,311 | | $120,169 | 1.0419% |
| MEALS & ENTERTAINMENT | $40,000 | 34.0000% | $13,600 | 0.1179% |
| GOODWILL | $740,000 | 34.0000% | $251,600 | 2.1815% |
| NON-DEDUCTIBLE EXPENSES | $56,000 | 34.0000% | $19,040 | 0.1651% |
| Total Permanent Differences | $836,000 | | $284,240 | 2.4645% |
| ADJUSTMENT TO DEFERRED BALANCES | -$130,000 | 34.0000% | -$44,200 | -0.3832% |
| DEFERRED COMPENSATION | -$130,000 | 34.0000% | -$44,200 | -0.3832% |
| Total Adjs to Deferred Tax Balances | -$260,000 | | -$88,400 | -0.7665% |
| Total Adjs to Deferred Tax Balances (AT) | | | $0 | 0.0000% |
| R&D CREDIT | | | $45,000 | 0.3902% |
| Total Tax Adjustments | | | $45,000 | 0.3902% |
| APB25 Adjustments | | | $0 | 0.0000% |
| Effect Rates Different than Statutory | | | -$29,076 | -0.2521% |
| Effect Rate Changes in Deferred | | | -$45,000 | -0.3902% |
| Effect Rate Diffs bw Current + Deferred | | | -$2,180 | -0.0189% |
| **Tax Provision** | | | $4,206,087 | 36.4690% |

FIG. 8B

Consolidated Deferred Balance Report (Fed Only)

TEST CO, DEMO GROUP

| Temporary Difference Name | Beginning Balance | Ending Balance |
|---|---|---|
| ADJUSTMENT TO DEFERRED BALANCES | $3,400 | $54,400 |
| BAD DEBT RESERVES | $105,000 | $113,400 |
| DEFERRED COMPENSATION | $37,400 | $122,400 |
| DEPRECIATION | $1,015,000 | $1,135,100 |
| INVENTORY RESERVES | $118,000 | $149,635 |
| ACCOUNTING CHANGE | $50,000 | $84,000 |
| total: | $1,328,800 | $1,658,935 |

FIG. 8C

Consolidated Deferred Balance Report (Fed+State)

TEST CO, DEMO GROUP

| Temporary Difference Name | Beginning Balance | Ending Balance |
|---|---|---|
| ADJUSTMENT TO DEFERRED BALANCES | $3,400 | $54,400 |
| BAD DEBT RESERVES | $122,550 | $132,354 |
| DEFERRED COMPENSATION | $37,400 | $122,400 |
| DEPRECIATION | $1,149,550 | $1,282,169 |
| INVENTORY RESERVES | $120,340 | $151,630 |
| ACCOUNTING CHANGE | $50,000 | $84,000 |
| WARRANTY RESERVE | $60,000 | $109,000 |
| **total:** | $1,543,240 | $1,935,953 |

FIG. 8D

Consolidated Deferred Balance Report (State Only)

TEST CO, DEMO GROUP

| Temporary Difference Name | Beginning Balance | Ending Balance |
|---|---|---|
| ADJUSTMENT TO DEFERRED BALANCES | $0 | $0 |
| BAD DEBT RESERVES | $17,550 | $18,954 |
| DEFERRED COMPENSATION | $0 | $0 |
| DEPRECIATION | $134,550 | $147,069 |
| INVENTORY RESERVES | $2,340 | $1,995 |
| WARRANTY RESERVE | $60,000 | $109,000 |
| **total:** | $214,440 | $277,018 |

FIG. 8E

Consolidated Temporary Diffs Pre-Tax

TEST CO, DEMO GROUP

| Temporary Difference Name | Beginning Balance | Ending Balance |
|---|---|---|
| ADJUSTMENT TO DEFERRED BALANCES | $10,000 | $160,000 |
| BAD DEBT RESERVES | $300,000 | $324,000 |
| DEFERRED COMPENSATION | $110,000 | $360,000 |
| DEPRECIATION | $2,900,000 | $3,152,000 |
| INVENTORY RESERVES | $530,000 | $556,900 |
| **total:** | $3,850,000 | $4,552,900 |

FIG. 8F

Consolidated Unit Summary Report

TEST CO, DEMO GROUP

| Unit Code | Unit Name | Pre-Tax Book Income | Federal Taxable Income | Total Tax Provision | Effective Tax Rate |
|---|---|---|---|---|---|
| 1000 | ABC CORPORATION x | $1,500,000 | $2,235,211 | $960,400 | 64.0267% |
| 2000 | DEF CORPORATION x | -$300,000 | -$176,000 | -$117,300 | 39.1000% |
| 4000 | XYZ CORPORATION x | $333,333 | $335,200 | $51,573 | 15.4720% |
| teset | test | $10,000,000 | $10,140,000 | $3,311,600 | 33.1160% |
| **total**: | | $11,533,333 | $12,534,411 | $4,206,273 | 36.4706% |

FIG. 8G

Consolidated Liability Report

TEST CO, DEMO GROUP

| Unit_Name | Beginning Balance | Payments | Refunds | Adjustments | CTP | Curr_Adj | Ending Balance |
|---|---|---|---|---|---|---|---|
| ABC CORPORATION x | $70,000 | -$30,000 | $90,000 | $0 | $1,138,213 | $0 | $1,268,213 |
| DEF CORPORATION x | $0 | $0 | $0 | $0 | -$61,600 | $0 | -$61,600 |
| test | $0 | $0 | $0 | $0 | $3,447,600 | $0 | $3,447,600 |
| XYZ CORPORATION x | $0 | $0 | $0 | $0 | $67,040 | $33,520 | $100,560 |
| **total**: | $70,000 | -$30,000 | $90,000 | $0 | $4,591,253 | $33,520 | $4,754,773 |

FIG. 8H

Consolidated Foreign/Domestic Summary Report

TEST CO, DEMO GROUP

| | | |
|---|---|---|
| Federal: | | |
| Current | $4,247,324 | |
| Deferred | -$306,935 | |
| Equity Adjustment | $0 | |
| Total Federal: | | $3,940,389 |
| State: | | |
| Current | $276,889 | |
| Deferred | -$62,578 | |
| Equity Adjustment | $0 | |
| Total State: | | $214,311 |
| Foreign: | | |
| Current | $67,040 | |
| Deferred | -$15,467 | |
| Equity Adjustment | $0 | |
| Total Foreign: | | $51,573 |
| **Total Tax Provision:** | | $4,206,273 |

| | Pre-Tax Book Income | Total Tax Provision |
|---|---|---|
| Domestic: | $11,200,000 | $4,154,700 |
| Foreign: | $333,333 | $51,573 |
| **Total:** | $11,533,333 | $4,206,273 |

FIG. 8I

Consolidated State Provision Summary Report

TEST CO, DEMO GROUP

| | | |
|---|---|---|
| Adjusted Federal Taxable Income | | $12,476,100 |
| New Jersey | $276,889 | |
| Current State Tax Provision | | $276,889 |
| ADJUSTMENT TO DEFERRED BALANCES | $0 | |
| BAD DEBT RESERVES | -$1,404 | |
| DEFERRED COMPENSATION | $0 | |
| DEPRECIATION | -$12,519 | |
| INVENTORY RESERVES | $345 | |
| WARRANTY RESERVE | -$49,000 | |
| State Deferred Provision | | -$62,578 |
| Equity Adjustment | | $0 |
| **Total State Tax Provision** | | $214,311 |

FIG. 8J

SubConsolidated Provision Report

TEST CO, DEMO GROUP, BUSINESS PLAN A

| | | |
|---|---|---|
| Pre-Tax Book Income | | $1,533,333 |
| - Deductible State Tax | | - $276,889 |
| MEALS & ENTERTAINMENT | $40,000 | |
| GOODWILL | $740,000 | |
| NON-DEDUCTIBLE EXPENSES | $56,000 | |
| + Permanent Differences | | + $836,000 |
| Financial Taxable Income | | $2,092,444 |
| BAD DEBT RESERVES | $24,000 | |
| DEPRECIATION | $252,000 | |
| INVENTORY RESERVES | $25,967 | |
| + Temporary Differences | | + $301,967 |
| Federal Taxable Income | | $2,394,411 |
| Federal Tax - Current | | $787,764 |
| R&D CREDIT | $45,000 | |
| + Tax Adjustments | | + $45,000 |
| ACCOUNTING CHANGE | $34,000 | |
| + After Tax Temp Differences | | + $34,000 |
| Total Current Federal Provision | | $866,764 |
| Begin Deferred Tax Per B/S | $1,288,000 | |
| Ending Deferred Tax Per B/S | -$1,482,135 | |
| Offset to Equity | $7,733 | |
| + Deferred Tax Provision | | + -$186,402 |
| + APB25 Adjustment | | + $0 |
| Total Federal Tax Provision | | $680,362 |
| + Total State Tax Provision | | + $214,311 |
| **Total Tax Provision** | | $894,673 |
| **Effective Tax Rate** | | 58.3483% |

FIG. 9A

SubConsolidated Effective Tax Rate Report

TEST CO, DEMO GROUP, BUSINESS PLAN A

| | Income Item | US Rate | Tax Effect | Effect Rate |
|---|---|---|---|---|
| Pre-Tax Book Income | $1,533,333 | 34.0000% | $521,333 | 34.0000% |
| Current State Tax Provision | $276,889 | 66.0000% | $182,747 | 11.9183% |
| Deferred State Tax Provision | -$62,578 | 100.0000% | -$62,578 | -4.0812% |
| Total State Tax Provision | $214,311 | | $120,169 | 7.8371% |
| MEALS & ENTERTAINMENT | $40,000 | 34.0000% | $13,600 | 0.8870% |
| GOODWILL | $740,000 | 34.0000% | $251,600 | 16.4087% |
| NON-DEDUCTIBLE EXPENSES | $56,000 | 34.0000% | $19,040 | 1.2417% |
| Total Permanent Differences | $836,000 | | $284,240 | 18.5374% |
| Total Adjs to Deferred Tax Balances | $0 | | $0 | 0.0000% |
| Total Adjs to Deferred Tax Balances (AT) | | | $0 | 0.0000% |
| R&D CREDIT | | | $45,000 | 2.9348% |
| Total Tax Adjustments | | | $45,000 | 2.9348% |
| APB25 Adjustments | | | $0 | 0.0000% |
| Effect Rates Different than Statutory | | | -$29,076 | -1.8962% |
| Effect Rate Changes in Deferred | | | -$45,000 | -2.9348% |
| Effect Rate Diffs bw Current + Deferred | | | -$2,180 | -0.1422% |
| **Tax Provision** | | | $894,487 | 58.3361% |

FIG. 9B

SubConsolidated Deferred Balance Report (Fed Only)

TEST CO, DEMO GROUP, BUSINESS PLAN A

| Temporary Difference Name | Beginning Balance | Ending Balance |
|---|---|---|
| BAD DEBT RESERVES | $105,000 | $113,400 |
| DEPRECIATION | $1,015,000 | $1,135,100 |
| INVENTORY RESERVES | $118,000 | $149,635 |
| ACCOUNTING CHANGE | $50,000 | $84,000 |
| total: | $1,288,000 | $1,482,135 |

FIG. 9C

SubConsolidated Deferred Balance Report (Fed+State)

TEST CO, DEMO GROUP, BUSINESS PLAN A

| Temporary Difference Name | Beginning Balance | Ending Balance |
|---|---|---|
| BAD DEBT RESERVES | $122,550 | $132,354 |
| DEPRECIATION | $1,149,550 | $1,282,169 |
| INVENTORY RESERVES | $120,340 | $151,630 |
| ACCOUNTING CHANGE | $50,000 | $84,000 |
| WARRANTY RESERVE | $60,000 | $109,000 |
| total: | $1,502,440 | $1,759,153 |

FIG. 9D

SubConsolidated Deferred Balance Report (State Only)

TEST CO, DEMO GROUP, BUSINESS PLAN A

| Temporary Difference Name | Beginning Balance | Ending Balance |
|---|---|---|
| BAD DEBT RESERVES | $17,550 | $18,954 |
| DEPRECIATION | $134,550 | $147,069 |
| INVENTORY RESERVES | $2,340 | $1,995 |
| WARRANTY RESERVE | $60,000 | $109,000 |
| **total**: | $214,440 | $277,018 |

FIG. 9E

*SubConsolidated Temporary Diffs Pre-Tax*

TEST CO, DEMO GROUP, BUSINESS PLAN A

| Temporary Difference Name | Beginning Balance | Ending Balance |
|---|---|---|
| BAD DEBT RESERVES | $300,000 | $324,000 |
| DEPRECIATION | $2,900,000 | $3,152,000 |
| INVENTORY RESERVES | $530,000 | $556,900 |
| **total:** | $3,730,000 | $4,032,900 |

FIG. 9F

SubConsolidated Temporary Difference Summary Report

TEST CO, DEMO GROUP, BUSINESS PLAN A

| Unit Name | Current Assets | Current Liabilities | Non-Current Assets | Non-Current Liabilities |
|---|---|---|---|---|
| ABC CORPORATION x | $1,089,235 | $0 | $0 | $0 |
| DEF CORPORATION x | $0 | $0 | $279,700 | $0 |
| XYZ CORPORATION x | $0 | $0 | $113,200 | $0 |
| **total:** | $1,089,235 | $0 | $392,900 | $0 |
| | **current:** | $1,089,235 | **non-current:** | $392,900 |

FIG. 9G

SubConsolidated Unit Summary Report

TEST CO, DEMO GROUP, BUSINESS PLAN A

| Unit Code | Unit Name | Pre-Tax Book Income | Federal Taxable Income | Total Tax Provision | Effective Tax Rate |
|---|---|---|---|---|---|
| 1000 | ABC CORPORATION x | $1,500,000 | $2,235,211 | $960,400 | 64.0267% |
| 2000 | DEF CORPORATION x | -$300,000 | -$176,000 | -$117,300 | 39.1000% |
| 4000 | XYZ CORPORATION x | $333,333 | $335,200 | $51,573 | 15.4720% |
| total: | | $1,533,333 | $2,394,411 | $894,673 | 58.3483% |

FIG. 9H

SubConsolidated Liability Report

TEST CO, DEMO GROUP, BUSINESS PLAN A

| Unit Name | Beginning Balance | Payments | Refunds | Adjustments | CTP | Curr Adj | Ending Balance |
|---|---|---|---|---|---|---|---|
| ABC CORPORATION x | $70,000 | -$30,000 | $90,000 | $0 | $1,138,213 | $0 | $1,268,213 |
| DEF CORPORATION x | $0 | $0 | $0 | $0 | -$61,600 | $0 | -$61,600 |
| XYZ CORPORATION x | $0 | $0 | $0 | $0 | $67,040 | $33,520 | $100,560 |
| **total:** | $70,000 | -$30,000 | $90,000 | $0 | $1,143,653 | $33,520 | $1,307,173 |

FIG. 9I

SubConsolidated Foreign/Domestic Summary Report

TEST CO, DEMO GROUP, BUSINESS PLAN A

| | | |
|---|---|---|
| Federal: | | |
| Current | $799,724 | |
| Deferred | -$170,935 | |
| Equity Adjustment | $0 | |
| Total Federal: | | $628,789 |
| State: | | |
| Current | $276,889 | |
| Deferred | -$62,578 | |
| Equity Adjustment | $0 | |
| Total State: | | $214,311 |
| Foreign: | | |
| Current | $67,040 | |
| Deferred | -$15,467 | |
| Equity Adjustment | $0 | |
| Total Foreign: | | $51,573 |
| **Total Tax Provision:** | | $894,673 |

| | Pre-Tax Book Income | Total Tax Provision |
|---|---|---|
| Domestic: | $1,200,000 | $843,100 |
| Foreign: | $333,333 | $51,573 |
| **Total:** | $1,533,333 | $894,673 |

FIG. 9J

SubConsolidated State Provision Summary Report

TEST CO, DEMO GROUP, BUSINESS PLAN A

| | | |
|---|---|---|
| Adjusted Federal Taxable Income | | $2,336,100 |
| New Jersey | $276,889 | |
| Current State Tax Provision | | $276,889 |
| BAD DEBT RESERVES | -$1,404 | |
| DEPRECIATION | -$12,519 | |
| INVENTORY RESERVES | $345 | |
| WARRANTY RESERVE | -$49,000 | |
| State Deferred Provision | | -$62,578 |
| Equity Adjustment | | $0 |
| **Total State Tax Provision** | | $214,311 |

FIG. 9K

State Provision Report

TEST CO, DEMO GROUP, (1000) ABC CORPORATION x - New Jersey

| | | |
|---|---|---|
| Federal Taxable Income (Before State Taxes) | | $2,512,100 |
| POLLUTION CONTROL | $20,000 | |
| + Modifications | | + $20,000 |
| BAD DEBT RESERVES | $0 | |
| DEPRECIATION | $0 | |
| INVENTORY RESERVES | $0 | |
| + Temporary Difference Deltas | | - $0 |
| Allocable Income | | $2,532,100 |
| * Apportionment % | | * 100.0000% |
| Apportionable Income | | $2,532,100 |
| * State Tax Rate | | * 9.0000% |
| Tax Before Credits | | $227,889 |
| + State Tax Adjustments | | + $0 |
| WARRANTY RESERVE | $49,000 | |
| + After Tax State Temp Diffs | | + $49,000 |
| Current State Tax Provision | | $276,889 |
| Beginning Deferred Tax Per B/S | $214,440 | |
| Ending Deferred Tax Per B/S | -$277,018 | |
| + Deferred Tax Provision | | + -$62,578 |
| + APB25 Adjustment | | + $0 |
| Total State Tax Provision | | $214,311 |

FIG. 10A

State Deferred Balance Report

TEST CO, DEMO GROUP, (1000) ABC CORPORATION x - New Jersey

| Temporary Difference Name | Beginning Balance | Ending Balance |
|---|---|---|
| BAD DEBT RESERVES | $17,550 | $18,954 |
| DEPRECIATION | $134,550 | $147,069 |
| INVENTORY RESERVES | $2,340 | $1,995 |
| WARRANTY RESERVE | $60,000 | $109,000 |
| **total:** | $214,440 | $277,018 |

FIG. 10B

| Consolidated Return To Provision Rec<br>TSI Inc | TAX: FY 2001 Return<br>TOTAL | PROV: FY 2001 Provision<br>TOTAL | DIFF:<br>TOTAL |
|---|---|---|---|
| Pre-Tax Book Income | $25,500,000.00 | $27,133,333.33 | ($1,633,333.33) |
| Deductible State Tax | $0.00 | $1,495,920.00 | ($1,495,920.00) |
| Permanent Differences: | | | |
| Meals & Entertainment | $119,000.00 | $85,000.00 | $34,000.00 |
| Goodwill | $280,000.00 | $260,000.00 | $20,000.00 |
| Officer's Life Insurance | $60,000.00 | $60,000.00 | $0.00 |
| Total Permanent Differences | $459,000.00 | $2,601,666.66 | ($2,142,666.66) |
| Financial Taxable Income | $25,959,000.00 | $28,239,079.99 | ($2,280,079.99) |
| Temporary Differences: | | | |
| Bad Debt Reserve | $2,500,000.00 | $2,000,000.00 | $500,000.00 |
| Depreciation | $2,650,000.00 | $0.00 | $2,650,000.00 |
| Leasing Revenue | $200,000.00 | $0.00 | $200,000.00 |
| Litigation Reserve | $150,000.00 | $0.00 | $150,000.00 |
| Amortization of Fees | $100,000.00 | $0.00 | $100,000.00 |
| Total Temporary Differences | $5,600,000.00 | $1,236,666.66 | $4,363,333.34 |
| Federal Taxable Income | $31,559,000.00 | $29,475,746.66 | $2,083,253.34 |
| Unit Tax Rate | 35.00% | 25.00% | |
| Federal Tax - Current | $11,045,650.00 | $10,539,094.66 | $506,555.34 |
| Tax Adjustments: | | | |
| Tax Reserves | $850,000.00 | ($993,333.33) | $1,843,333.33 |
| Total Tax Adjustments | $850,000.00 | ($2,593,333.34) | $3,443,333.34 |
| After Tax Temp Differences: | | | |
| APB 23 | $130,000.00 | $130,000.00 | $0.00 |
| AMT Credit | $30,000.00 | $0.00 | $30,000.00 |
| Total After Tax Temp Differences | $160,000.00 | ($140,000.00) | $300,000.00 |
| Total Current Federal Provision | $12,055,650.00 | $7,805,761.33 | $4,249,888.67 |
| Deferred Tax Provision: | | | |
| Begin Deferred Tax Per B/S | $1,595,000.00 | $2,152,500.00 | ($557,500.00) |
| Ending Deferred Tax Per B/S | $4,305,000.00 | $2,152,000.00 | $2,153,000.00 |
| CTA | $0.00 | $9,333.33 | ($9,333.33) |
| OCI | $0.00 | ($70,000.00) | $70,000.00 |
| Total Deferred Tax Provision | ($2,710,000.00) | ($60,166.66) | ($2,649,833.34) |
| APB25 Adjustment | $0.00 | ($7,500.00) | $7,500.00 |
| Total Federal Tax Provision | $9,345,650.00 | $7,738,094.66 | $1,607,555.34 |
| Total State Tax Provision | $0.00 | $1,388,640.00 | ($1,388,640.00) |
| Total Tax Provision | $9,345,650.00 | $9,126,734.66 | $218,915.34 |
| Effective Tax Rate | 36.65% | 33.64% | |

FIG. 12B

| Consolidated Return To Provision Rec TSI Inc | TAX: D1000 ABC Corporation | PROV: D1000 ABC Corporation | DIFF: D1000 ABC Corporation | TAX: D2000 DEF Corporation | PROV: D2000 DEF Corporation | DIFF: D2000 DEF Corporation |
|---|---|---|---|---|---|---|
| Pre-Tax Book Income | $11,000,000.00 | $10,000,000.00 | $1,000,000.00 | $3,000,000.00 | $3,000,000.00 | $0.00 |
| Deductible State Tax | $0.00 | $1,020,120.00 | ($1,020,120.00) | $0.00 | $207,000.00 | ($207,000.00) |
| Permanent Differences: | | | | | | |
| Meals & Entertainment | $80,000.00 | $50,000.00 | $10,000.00 | $24,000.00 | $0.00 | $24,000.00 |
| Goodwill | $0.00 | $0.00 | $0.00 | $250,000.00 | $250,000.00 | $0.00 |
| Officer's Life Insurance | $0.00 | $0.00 | $0.00 | $0.00 | $0.00 | $0.00 |
| Total Permanent Differences | $80,000.00 | $2,150,000.00 | ($2,090,000.00) | $274,000.00 | $250,000.00 | $24,000.00 |
| Financial Taxable Income | $11,080,000.00 | $11,129,880.00 | ($49,880.00) | $3,274,000.00 | $3,043,000.00 | $231,000.00 |
| Temporary Differences: | | | | | | |
| Bad Debt Reserve | $2,500,000.00 | $2,000,000.00 | $500,000.00 | $0.00 | $0.00 | $0.00 |
| Depreciation | $2,500,000.00 | $0.00 | $2,500,000.00 | $150,000.00 | $50,000.00 | $100,000.00 |
| Leasing Revenue | $0.00 | ($1,000,000.00) | $1,000,000.00 | $0.00 | $0.00 | $0.00 |
| Litigation Reserve | $0.00 | $0.00 | $0.00 | $150,000.00 | $150,000.00 | $0.00 |
| Amortization of Fees | $0.00 | ($20,000.00) | $20,000.00 | $0.00 | $0.00 | $0.00 |
| Total Temporary Differences | $5,000,000.00 | $980,000.00 | $4,020,000.00 | $300,000.00 | $200,000.00 | $100,000.00 |
| Federal Taxable Income | $16,080,000.00 | $12,109,880.00 | $3,970,120.00 | $3,574,000.00 | $3,243,000.00 | $331,000.00 |
| Unit Tax Rate | 35.00% | 35.00% | | 35.00% | 35.00% | |
| Federal Tax - Current | $5,621,000.00 | $4,238,458.00 | $1,382,542.00 | $1,250,900.00 | $1,136,050.00 | $114,850.00 |
| Tax Adjustments: | | | | | | |
| Tax Reserves | $850,000.00 | $0.00 | $850,000.00 | $0.00 | ($1,000,000.00) | $1,000,000.00 |
| Total Tax Adjustments | $850,000.00 | ($1,500,000.00) | $2,350,000.00 | $0.00 | ($1,000,000.00) | $1,000,000.00 |
| After Tax Temp Differences: | | | | | | |
| APB 23 | $130,000.00 | $130,000.00 | $0.00 | $0.00 | $0.00 | $0.00 |
| AMT Credit | $30,000.00 | $30,000.00 | $0.00 | $0.00 | $0.00 | $0.00 |
| Total After Tax Temp Differences | $160,000.00 | $160,000.00 | $0.00 | $0.00 | ($100,000.00) | $100,000.00 |
| Total Current Federal Provision | $6,631,000.00 | $2,898,458.00 | $3,732,542.00 | $1,250,900.00 | $36,050.00 | $1,214,850.00 |
| Deferred Tax Provision: | | | | | | |
| Begin Deferred Tax Per B/S | $1,070,000.00 | $405,000.00 | $665,000.00 | $280,000.00 | $180,000.00 | $100,000.00 |
| Ending Deferred Tax Per B/S | $3,570,000.00 | $628,000.00 | $2,942,000.00 | $385,000.00 | $150,000.00 | $235,000.00 |
| CTA | $0.00 | $0.00 | $0.00 | $0.00 | $0.00 | $0.00 |
| OCI | $0.00 | ($70,000.00) | $70,000.00 | $0.00 | $0.00 | $0.00 |
| Total Deferred Tax Provision | ($2,500,000.00) | ($293,000.00) | ($2,207,000.00) | ($105,000.00) | $30,000.00 | ($135,000.00) |
| APB25 Adjustment | $0.00 | $0.00 | $0.00 | $0.00 | $0.00 | $0.00 |
| Total Federal Tax Provision | $4,131,000.00 | $2,605,458.00 | $1,525,542.00 | $1,145,900.00 | $65,050.00 | $1,080,850.00 |
| Total State Tax Provision | $0.00 | $936,240.00 | ($936,240.00) | $0.00 | $199,200.00 | ($199,200.00) |
| Total Tax Provision | $4,131,000.00 | $3,541,698.00 | $589,302.00 | $1,145,900.00 | $264,250.00 | $881,650.00 |
| Effective Tax Rate | 37.55% | 35.42% | | 38.20% | 8.81% | |

| Consolidated Return To Provision Rec TSI Inc | TAX: D3000 GHI Corporation | PROV: D3000 GHI Corporation | DIFF: D3000 GHI Corporation | TAX: F3000 PQR Corporation | PROV: F3000 PQR Corporation | DIFF: F3000 PQR Corporation |
|---|---|---|---|---|---|---|
| Pre-Tax Book Income | $1,500,000.00 | $1,500,000.00 | $0.00 | $10,000,000.00 | $10,000,000.00 | $0.00 |
| Deductible State Tax | $0.00 | $268,800.00 | ($268,800.00) | $0.00 | $0.00 | $0.00 |
| Permanent Differences: | | | | | | |
| Meals & Entertainment | $0.00 | $0.00 | $0.00 | $35,000.00 | $35,000.00 | $0.00 |
| Goodwill | $30,000.00 | $0.00 | $30,000.00 | $0.00 | $10,000.00 | ($10,000.00) |
| Officer's Life Insurance | $60,000.00 | $60,000.00 | $0.00 | $0.00 | $0.00 | $0.00 |
| Total Permanent Differences | $90,000.00 | $60,000.00 | $30,000.00 | $35,000.00 | $45,000.00 | ($10,000.00) |
| Financial Taxable Income | $1,590,000.00 | $1,291,200.00 | $298,800.00 | $10,035,000.00 | $10,045,000.00 | ($10,000.00) |
| Temporary Differences: | | | | | | |
| Bad Debt Reserve | $0.00 | $0.00 | $0.00 | $0.00 | $0.00 | $0.00 |
| Depreciation | $0.00 | $0.00 | $0.00 | $0.00 | $0.00 | $0.00 |
| Leasing Revenue | $200,000.00 | $200,000.00 | $0.00 | $0.00 | $0.00 | $0.00 |
| Litigation Reserve | $0.00 | $0.00 | $0.00 | $0.00 | $0.00 | $0.00 |
| Amortization of Fees | $100,000.00 | $100,000.00 | $0.00 | $0.00 | $0.00 | $0.00 |
| Total Temporary Differences | $300,000.00 | $300,000.00 | $0.00 | $0.00 | ($360,000.00) | $360,000.00 |
| Federal Taxable Income | $1,890,000.00 | $1,591,200.00 | $298,800.00 | $10,035,000.00 | $9,685,000.00 | $350,000.00 |
| Unit Tax Rate | 35.00% | 35.00% | | 35.00% | 40.00% | |
| Federal Tax - Current | $661,500.00 | $556,920.00 | $104,580.00 | $3,512,250.00 | $3,874,000.00 | ($361,750.00) |
| Tax Adjustments: | | | | | | |
| Tax Reserves | $0.00 | $0.00 | $0.00 | $0.00 | $0.00 | $0.00 |
| Total Tax Adjustments | $0.00 | $0.00 | $0.00 | $0.00 | ($100,000.00) | $100,000.00 |
| After Tax Temp Differences: | | | | | | |
| APB 23 | $0.00 | $0.00 | $0.00 | $0.00 | $0.00 | $0.00 |
| AMT Credit | $0.00 | $0.00 | $0.00 | $0.00 | $0.00 | $0.00 |
| Total After Tax Temp Differences | $0.00 | $0.00 | $0.00 | $0.00 | ($200,000.00) | $200,000.00 |
| Total Current Federal Provision | $661,500.00 | $556,920.00 | $104,580.00 | $3,512,250.00 | $3,574,000.00 | ($61,750.00) |
| Deferred Tax Provision: | | | | | | |
| Begin Deferred Tax Per B/S | $245,000.00 | $245,000.00 | $0.00 | $0.00 | $900,000.00 | ($900,000.00) |
| Ending Deferred Tax Per B/S | $350,000.00 | $350,000.00 | $0.00 | $0.00 | $556,000.00 | ($556,000.00) |
| CTA | $0.00 | $0.00 | $0.00 | $0.00 | $0.00 | $0.00 |
| OCI | $0.00 | $0.00 | $0.00 | $0.00 | $0.00 | $0.00 |
| Total Deferred Tax Provision | ($105,000.00) | ($105,000.00) | $0.00 | $0.00 | $344,000.00 | ($344,000.00) |
| APB25 Adjustment | $0.00 | $0.00 | $0.00 | $0.00 | $0.00 | $0.00 |
| Total Federal Tax Provision | $556,500.00 | $451,920.00 | $104,580.00 | $3,512,250.00 | $3,918,000.00 | ($405,750.00) |
| Total State Tax Provision | $0.00 | $253,200.00 | ($253,200.00) | $0.00 | $0.00 | $0.00 |
| Total Tax Provision | $556,500.00 | $705,120.00 | ($148,620.00) | $3,512,250.00 | $3,918,000.00 | ($405,750.00) |
| Effective Tax Rate | 37.10% | 47.01% | | 35.12% | 39.18% | |

FIG. 12C

INFORMATION PROCESSING SYSTEM AND METHOD FOR MANAGING AND DETERMINING TAX INFORMATION

CROSS-REFERENCE TO RELATED APPLICATIONS

This is a continuation application of application Ser. No. 12/592,388 filed on Nov. 24, 2009, now U.S. Pat. No. 7,991, 660 which is a continuation of application Ser. No. 10/284, 977 filed on Oct. 31, 2002, issued as U.S. Pat. No. 7,627,504 on Dec. 1, 2009, both of which are hereby incorporated by reference.

COPYRIGHT NOTICE

A portion of the disclosure of this patent documentation contains material that is subject to copyright protection. The copyright owner has no objection to the facsimile reproduction by anyone of the patent document or patent disclosure, as it appears in the U.S. Patent and Trademark Office patent files or records, but otherwise reserves all copyright rights whatsoever.

BACKGROUND OF THE INVENTION

1. Field of the Invention

The present invention relates to an information processing system and method for determining and maintaining tax-related information among a plurality of business enterprises.

2. Related Art

Previously, the tax data of a company was typically organized in a "stovepipe" configuration, with U.S., state, and foreign data stored in separate "silos" that prevented its use for anything other than compliance. Because the data was stored in an unstructured format, it could not be re-used to support the planning needs of the business. This data had to be re-worked for each planning project and each time managers tried to analyze the tax effects of a changing business environment.

The drawbacks of prior methods are shown below:

1. Tax data used to prepare the financial statements of the company did not serve any other purpose. A great deal of time and effort was spent gathering data that was used to complete the tax footnote section of the financial statements under Generally Accepted Accounting Principles ("GAAP") or International Accounting Standards ("IAS"), but was not used again because it was difficult to retrieve and re-use.

2. The most common way that companies prepared the tax accounts required in their financial statements was to create complex spreadsheets that were organized in highly individualistic ways. Typically, the referencing system was the creation of a single person who was responsible for one outcome. While spreadsheets could be linked to each other, the maintenance of these links was a labor-intensive process. When references shifted to deal with changes in the business, such as new units or new taxes, the fragile referencing system broke down and workers spent a great deal of time managing their spreadsheets and reconciling them to each other.

3. The manner in which this tax data was stored was very dependent upon the author of each spreadsheet. As a result, employee turnover could create serious gaps in the tax history of the business; each new employee had to re-create the tax data in their own style with a new unique system of references. In practice, each old system of unstructured spreadsheets was replaced by a new unstructured system every time an employee turned over. This made the comparison of tax results over time a difficult task.

4. The tax planners for the company were often lawyers, rather than accountants, and were not familiar enough with accounting conventions to use this information stored in spreadsheets without support from the accounting staff. They would generally request this data on an ad hoc basis using accountants to test out various tax planning strategies and structures. This was a highly inefficient process fraught with misunderstandings and judgment errors.

5. Comparability of tax data was difficult from year to year and from entity to entity because each year and each entity could be prepared by a different person using a unique referencing system. Sometimes the same person would use a different referencing system to accommodate a particular set of facts unique to that time period or that entity.

6. Since there was not a single system in which to store the data, it was also gathered in a number of different ways: domestic information was often pulled from general ledgers in a manual process and then loaded into spreadsheets. Foreign information for each local entity was pulled from local general ledgers, tax computations were made by hand and then the information was compiled into spreadsheets which were sent to a corporate office for re-entry into another spreadsheet for final consolidation. The process was difficult to improve because the data gathering, the computations and the final consolidation all took place in an unstructured environment with multiple points of data entry.

7. At the final level of consolidation, the tax results of the company needed to be compared to other businesses for purposes of benchmarking This was an inefficient process due to the lack of standard analytical tools and the lack of a standard way to exchange data in environments that did not share a common platform. These deficiencies prevented analysts inside and outside the company from comparing the tax accounts of one firm to another firm.

8. When the business prepared its tax returns, it was required to revisit this process in a completely different light. The estimates used in the preparation of the financial statements were not allowed, meaning that the company had to re-do the financial statement calculations using actual data rather than estimates. Additional detail was also required to complete all of the supporting statements in the tax return. These computations were typically stored in a database that had been written to support the U.S., state or foreign tax returns of the company and was separate from the database used to support the U.S., state and foreign tax provisions reported in the financial statements.

9. The transfer of data from legacy systems into either a structured or unstructured environment was complicated by the fact that each chart of accounts was different, reflecting the unique operating history of the business. The automation of this transfer by mapping each account was a laborious and time-consuming process that required a great deal of maintenance.

10. Comparability of tax data produced by the system with other business organizations for purposes of benchmarking and analysis was complicated by the unique referencing systems of each business.

To summarize, prior art methods require the use of multiple pools of data which could not be readily integrated and where data could not be re-used. The existing systems were held together by unstructured spreadsheets that were highly individualistic and required a great deal of maintenance. In this environment, comparability of internal data across legal entities or time periods was very uncertain; comparability with other companies was difficult because there were no standards. The data gathering process mirrored this inefficiency because units were required to report the same or similar data multiple times in a "stovepipe" environment.

SUMMARY OF THE INVENTION

A system of the present invention comprises a multi-user information processing system for determining tax provision information that comprises:

a. a source database storing data for determining tax provision information;

b. a calculation engine for performing information processing operations on said data stored in said source database for determining tax provision information;

c. a transformed database for storing tax provision information determined by said calculation engine; and d. a reporting engine for producing reports using information from said transformed database.

A method of the present invention comprises a multi-user information processing method for determining tax provision information that comprises:

a. providing a source database;

b. storing data for determining tax provision information in said source database;

c. performing information processing operations on said data stored in said source database for determining tax provision information on data stored in said source database;

d. storing tax provision information determined by said information processing in a transformed database; and e. producing reports of tax provision information using information from said transformed database.

BRIEF DESCRIPTION OF THE DRAWINGS

FIGS. 7A-7K are examples of reports created by the system of the present invention that are available at the business unit level.

FIGS. 8A-8J are examples of reports created by the system of the present invention that are available at the consolidated level.

FIGS. 9A-9K are examples of reports created by the system of the present invention that are available at the sub-consolidated level.

FIGS. 10A-10B are examples of state reports created by the system of the present invention which is available at the unit level.

FIGS. 12A-12C are screen prints of a computer monitor display of the present invention and illustrate a preferred user interface for selecting tax return datasets and tax provision datasets and examples of tax return to tax provision reports.

DETAILED DESCRIPTION OF THE PREFERRED EMBODIMENT

Figure 1A:
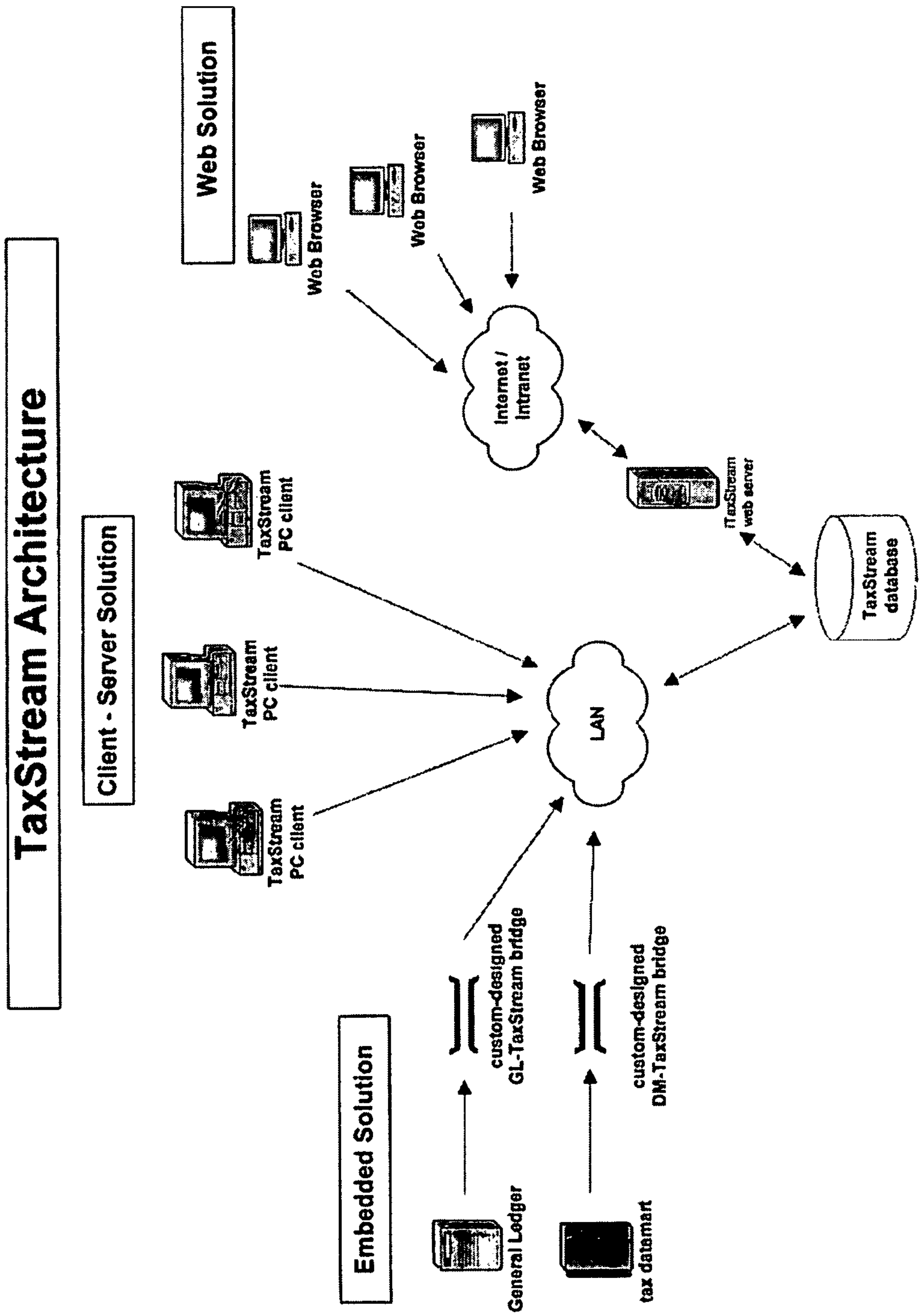
FIG. 1A is a flow chart that describes the architecture of the present invention including the hardware configuration and connectivity architecture of the system.
Figure 1B:
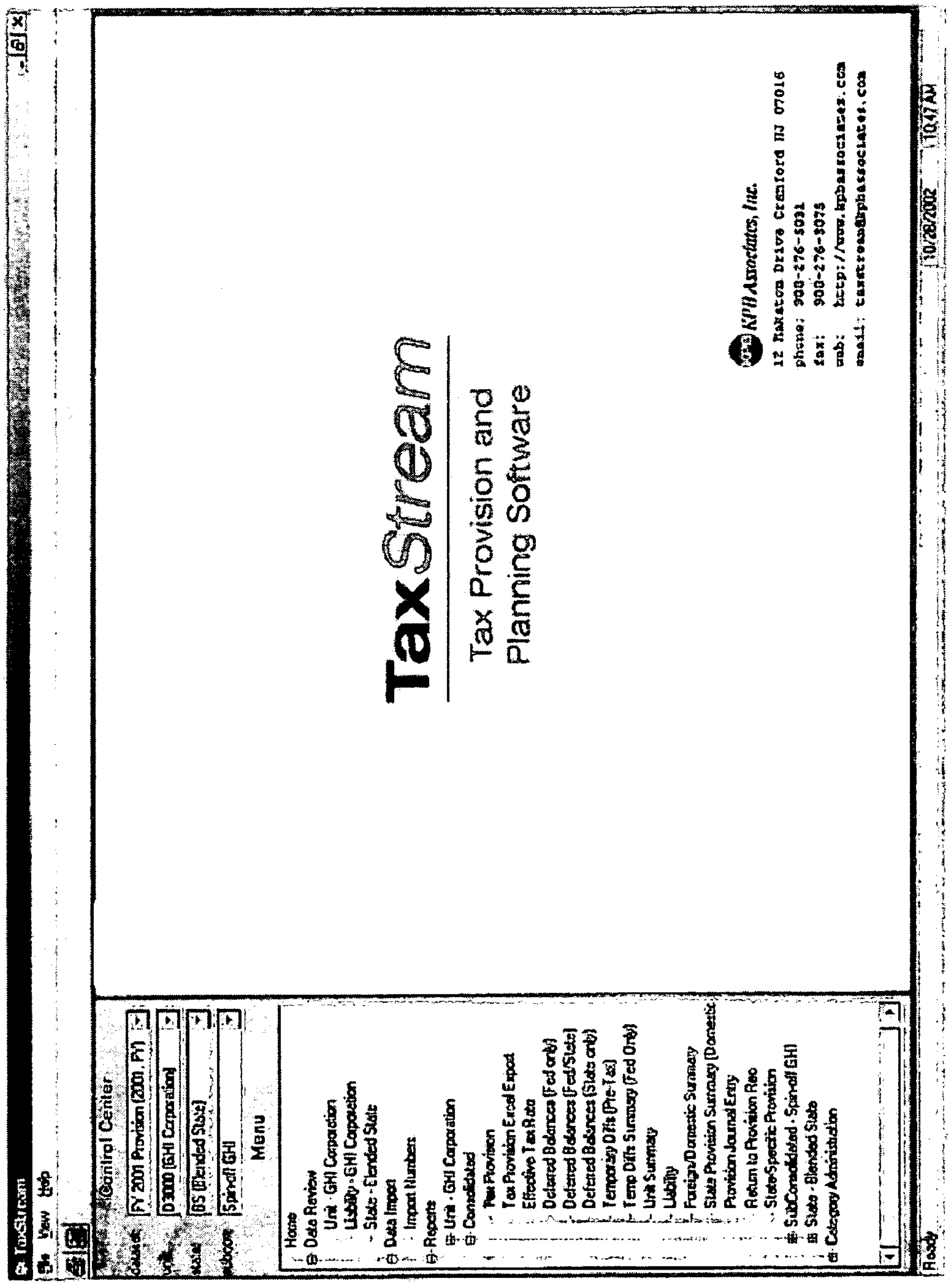
FIG. 1B is a screen print of a computer monitor display by the system of the present invention and illustrates the Control Center and Menu feature.
Figure 2A:
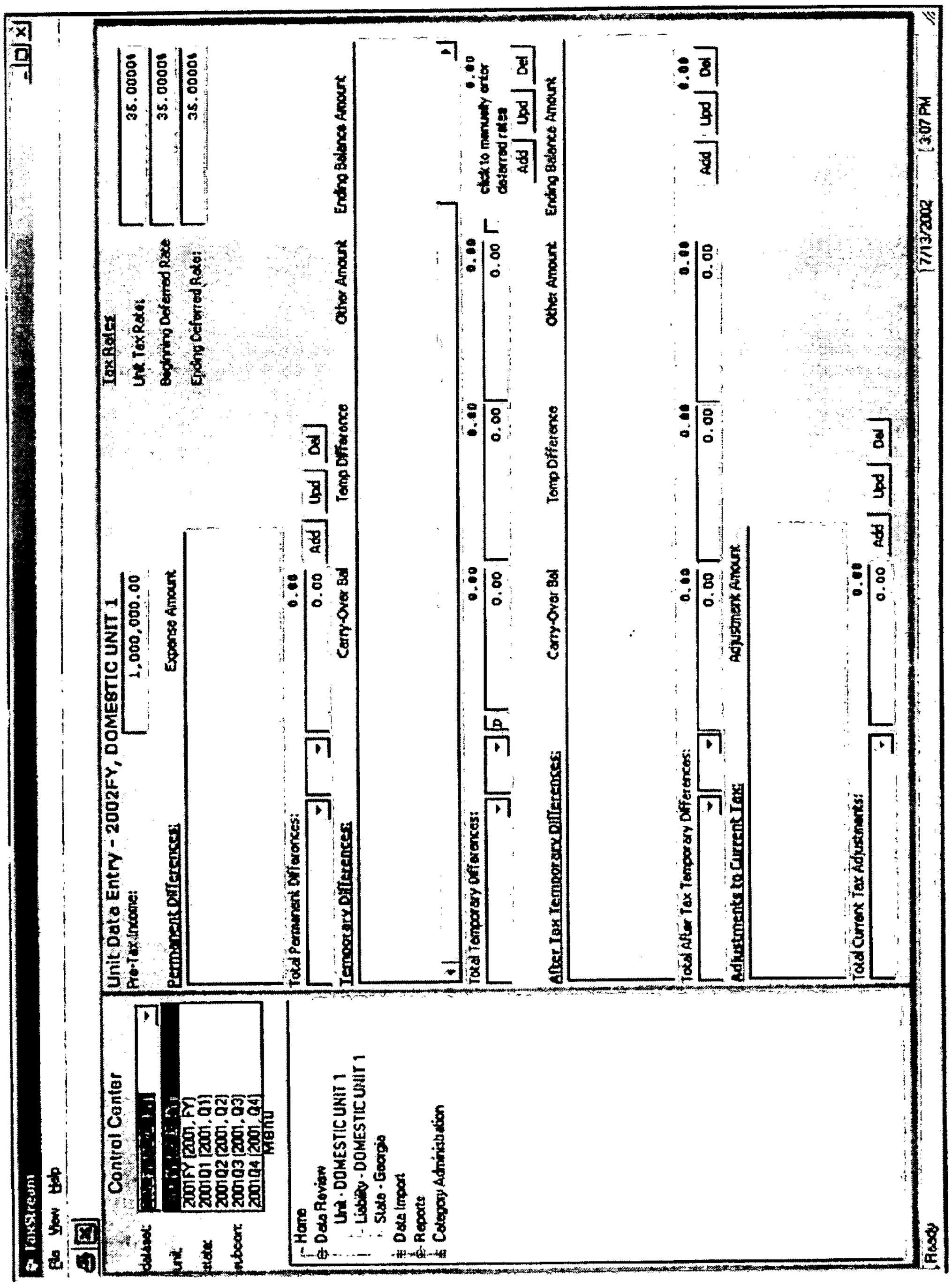
FIGS. 2A-2D are screen prints of a computer monitor display by the system of the present invention and illustrate drop down boxes in the Control Center feature and overall navigation features of the system of the present invention.
Figure 2B:
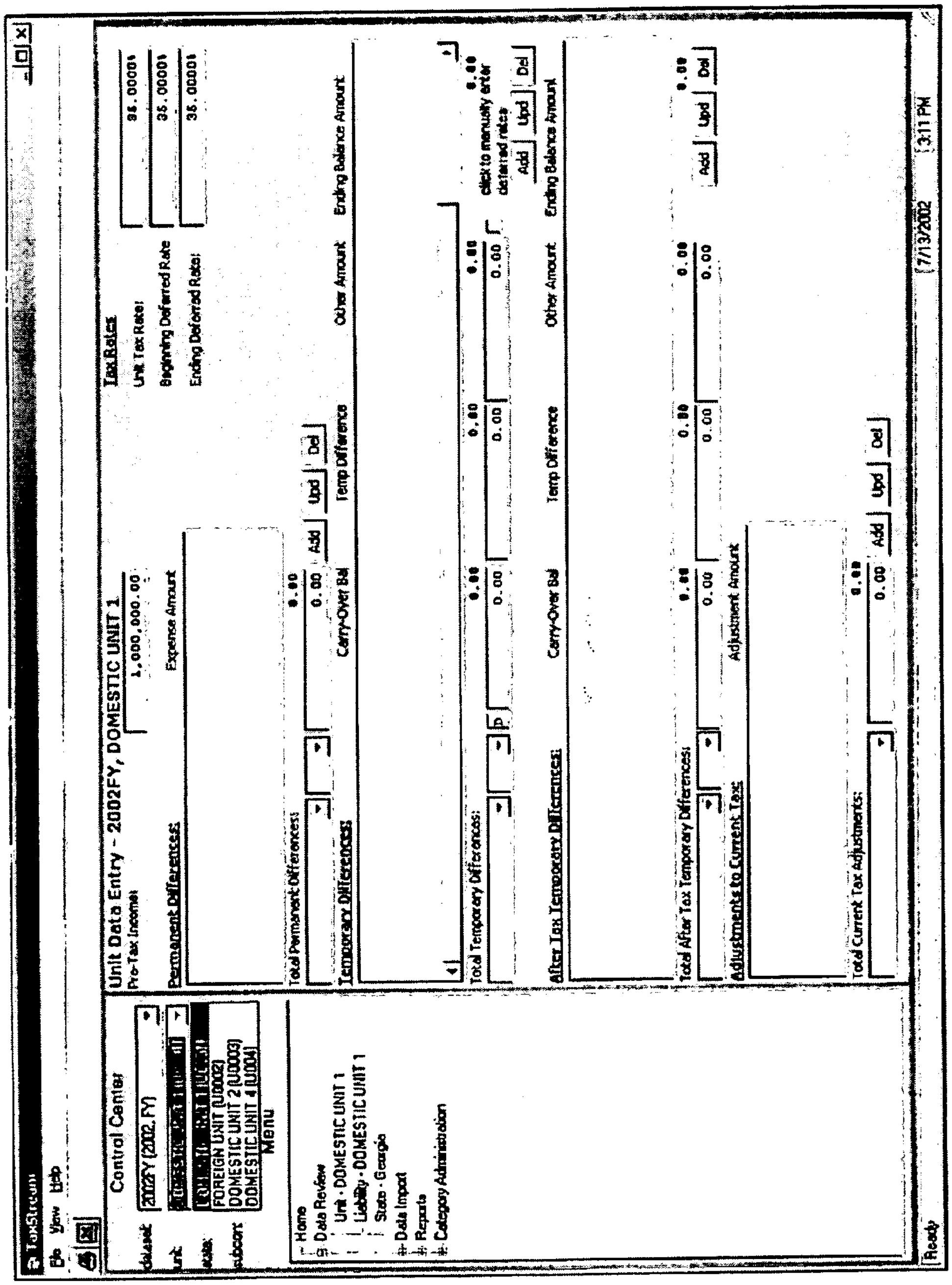
Figure 2C:
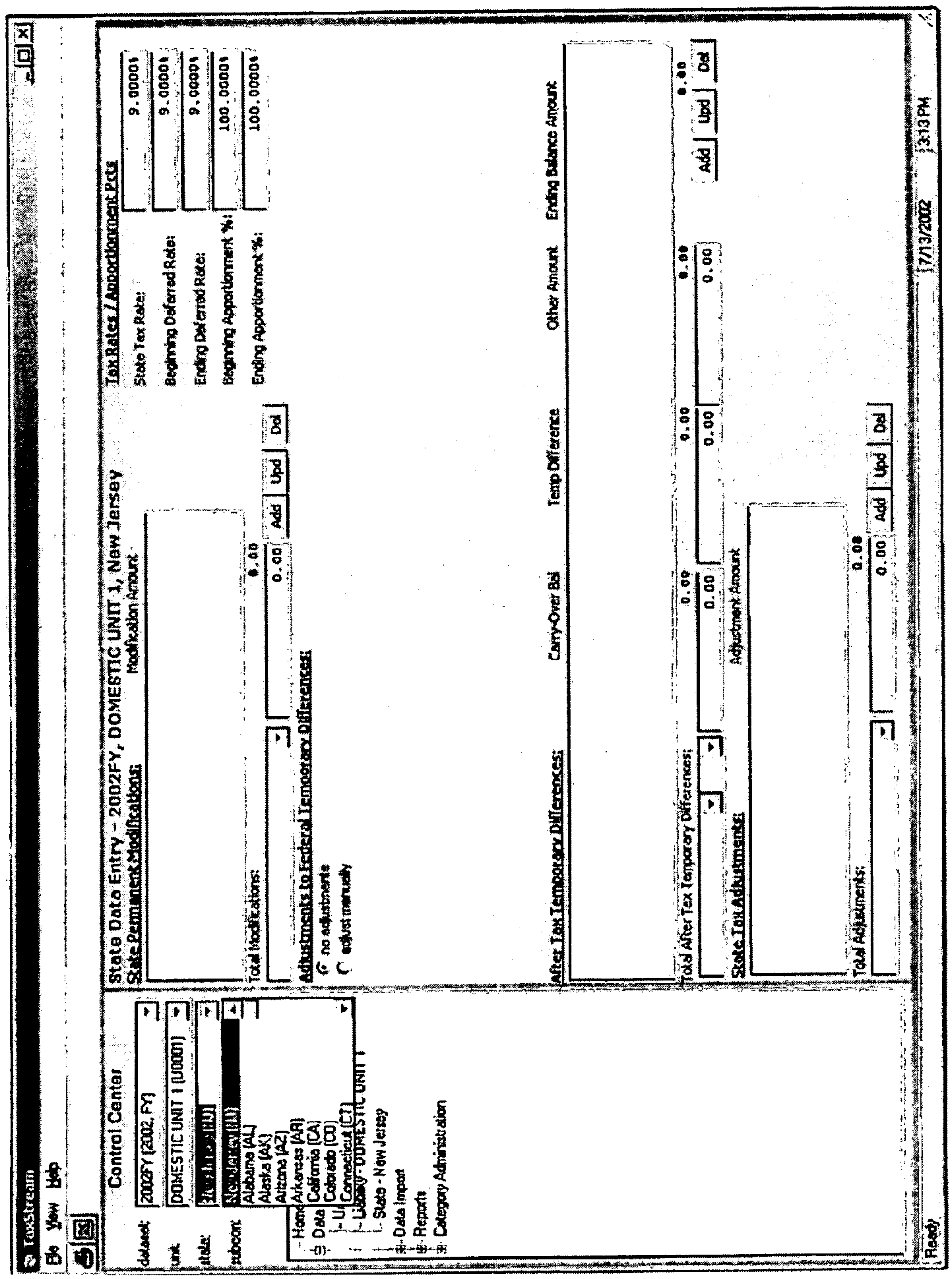
Figure 2D:
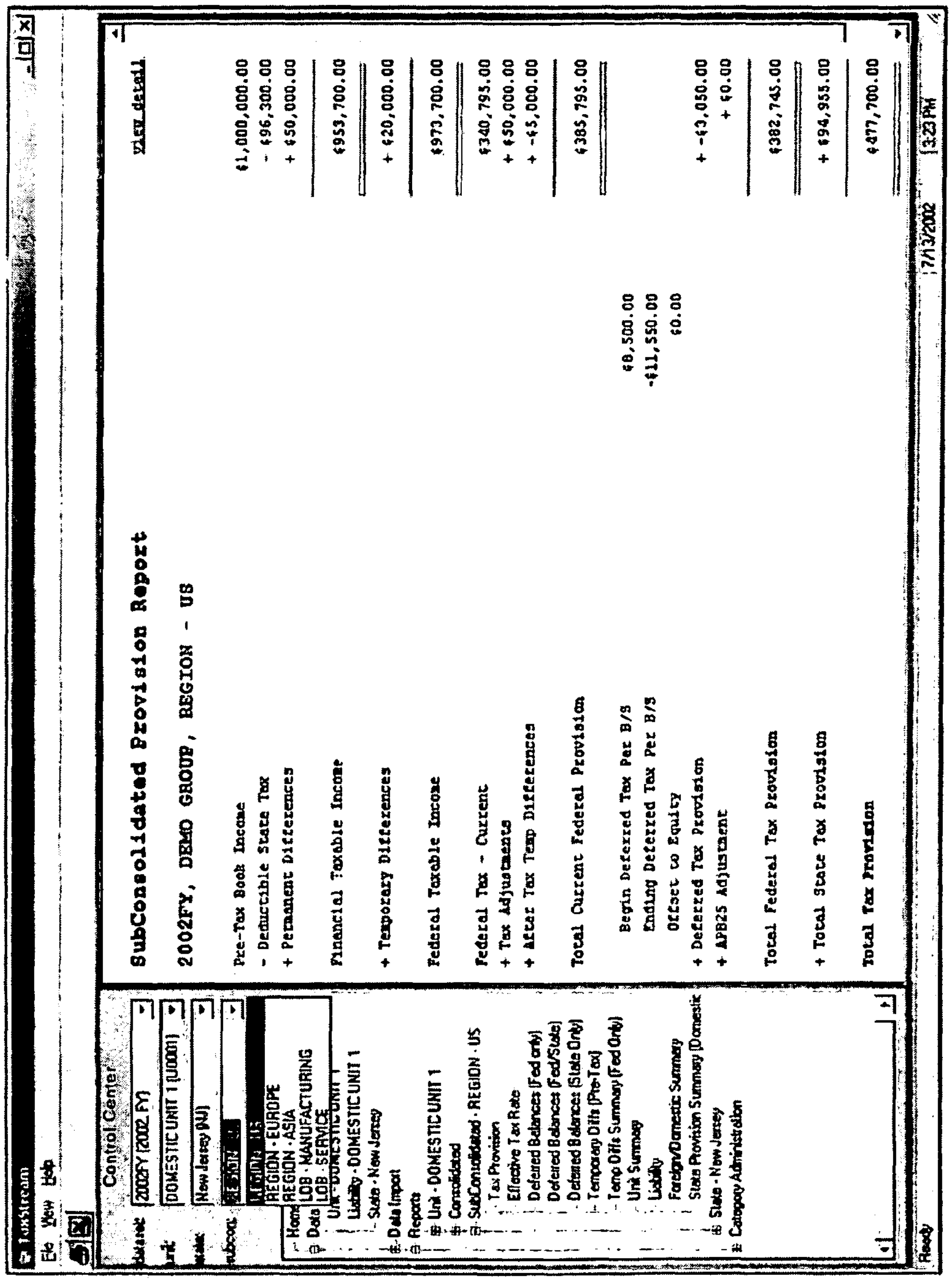

The present invention comprises a multi-user information processing system and method for determining tax provision information. The system generally comprises:

a. a source database storing data for determining tax provision information;

b. a calculation engine for performing information processing operations on said data stored in said source database for determining tax provision information;

c. a transformed database for storing tax provision information determined by said calculation engine; and d. a reporting engine for producing reports using information from said transformed database.

The method generally comprises:

a. providing a source database;

b. storing data for determining tax provision information in said source database;

c. performing information processing operations on said data stored in said source database for determining tax provision information on data stored in said source database;

d. storing tax provision information determined by said information processing in a transformed database; and e. producing reports of tax provision information using information from said transformed database.

Corporations doing business in various different taxing jurisdictions are required to make complex calculations to ensure that each country, state and local government receives their fair share of the company's income. These calculations, which are included in their financial statements, must include allowances for taxes owed in past years, the current year, and future years. In general, the tax expense associated with pre-tax book income, and which is payable within one year or less, is recorded in the income statement as the current tax provision. The offset to this charge (or benefit) in a double entry accounting system is normally a credit (or debit) to the taxes payable account. The tax expense associated with pre-tax book income and which is payable in a future period is recorded as the deferred tax provision. The offset to this charge (or benefit) is normally a credit or debit to the deferred tax balance. The deferred tax balance represents the sum of all such entries over the history of the company and summarizes all future taxes due (deferred tax liabilities) or future tax benefits (deferred tax assets).

The tax computations reported to the U.S. Securities and Exchange Commission ("SEC") are usually made under GAAP; the tax computations reported by corporations doing business outside the U.S. are governed by local accounting standards or the IAS. In addition, certain regulatory bodies in the insurance and securities businesses require these tax computations to be made under industry specific standards. The revenue authorities in each country, including the Internal Revenue Service, maintain tax accounting standards that are different from the financial accounting standards noted above. In addition, the Internal Revenue Service requires certain taxpayers to compute their Alternative Minimum Tax separately under Section 55 of the Internal Revenue Code. Individual states and municipalities represent still another method of tax accounting.

Corporations must maintain records that support all of these different computations and are required to produce detailed support to outside auditors from accounting firms, government regulatory bodies, and U.S. and foreign revenue authorities. All of the different reporting standards must be reconciled to the satisfaction of these outside auditors. Internal reconciliations must also be made to satisfy management that the tax accounts of the company are under control and that the company is meeting its compliance and reporting responsibilities. These reconciliations can be found in the deferred tax accounts that track the differences between the federal tax return and the financial statements, the state tax returns and the financial statements and all tax returns and the accounts prepared under various other regulatory guidelines.

The computation of the tax provision reported in the company's financial statements is of key concern to investors because it can represent a significant portion of the company's earnings per share. This is an important factor in evaluating the company's price-earnings multiple and ultimately its stock price and valuation.

In a large multinational enterprise, the raw data needed to compile the tax accounts is derived from various legal entities around the world. The raw data must be translated into U.S. dollars and conformed to the appropriate accounting standard.

From a planning point of view, companies need to understand how taxes will affect their business strategies. They must test new business structures to determine the impact on their unique tax history. For companies doing business in multiple jurisdictions, it can be very difficult to accurately project the tax effect of acquiring or divesting a business, particularly when that business is itself involved in cross-border transactions.

Managers need a system that can control all of the various differences between tax reporting and financial statement reporting across a multitude of taxing jurisdictions. Once this data has been efficiently captured in a database format, it can be re-used to estimate the effect that changes in the business will have on the tax picture of the company. Changes in tax assumptions can then be measured against a static or dynamic business strategy.

Most companies prepare tax accounts that support the financial statements and tax returns using unstructured formats such as spreadsheets and manual work papers. Because these sources are unstructured, the data cannot readily be retrieved and re-used. Tax return systems cannot provide this environment because tax returns are different in each country due to language differences and the differences in accounting conventions. As a result, previously there was no central structured database of tax information that could support the financial statements, the tax returns and the planning needs of the company. The necessary tax data had to be reworked for each new set of queries. Comparability of these ad hoc solutions was almost impossible because the data is drawn from a variety of unstructured sources.

Accordingly, there is a need for a single database, specifically designed to meet the tax compliance and planning needs of the company in all taxing jurisdictions, and that will permit the re-usability and comparability of data in a dynamic environment. This database must be able to accept data in a variety of ways, including an electronic bridge from legacy systems, client-server configurations, and the Internet. A standard software language that is independent of platform or software, such as extensible markup language (XML), is needed to allow the database to accept data from different legacy systems. The reporting system must include analytical tools that can compare the tax accounts of the business to other businesses, using a standard language such as XML.

The present invention provides a computerized system that optimizes the after-tax income of a business while storing tax information in a database specifically designed to meet the tax reporting requirements of shareholders, management, regulators, outside auditors, and revenue authorities. The system of the present invention allows the business to use the same data to meet compliance and planning needs across a dynamic range of legal entities and time periods. Because the necessary data is stored in one database, the accessibility and comparability of the data is enhanced by an XML referencing scheme.

The present invention provides a computerized system for managing the income tax compliance and planning activities of a business within a single architecture. The database has been specifically designed to meet the tax accounting requirements of the business and stores critical data needed to satisfy management, regulatory and tax reporting needs. The calculation engine, which allows the re-use of data, supports the planning efforts of the firm to predict and control its future tax expense, thereby optimizing its after-tax income, earnings per share and the share price of the firm. The computerized system of the present invention allows a business to project its core tax data over a dynamic range of time periods and legal entities using a user-defined, unlimited number of potential "what if" scenarios. In this way, any number of structures can be modeled and projected using the unique tax history of the company. The modeling features can also be extended to include potential audit adjustments to prior years. The database can be populated through the server directly from the legacy systems of the company, via the Internet, through a client-server connection, or any combination of the three XML is used as a medium between the database and the external data source, thereby allowing the free flow of indexed data from diverse legacy systems to the database. These different data transfer options provide a high degree of flexibility in gathering data from local and remote sources, while preserving the utility and benefits of a single architecture. Reports are also written in XML that facilitates the comparison of the tax accounts of the business with those of other firms. Analytical tools are provided so users can compare the tax profiles of different companies using standard parameters.

A preferred system of the present invention will include the following features:

1. A single database designed to manage the firm's income tax liabilities and maximize its after-tax income in compliance with the law;

2. An efficient data gathering method that can pull data from local and remote legacy systems in an automated fashion from other countries in other currencies;

3. Software tools to provide comparisons with other businesses by reference to a standard;

4. An interface designed to simplify the input of accounting data so that all of the complex computations are done by the system of the present invention and that data is re-used whenever possible, thereby reducing the complexity of the procedure to the user;

5. A universal referencing scheme that the business can use to transfer and compare tax data;

6. Various methods of exporting reports as paper reports, spreadsheets, or web screens.

A tax provision is the tax expense or benefit reflected in the income statement and balance sheet of a company's financial statements. The term "engine" refers to a software program or module for performing the stated function. The term "bridge" refers to a customized utility to automate the process of extracting data from an external data source and transforming that data into a format that can be imported into the system of the present invention by the Import Engine. A bridge is an application that maps key accounts from the general ledger, computes certain Permanent and Temporary Differences between book income and taxable income and then automatically loads the information into the system. The bridge can also be used to adjust year to date results to arrive at the quarterly data. Adjusting journal entries are also automatically prepared within the bridge.

Further, an information system of the present invention is designed to manage the income tax expense of a business within a single architecture and may comprise the following components:

A Source Database to store all of the raw data necessary to produce the income tax provision. The Source Database is specifically structured for tax reporting purposes and includes the following categories of data: pre-tax permanent and temporary differences, tax adjustments, tax rates, foreign currency exchange rates, state modifications, state temporary and permanent differences, state tax adjustments, state tax rates, tax payments and tax refunds. These are raw inputs that are the foundation for tax calculations. The data is stored in its source or local currency.

A Calculation Engine to perform all of the operations needed to generate a tax provision. The operations include computation of current and deferred tax provisions; current and deferred tax balances; domestic, foreign and state (including political subdivisions such as municipal) tax expenses; cumulative tax adjustment (CTA); other comprehensive income (OCI); effective tax rate; foreign currency exchange; and return to provision. The Calculation Engine takes its input data from the Source Database and stores its results in the Transformed Database.

A Transformed Database to store the tax provision resulting from the Calculation Engine. All of the data are stored in the base currency of the consolidated group of business units, such as U.S. dollars. The Transformed Database supports unit, consolidated, and sub-consolidated views of the data.

A Source Data Maintenance Engine to manage the process of requesting data from the Source Database and inputting data into the Source Database including, but not limited to, manual updates using input screens and spreadsheets and bridges via the Import Engine. The Source Data Maintenance Engine also supports maintenance of the administrative data including the setup of business units, pre-tax permanent and temporary differences, tax adjustments, tax rates, foreign currency exchange rates, state modifications, state temporary and permanent differences, state tax adjustments, state tax rates, tax payments and tax refunds.

An Import Engine to transform the contents of import data files into commands to the Source Data Maintenance Engine that are then processed by the Source Data Maintenance Engine.

A Reporting Engine to produce pre-formatted reports using data from the Transformed Database. These reports can be produced in a variety of formats including HTML (Hypertext Markup Language), XML (Extensible Markup Language) and Microsoft EXCEL. These reports, which are available at the unit, sub-consolidated and consolidated level include the following:

Tax Provision
Tax Provision Excel Export
Effective Tax Rate
Deferred Balances (Federal only)
Deferred Balances (Federal/State)
Deferred Balances (State Only)
Temporary Differences (Pre-Tax)
Temp Differences Summary (Federal Only)
Unit Summary
Liability
Foreign/domestic Summary
State Provision Summary (Domestic)
Provision Journal Entry
Return to Provision Reconciliation
State-Specific Provision A Client Application to interface with the end user by interacting with the Source Data Maintenance Engine for data entry purposes, by interacting with the Reporting Engine for reporting purposes and also by interacting with the Import Engine for importing data. The interface contains data input/review screens that organize the data input process into logical groupings. For example, all federal input is separated from state input through the use of different screens.

The Calculation Engine may automatically synchronize the data in the Transformed Database upon changes to the Source Database. The Source Data Maintenance Engine may provide a tax provision interface and may perform all the work necessary to translate the requests into the appropriate database commands. The transformed database may contain all of the information necessary to service tax provision and analytical needs without having to request information from the Source Database. Desirably, the present invention may provide a single architecture to accept data from local and remote locations, including applications in a single user environment, a client-server environment, and Internet/intranet/extranet environments. It may provide a single architecture that employs XML to synchronize the transfer of legacy data into the Source Database or that reports in XML to facilitate the transfer of transformed data out of the system into other systems.

Further, a computerized system of the present invention may comprise the following procedures:

Setup of database to reflect the ownership of legal entities of the business and the unique tax history of each entity, including states and foreign jurisdictions where the entity is engaged in business. Unique permanent and temporary differences between the financial statements and the tax return are also setup for all entities as a master control for the entire consolidated business. The processes are performed through the Client Application by the Source Data Maintenance Engine.

Cleansing of data at source. This requires the normalization of data derived from legacy systems to conform to the setup of the database for the entire organization. The data are stored in the Source Database.

Load data from legacy systems using software bridges that automate the flow of data through the Import Engine and then the Source Data Maintenance engine into the Source Database. Legacy systems can include general ledgers, stand-alone spreadsheets, such as Microsoft EXCEL spreadsheets, and tax return databases.

Review and test data in the system using the Reporting Engine for accuracy and relevance. Make changes and overrides to the Source Database using data review screens of the Client Application. Final dataset used to meet financial statement reporting obligations.

Load tax return data and compare with earlier estimates used to compute the tax provision reported in the financial statements. Use the functionality contained in the Client Application to select provision dataset and tax return dataset. Use reports generated by the Reporting Engine to automate the comparison of provision and return data.

Prepare sub-consolidations to create combinations of units and subsets of units to test new ownership structures and to model new business conditions such as mergers, divestitures, and various combinations of units. Re-use data from financial statements and tax returns to simulate user-defined planning scenarios, models and projections using the category administration contained in the Source Data Maintenance Engine and viewed through the Client Application.

Compare user-specified fields across datasets for data mining purposes, using the Transformed Database, which has been designed to enable the analysis of data via third party data mining tools.

Compute selected ratios and indicators that will analyze the company's tax accounts, compare these ratios with other companies and create a distribution that permits analysis of user defined investment/business sectors.

Use analytical tools that allow the user to compute after tax returns on cash flows and earnings from any number of investments including stocks, leases, annuities and bonds.

Use analytical tools that allow user to change intercompany transactions to simulate various tax planning ideas such as debt pushdowns, intercompany sales and transfers of intangibles.

Further, user-defined datasets may be used to establish time periods, including fiscal years, quarters, and year to date activity. Datasets can also be created to archive support for financial statements and tax returns and to rollover prior year's data to new datasets. Copies of datasets are established to test the effect of changing business parameters such as pretax income and tax rates. User-defined units may be used to hold low-level data for entities such as corporations, branches, partnerships, and subsidiaries. Sub-consolidations may be used to create user-defined combinations of units to simulate various business conditions, such as mergers, acquisitions, divestitures and spin-offs. The sub-consolidation feature may be used to simulate accounting structures and management structures so that a user can determine the tax characteristics of budgets and plans proposed by management. User-defined permanent and temporary differences and tax adjustments are used to track and compute the effect of different accounting systems maintained for financial statements, management and revenue authorities. User-defined states and local municipalities may be used to simulate the tax returns to be filed in each taxing jurisdiction.

The system may include a method of maintaining separate permanent and temporary differences at the state and municipal level, i.e., differences between federal tax returns and state tax returns that need to be identified and tracked across discrete time periods.

The system of the present invention automates the provision process by electronically linking into legacy general ledger data for book income and the computation of permanent and temporary differences. Provision data is stored in a structured format and will be re-used for planning purposes and can be shared with other key users.

Book data taken from the general ledger system will be automatically loaded into the system of the present invention via a bridge. The bridge takes raw data and calculates certain permanent and temporary differences that will then be loaded directly into the source database. Once in the source database, the calculation engine will perform further calculations that will compute the effective tax rate and deferred tax balances. The resulting output are stored in a transformed database and may be viewed and analyzed using reports available in the system. Input/Review screens may be used to correct and modify the input.

The bridge will also pull the balances in key tax accounts in order to automate the journal entries. The balances in the tax accounts will be compared with the actual balances computed by the calculation engine. The reporting engine will then compare the balances and produce a report that shows the journal entries needed to correct the general ledger.

The reports within the system will be used to analyze the drivers of the effective tax rate and the activity in the deferred tax accounts. This analytical capability will be used to identify tax planning ideas that can improve net income and cash flow.

From the user's point of view the system will improve speed, efficiency and quality of tax provision information. The re-use of data will also allow a higher degree of responsiveness to "what-if" scenarios. The tax effects of proposed changes in the structure of the business can be modeled quickly and accurately by making use of the historical financial data that has been loaded into the source database specifically structured for tax planning purposes. User requirements for a method to organize and preserve the tax history of the company are met as the system is used and more data is loaded into it. This will result in the institutionalization of knowledge that can be shared by all. It will also reduce the risk associated with employee turnover.

A bridge automates the flow of data so that the risk of manual error is minimized and the turnaround times will be improved. Last minute changes can flow quickly from the general ledger directly into the source database where it will be re-calculated, analyzed and modified. The bridge will capture the existing balances in the general ledger and will compare them to the true amounts computed by the calculation engine. A report will be created that captures the difference, which is the suggested journal entry needed to bring the general ledger into balance with the actual amounts computed by the calculation engine.

Using the system, the tax return to tax provision reconciliation will be accomplished within one database. The tax provision data will be compared to the tax return data and the reporting engine will automatically produce a reconciliation report that will be used to correct the deferred and current provisions for all federal, state and foreign taxpayers. The tax return data will be automatically loaded by running the final general ledger through the bridge. Permanent and temporary differences not computed within the bridge will be entered into the source database through input screens or electronically through spreadsheets. This will result in the normalization of all provision and return data that can be used for planning and analysis.

The system builds the consolidated tax provision from the bottom up, capturing all relevant tax parameters at a very low level of detail. This will permit the user to create sub-consolidations that combine low level detail into reporting units that act as a map of the consolidation process. These sub-consolidations are saved and become a permanent part of the system, thereby providing an audit trail and eliminating the risk of having the consolidation procedures resting with one person.

As the system is used, an archive of tax data will be built up in the source database. This database will provide an audited tax history of the company, which can be used for budgeting purposes and to test the tax effects of various business models. Since all foreign and domestic data will be normalized and stored in the source database, it can be used to support any number of comparisons and "what-if" scenarios. As more and more clean audited data is added to the source database, it should be possible in the future to mine the data for useful trends and comparisons.

The implementation of the system in a user company comprises three phases:

Phase 1. Set up the Company with a legal structure within the system. Load in audited data from the prior year end and quarterly data for the current year. Parallel the next quarter of the current year in the system.

Phase 2. Construct bridge from general ledger reports to the system loaded in Phase 1. This will include a review of accounting and systems procedures and will result in the automatic calculation of articulated temporary differences and journal entries. Create documentation of implementation and integration plan.

Phase 3. Work with user information technology personnel to set up a multi-user environment that will allow multiple users to access the system. Migrate data into multi-user environment. Reach out to remote locations with the Internet version of the system. This is particularly useful in gathering data from foreign subsidiaries in local currency.

An example of the year-end procedures using the system is shown below:

a. Rollover ending balances from prior year within the source database.

b. At year-end, run the bridge and automatically load and re-load the data into a provision dataset within the source database until the books are closed and the provision is locked down.

c. After all consolidation entries and late adjustments have been recorded on the ledger, re-run the bridge and load the updated data into a new tax return dataset within the source database.

d. Run the tax return feature of the bridge and feed data directly into the tax return. (At this point, the new tax return dataset within the system and the tax return should be identical.)

e. Complete the return within the tax return software.

f. Export the return data to the new dataset. (At this point, the final tax return and the new dataset within the reporting engine should be identical.)

g. Run the return to provision report within the reporting engine to produce an automated return to provision reconciliation.

h. Use the automated journal entry report within the reporting engine comparing the provision and the tax return datasets to compute the adjusting journals. (Note that this is not a closed loop and the journals will be made manually.)

i. Enriched transformed database that includes a copy of critical tax return data is now available for planning, budgeting and current system scenarios, including potential adjustments by the revenue authorities and restatements of financial statement results.

A second example of the quarterly procedures using the system is shown below:

a. Rollover ending balances from prior quarter within the source database.

b. Run General Ledger report for year to date Pre-Tax book income numbers.

c. Run bridge pulling year to date pretax book income for each entity as of the end of the quarter from General Ledger report.

d. Bridge will identify prior quarters within the system and allow user to select those quarters that will be backed out of the year to date pretax book income.

e. Bridge computes 3 month pretax book income that is automatically loaded into the source database.

f. Run General Ledger report for the most recent 12 month temporary difference estimate made for each entity that includes projected ending balances in the temporary difference accounts.

g. Run bridge, loading the 12-month change between the prior year ending balances and the projected current year balances.

h. Bridge will compute the appropriate percentage of the change in the temporary differences; i.e. 25 percent in the $1^{st}$ quarter, 50 percent in the $2^{nd}$ quarter and 75 percent in the $3^{rd}$ quarter. The appropriate quarter is selected by the user.

i. As was done for the computation of pretax book income, bridge will identify prior quarters within the system and allow user to select those quarters that will be backed out of the change in temporary difference balances (after adjustment for the appropriate quarterly percentage.). This 3 month estimate of the change in temporary difference will be automatically loaded into the source database.

j. Any further adjustments will take place manually. Alternatively, the process can be repeated if the underlying source data in the General Ledger reports changes significantly.

Budgets and estimates can be done by creating a copy of a dataset and then making the appropriate adjustments within the system. Planning can be accomplished by making copies of datasets and then testing the effect of changes. The sub-consolidation features of the system can be used to simulate various "what-if" scenarios such as spin-offs, mergers and acquisitions.

The system may also include data review and data input over the Internet. For example, if foreign or domestic units not on the data storage system are acquired, these units could use a website to enter their data directly into the database. The same website could be used to view reports remotely. This would reduce the multiple points of entry required of remote units on different ERP systems and would give these units the same capabilities to analyze their data as users of the data storage system.

The present invention comprises a computerized system that stores tax data within a single dynamic architecture designed to standardize reporting for all tax accounting—federal, state, and foreign. This standardized system can be used to meet the financial reporting requirements under GAAP and IAS, and can support the tax returns filed with federal, state, and foreign revenue authorities. All permanent and temporary differences between financial reporting and tax reporting are indexed to support the compliance and planning needs of the business. The planning aspects of the system of the present invention can be used to simulate the tax impact of mergers, acquisitions, spin-offs, divestitures, and other business reorganizations thereby testing user-defined structures in a dynamic environment. The tax results of individual business units or any grouping of business units can be analyzed in an open format that allows the business to manage its tax burden and maximize its after-tax income. Reports are stored in an XML scheme that permits comparisons with other companies and facilitates the transfer of data into the system from legacy systems.

Turning now to the figures of the drawing, FIG. 1A shows a system architecture that could be used to accept data from a variety of sources. Local data can be transferred via a software bridge from legacy systems to the database of the system of the present invention. Remote data can be transferred into the database using the Review/Input screen over the Internet. Data can be modified and overridden in a client-server environment using a multi-user version of the system.

FIGS. 2A-2D show a split screen interface design that places controls for the system on the left side of the screen and reports under the "Control Center" caption and working screens for the system on the right side of the screen. The first drop-down box at the top of the control center (FIG. 2A) specifies for selection which dataset is to be selected. This can be an actual time period or a copy of a time period modified to achieve some user-defined planning objective. The second drop down box (FIG. 2B) controls selection of the business unit that is going to be viewed or modified. The third drop down box (FIG. 2C) controls selection of the state that is going to be viewed or modified. All 50 states are coded into this drop-down box and the user can add additional municipalities. If a foreign unit is selected from the unit drop down box, the state drop down box is hidden. The fourth drop down box (FIG. 2D) controls selection of sub-consolidations that have been setup in the system in a user-defined administrative screen.

Figure 3A:
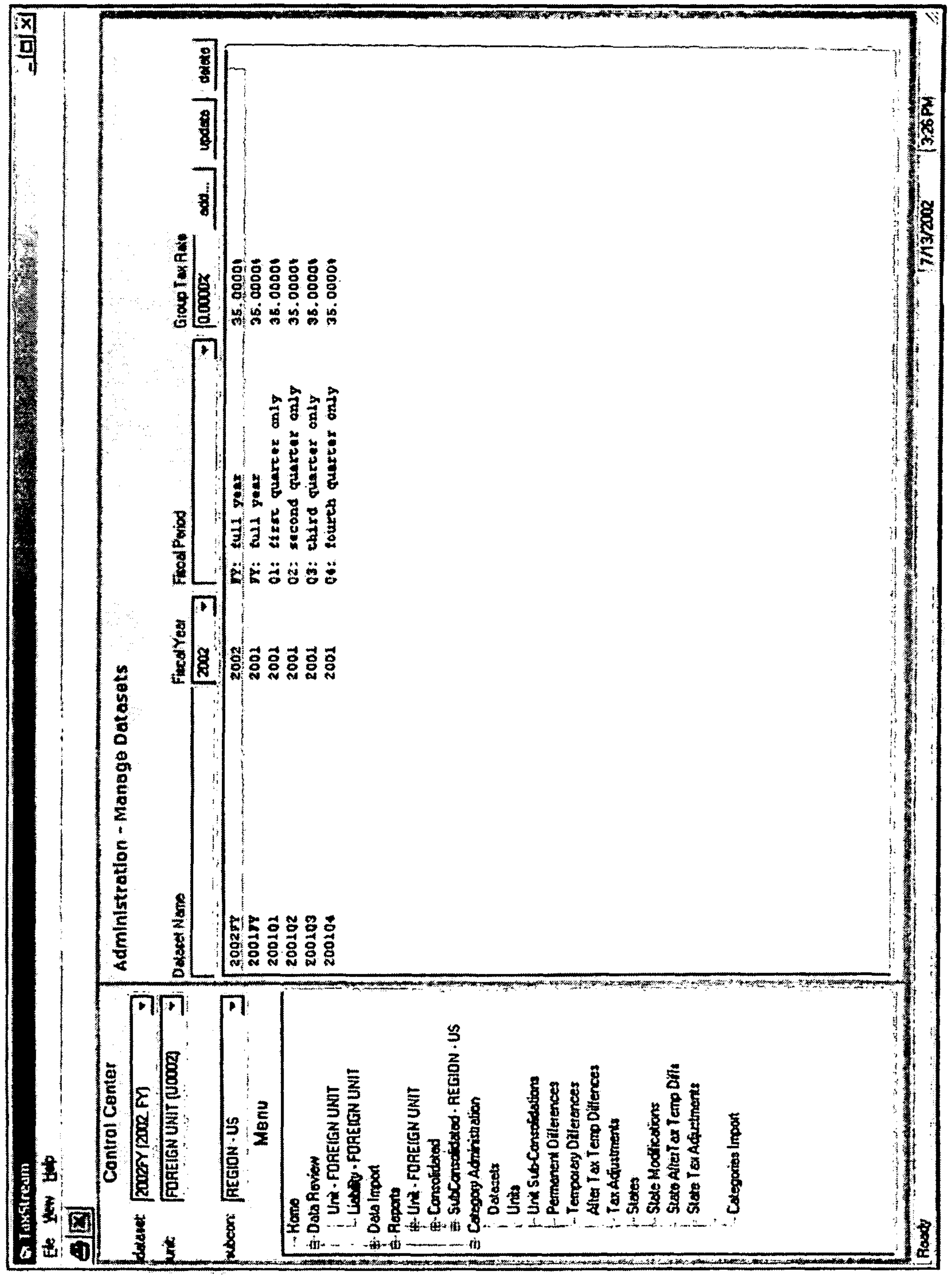
FIGS. 3A-3M are screen prints of a computer monitor display of the present invention and illustrates a preferred user interface for setting up datasets, including year, fiscal period and group tax rate with options for copying datasets and rolling over information from prior periods and also illustrate a preferred user interface for setting up categories to control business units, temporary differences, permanent differences and tax adjustments and a spreadsheet to expedite this process with an electronic upload of federal data and which is provided with the system as well as spreadsheet entry.
Figure 3B:
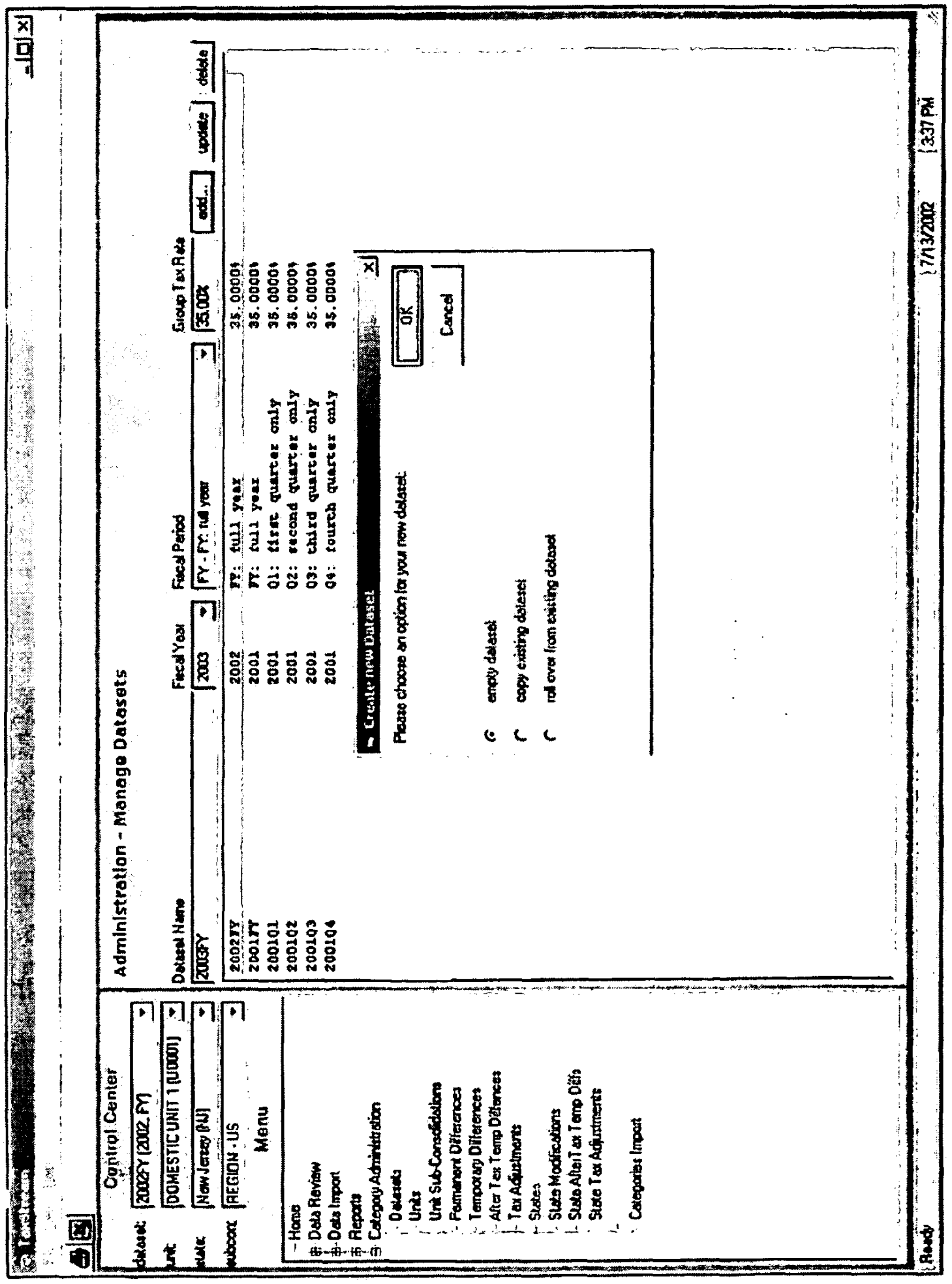
Figure 3C:
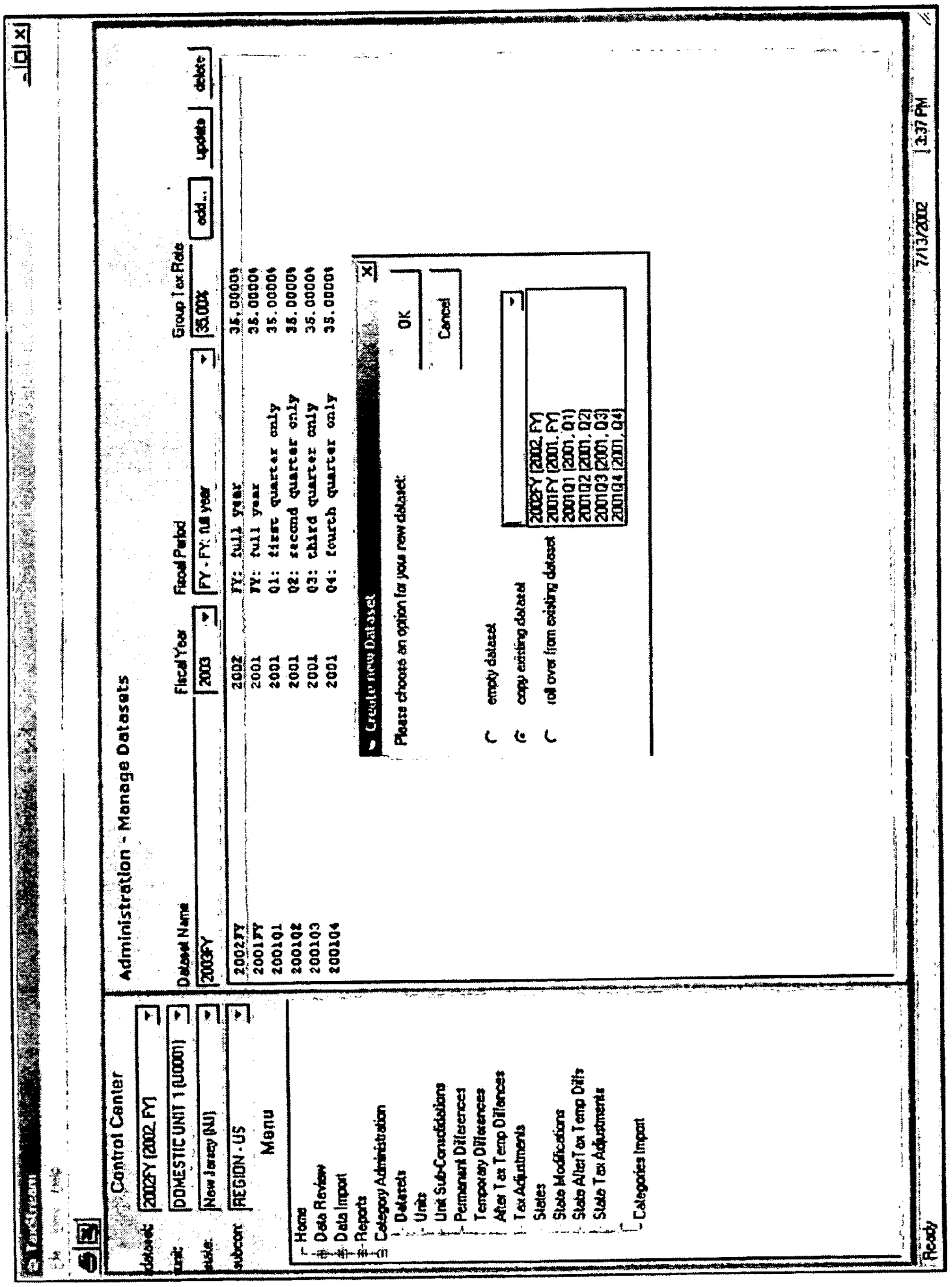

FIGS. 3A-3I illustrate administrative screens for administering categories for the system, such categories including datasets, business units, business unit sub-consolidations, permanent differences, temporary differences, after tax temporary differences, tax adjustments, states, state modifications, state after tax temporary differences, state tax adjustments, import categories and administration of users. FIGS. 3A-3C illustrate administrative screens that are used to setup and maintain the unique organizational structure of the business. These screens enable the user to configure the system to replicate the key tax parameters of the business in a database format. FIG. 3A is an administrative screen used to manage setup and maintenance of datasets. The user provides a unique name for the dataset to be setup, selects a fiscal year, selects a fiscal time period such as 1st quarter, 2nd quarter, full year, etc, and selects an overall statutory tax rate for the group. The user is then prompted to choose one of three options:

1. Create an empty dataset. This option creates a new dataset with no data other than the names of the business units.

2. Copy an existing dataset. This option creates a new dataset that is a complete copy of an existing dataset.

3. Rollover from an existing dataset. This option creates a new dataset whose beginning balances are rolled over from an existing dataset of a contiguous time period.

This process is illustrated in FIG. 3B where the "empty dataset" option is selected and FIG. 3C where the "copy existing dataset" option is selected. The dataset feature enables the user to copy data that has been reviewed by outside auditors or the appropriate managers and then to make modifications for testing purposes. For example, if management desires to simulate the company's tax return, it can make a copy of the tax provision dataset and then make the modifications necessary to make a correct filing. Once inside the database, it is possible to compare all of the fields populated in the tax provision dataset with fields populated in the return dataset for analytical purposes. Datasets can also be used to keep a record of changes that have been made during the process of preparing the tax provision. These earlier versions can be used as a trail that tracks all changes made to the database during the process of closing the books.

The dataset feature can also be used to compare changes in key line items from quarter to quarter and from year to year. Prior periods can be simulated for purposes of estimating the effect of audit adjustments proposed by revenue authorities. Future periods can be simulated for budgeting and planning purposes.

FIGS. 3D-3H illustrate screens used to create categories for individual business units, sub-consolidations, permanent differences, temporary differences, tax adjustments and to load these categories for a business unit.

Figure 3D:
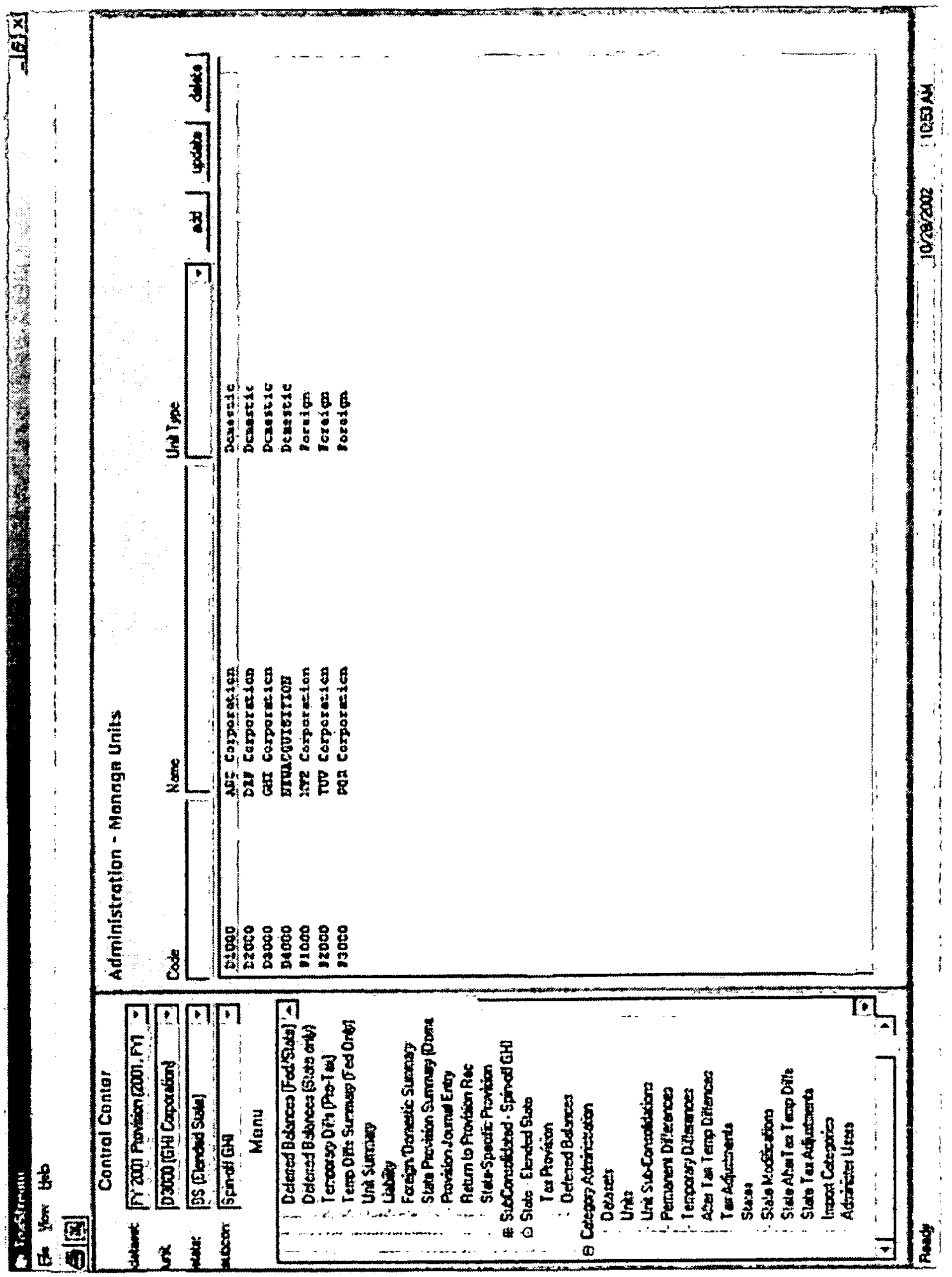

FIG. 3D illustrates an administration screen for managing the setup and maintenance of business units by allowing entry and modification of a business unit code, a business unit name and a business unit type (such as domestic or foreign.). In FIG. 3D, the user sets up a business unit by assigning it a unique user-defined alpha or number code and a name. The user is then prompted to label the unit as being foreign or domestic. This is done so that all data linked with this unit can be separated out later for domestic or foreign reporting purposes. The business unit can be a corporation or a partnership, but it can also be a division or even a product within a corporation or partnership.

Figure 3E:
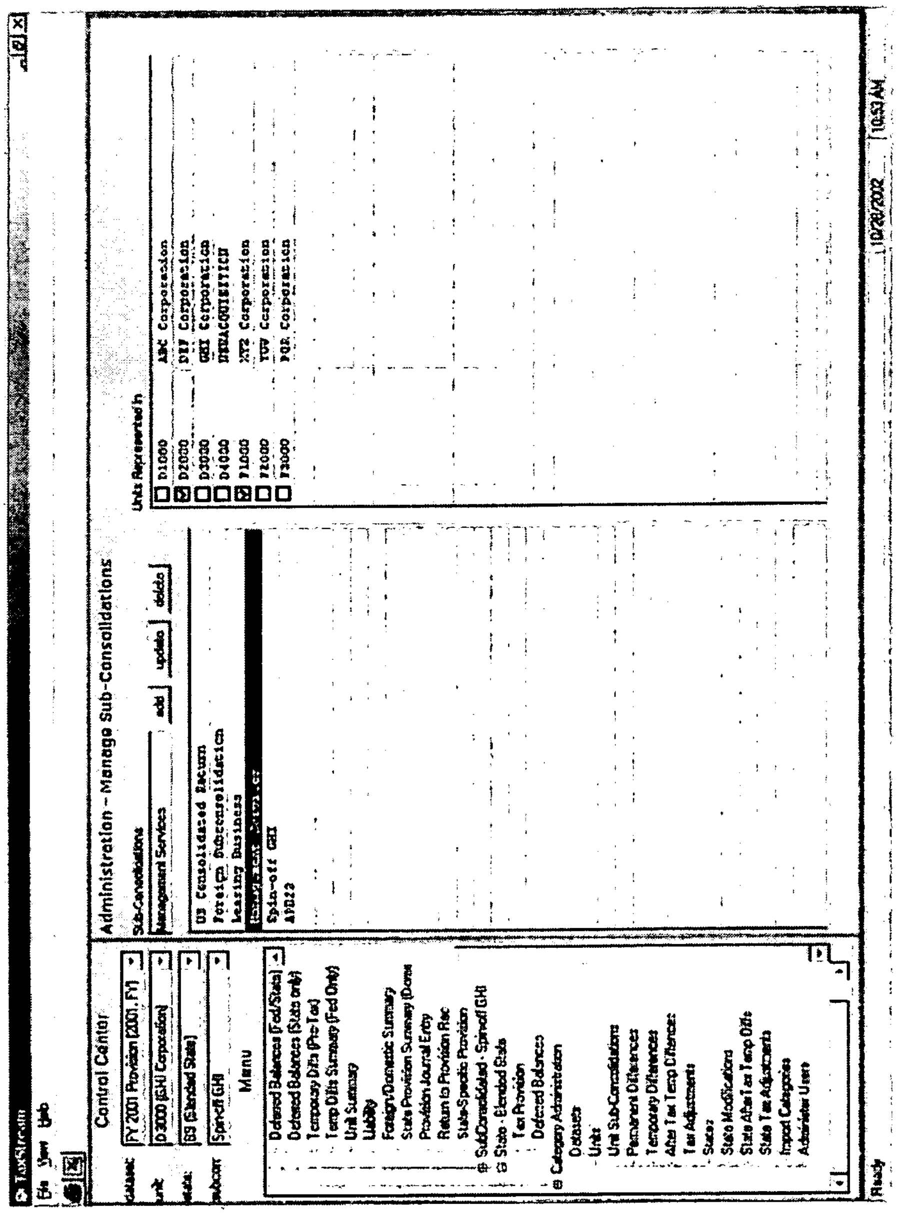

FIG. 3E illustrates an administrative screen for managing sub-consolidations by allowing entry and modification of a sub-consolidation identifier and the identification of the business units represented within that sub-consolidation identifier. FIG. 3E illustrates administrative screens used to setup user-defined sub-consolidations. The existing sub-consolidations are shown on the left and the choice from among all of the units setup in the system is available on the right. The user designates those units to be included in each unique sub-consolidation by pointing and clicking Units that have not been selected are excluded from the sub-consolidation. All reports which are available at the unit or consolidated level can be viewed at the sub-consolidation level. The sub-consolidation feature can be used to rebuild divisions or products back up into the appropriate corporate entities.

Figure 3F:
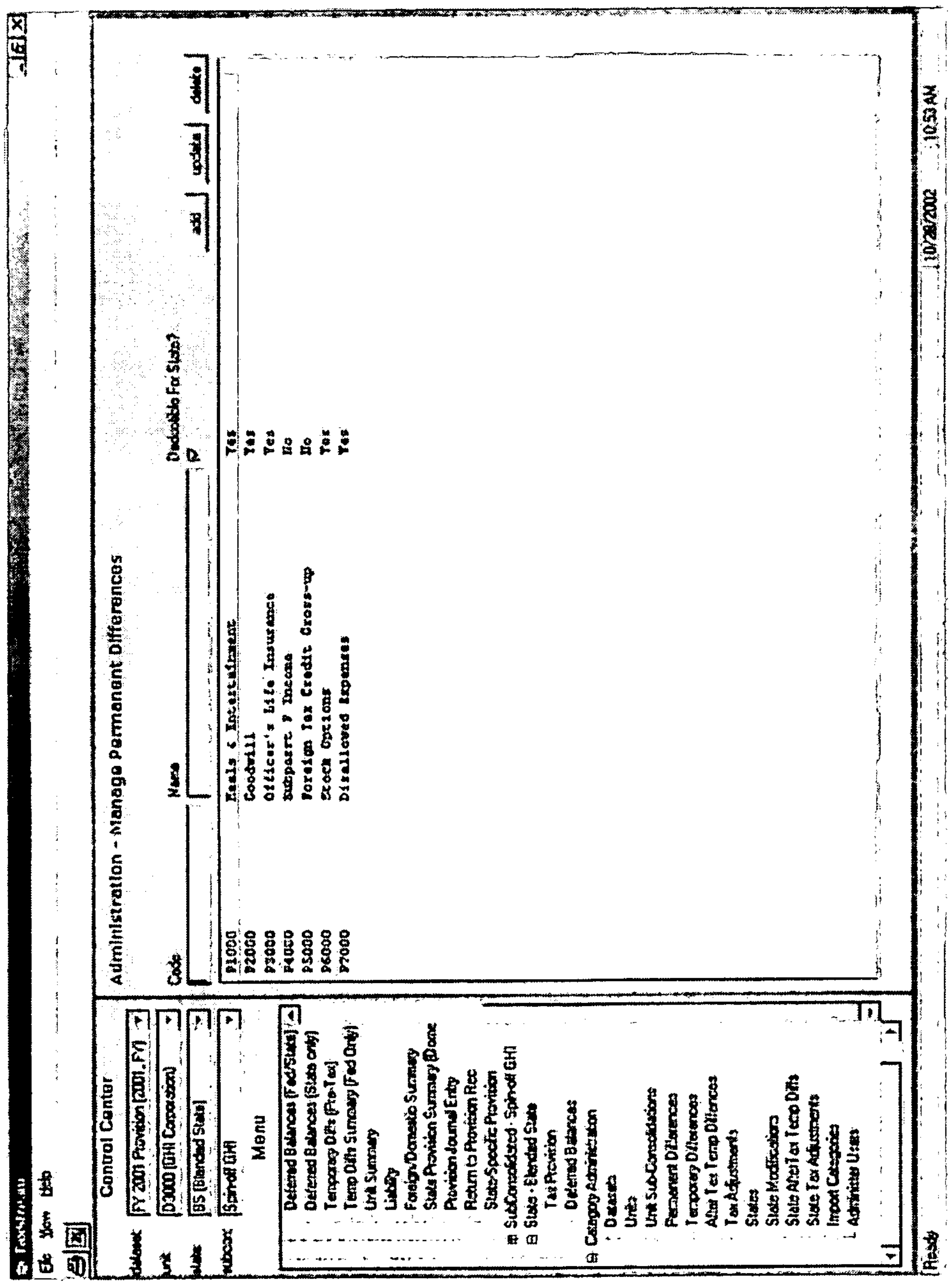

FIG. 3F illustrates an administrative screen for managing the setup and maintenance of permanent differences by allowing entry and modification of an identification code for each permanent difference, a name for each permanent difference and a designation of whether or not the permanent difference is deductible for state tax purposes. In FIG. 3F, the user sets up a permanent difference by assigning it a unique user-defined alpha or number code and a name. Permanent differences are pretax differences between the tax return and the source accounts (such as GAAP statements, IAS statements, management reports, or statutory reports) that will never reverse themselves. Examples include certain types of goodwill and disallowed expenses, such as meals and entertainment. The user is then prompted to label the permanent difference as being included or excluded for all state tax purposes. This simplifies the state tax computations so that the individual permanent difference does not have to be adjusted on each state tax calculation.

Figure 3G:
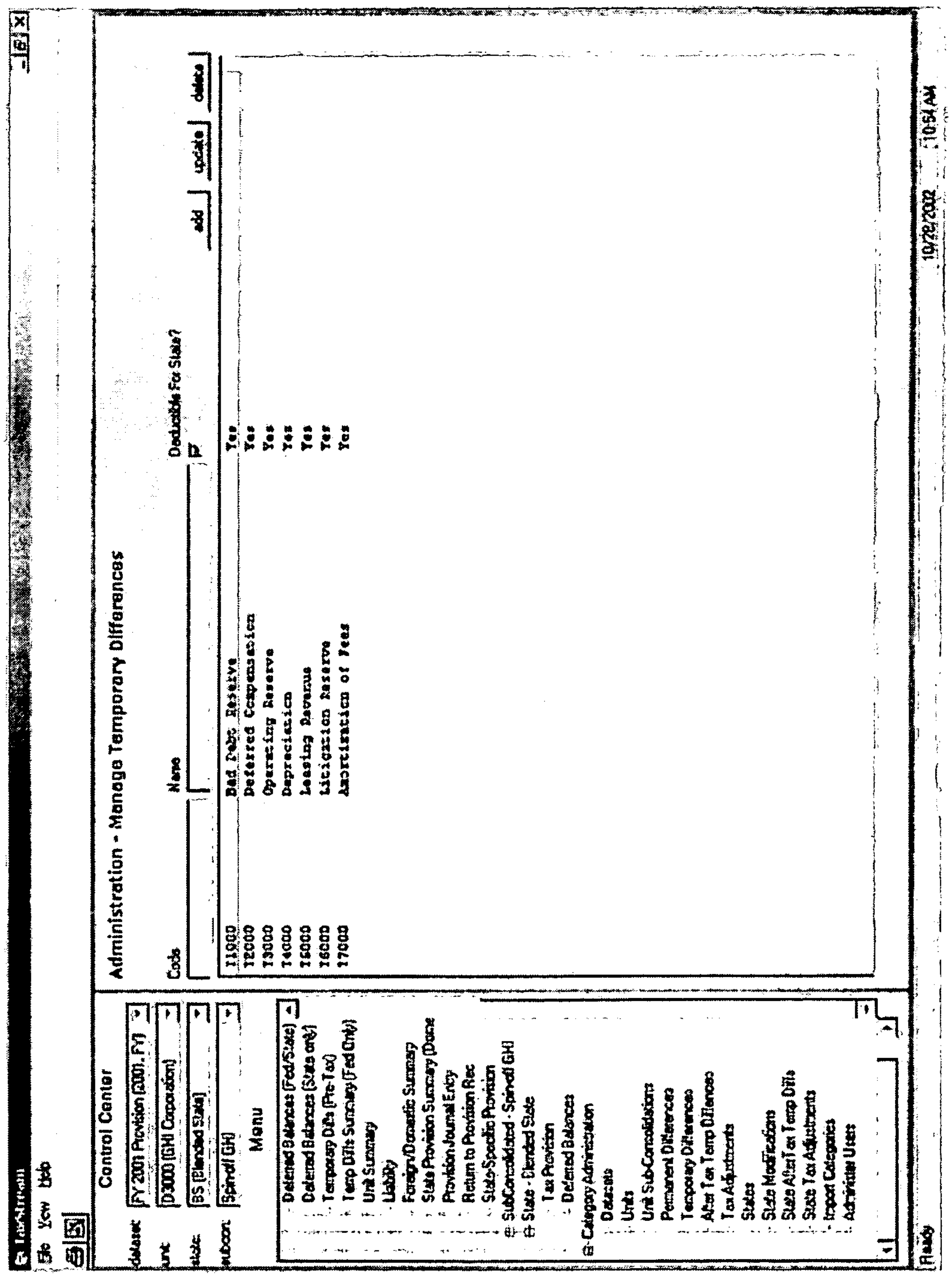

FIG. 3G illustrates an administrative screen for managing the setup and maintenance of temporary differences by allowing entry and modification of an identification code for each temporary difference, a name for each temporary difference and a designation of whether or not the permanent difference is deductible for state tax purposes. In FIG. 3G, the user sets up a temporary difference by assigning it a unique user-defined alpha or number code and a name. Temporary differences are pre-tax differences between the tax return and the source accounts (such as GAAP statements, IAS statements, management reports, or statutory reports) that will in the future reverse themselves. Temporary differences include items such as inventory reserves and bad debt reserves. The user is then prompted to label the temporary difference as being included or excluded for all state tax purposes.

Figure 3H:
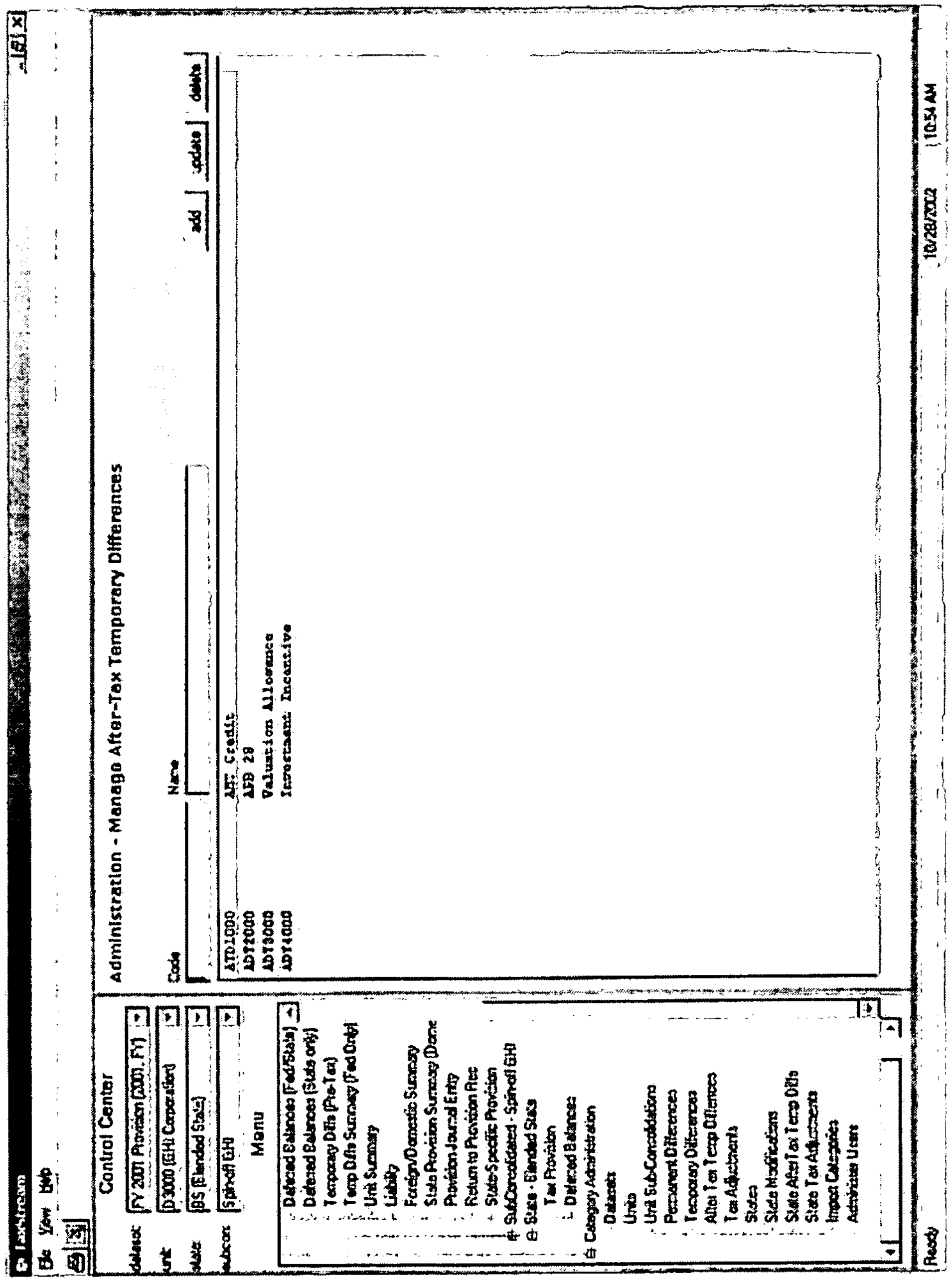
Figure 3I:
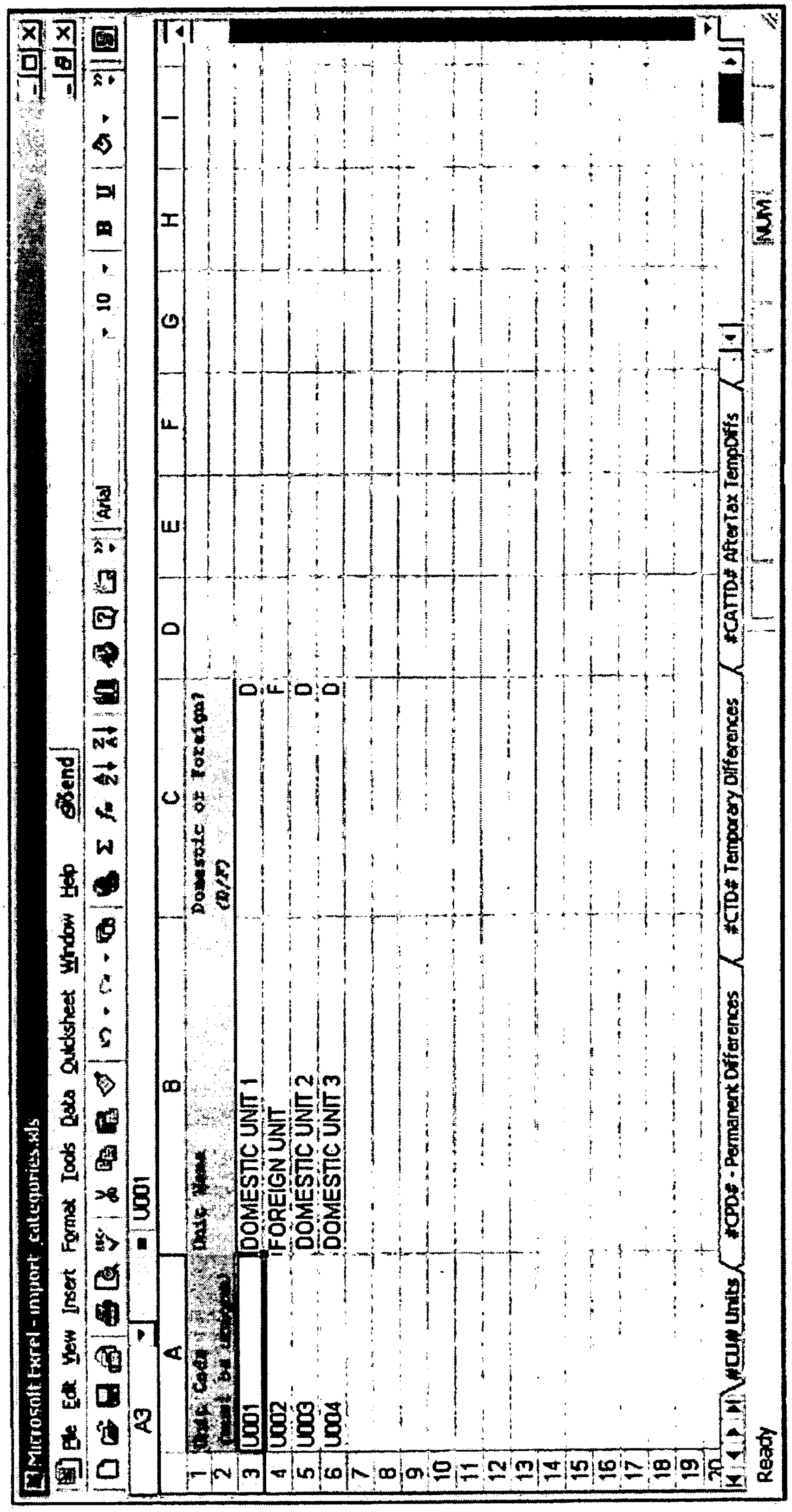
Figure 3J:
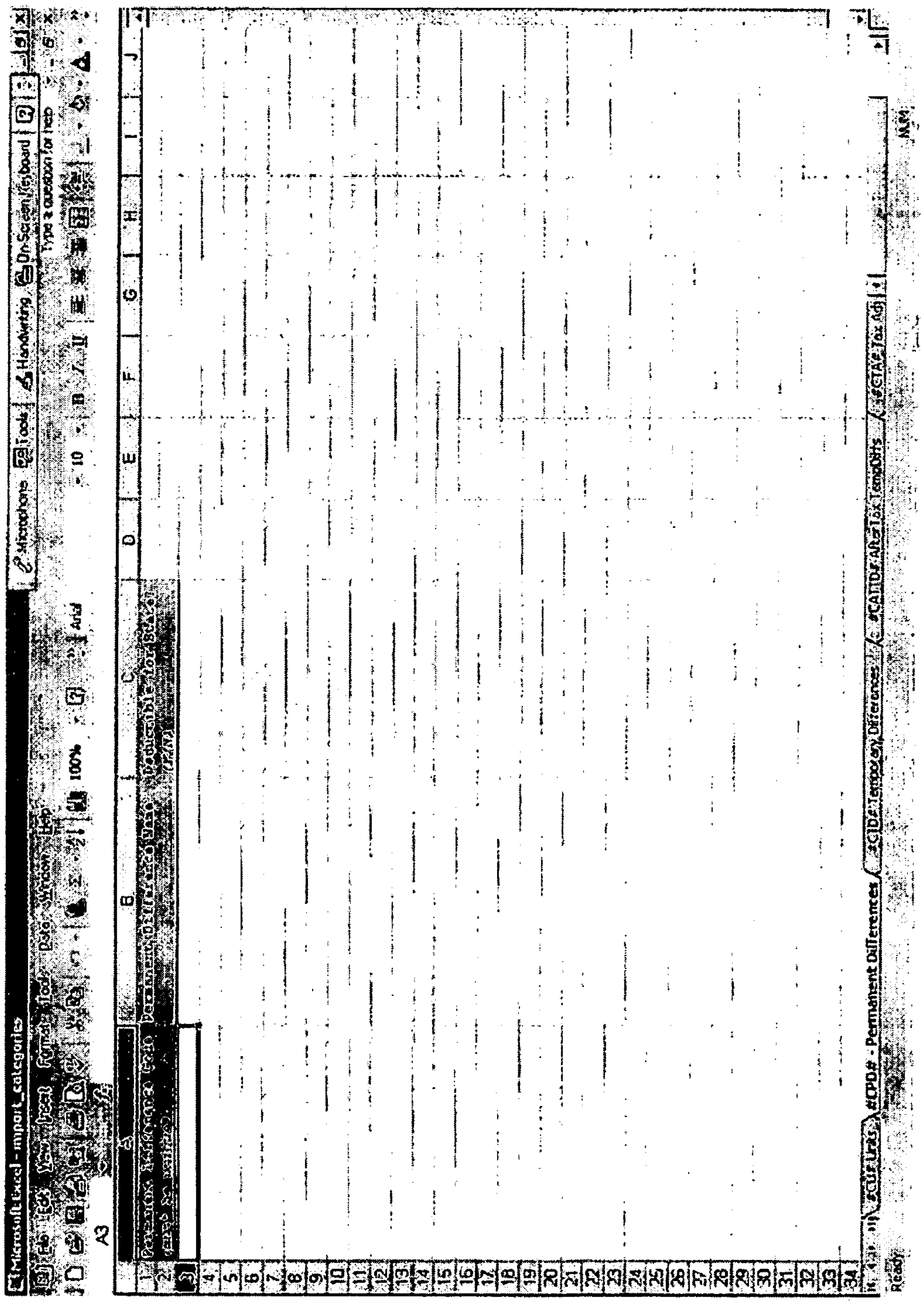
Figure 3K:
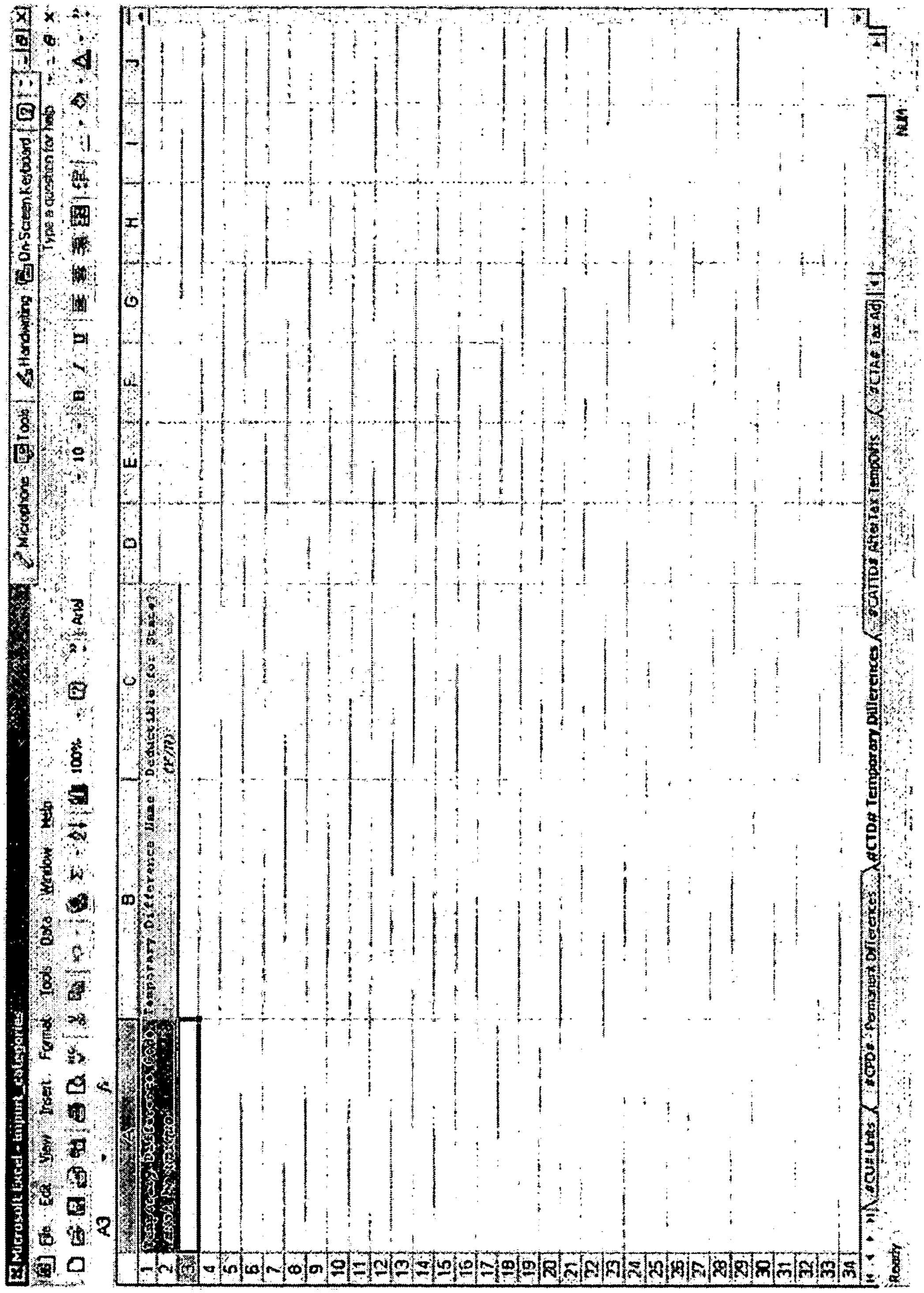
Figure 3L:
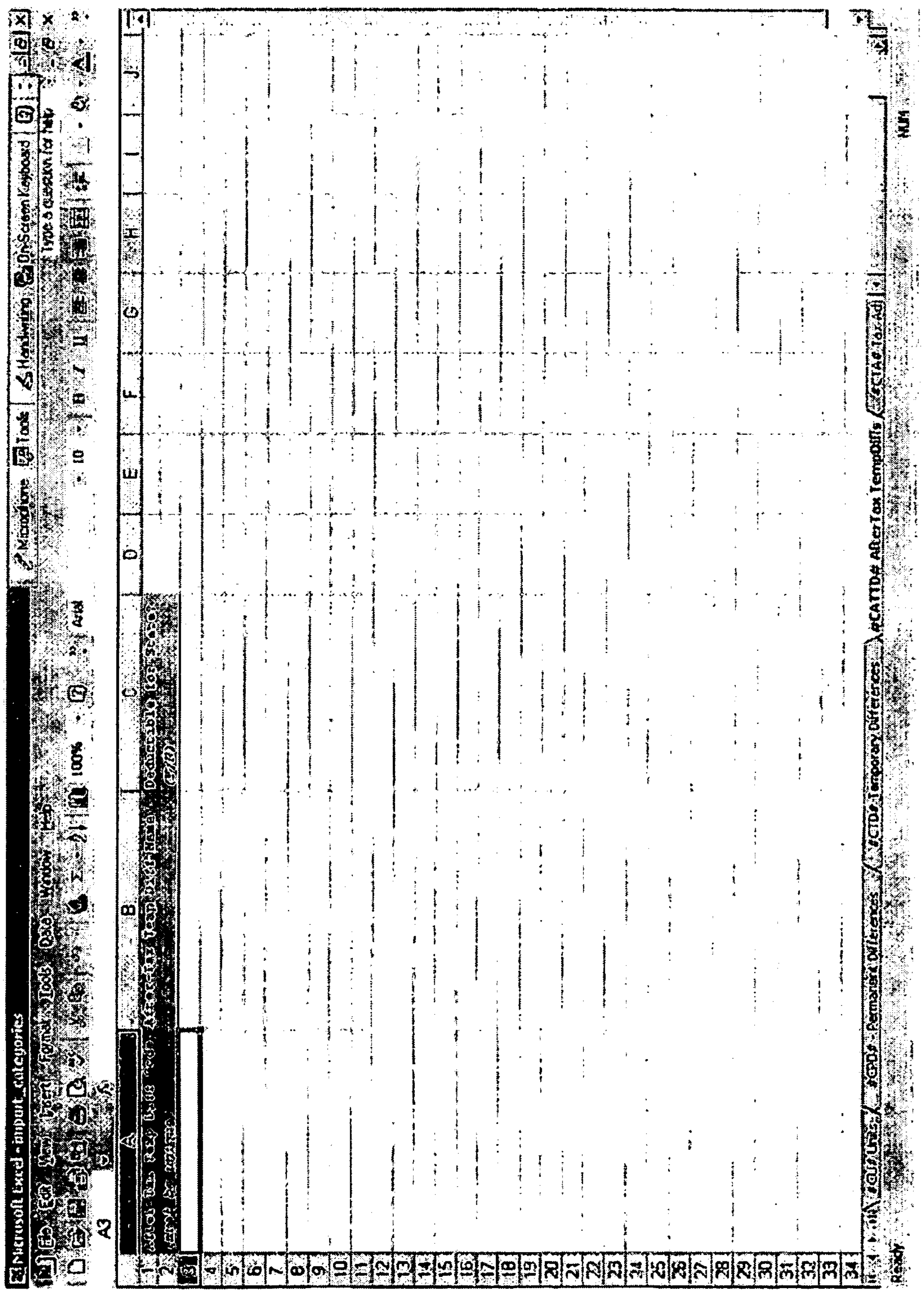

FIG. 3H illustrates an administrative screen for managing the setup and maintenance of after-tax temporary differences by allowing entry and modification of an identifying code for each after-tax temporary difference and a name for each after-tax temporary difference. In FIG. 3H, if the user needs to establish after tax temporary differences for discrete items such as tax credits or alternative minimum tax, these items can be setup in the same manner as pretax temporary differences. These would typically be after tax differences that will be realized in future years.

In setting a tax adjustment category, the user sets up a tax adjustment by assigning it a unique user-defined alpha or number code and a name. Tax adjustments are after tax changes made to the federal current provision only. Examples include various types of federal credits and surtaxes that affect the current period.

Figure 3M:
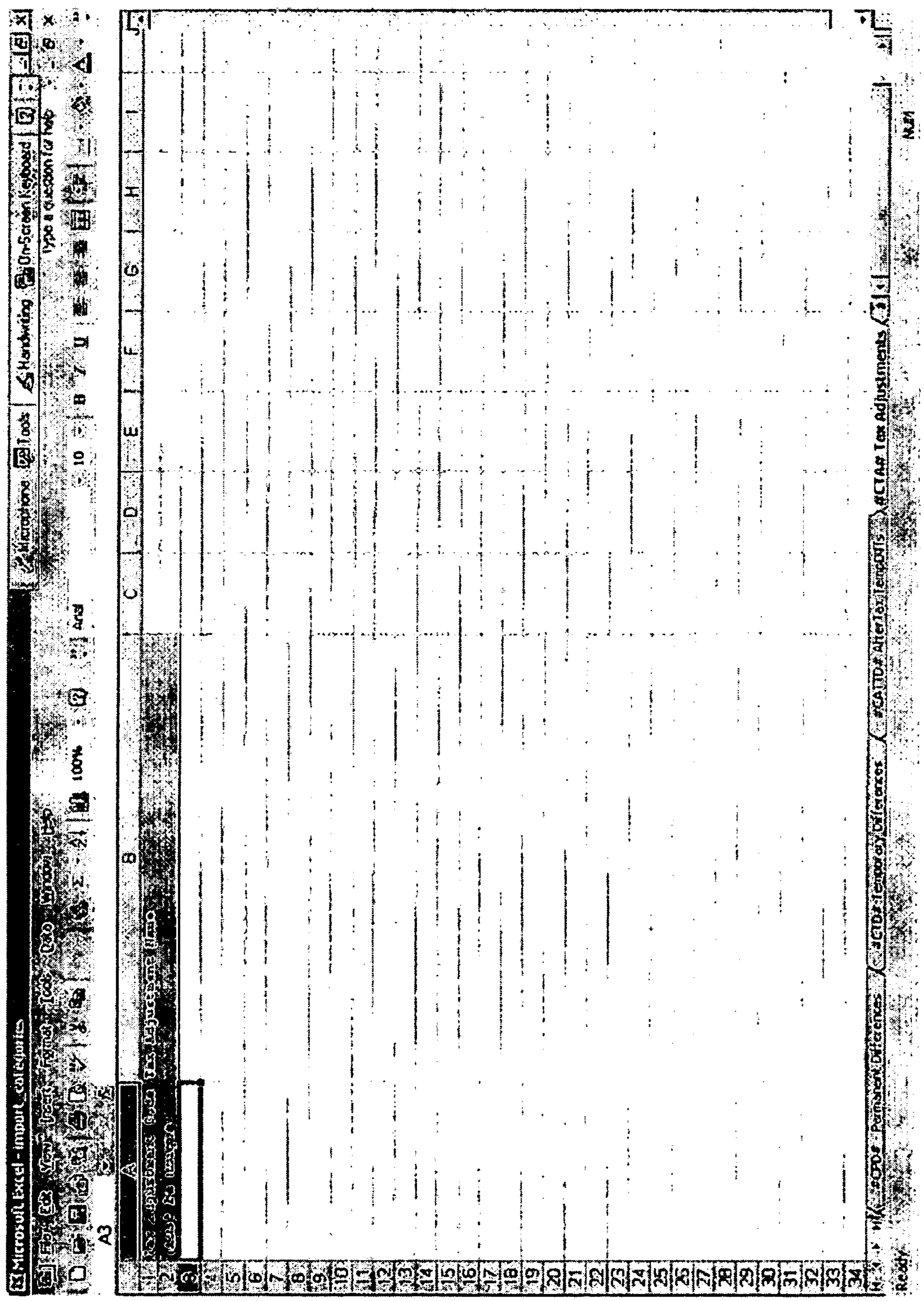

FIGS. 3I-3M are spreadsheets that may be used to electronically load the categories for the business unit (FIG. 3I), permanent difference (FIG. 3J), temporary differences (FIG. 3K), after-tax temporary differences (FIG. 3L) and tax adjustments (FIG. 3M). These are used where the number of categories is voluminous and the setup process needs to be streamlined. Most often, these spreadsheets are used as part of an installation procedure.

Figure 4A:
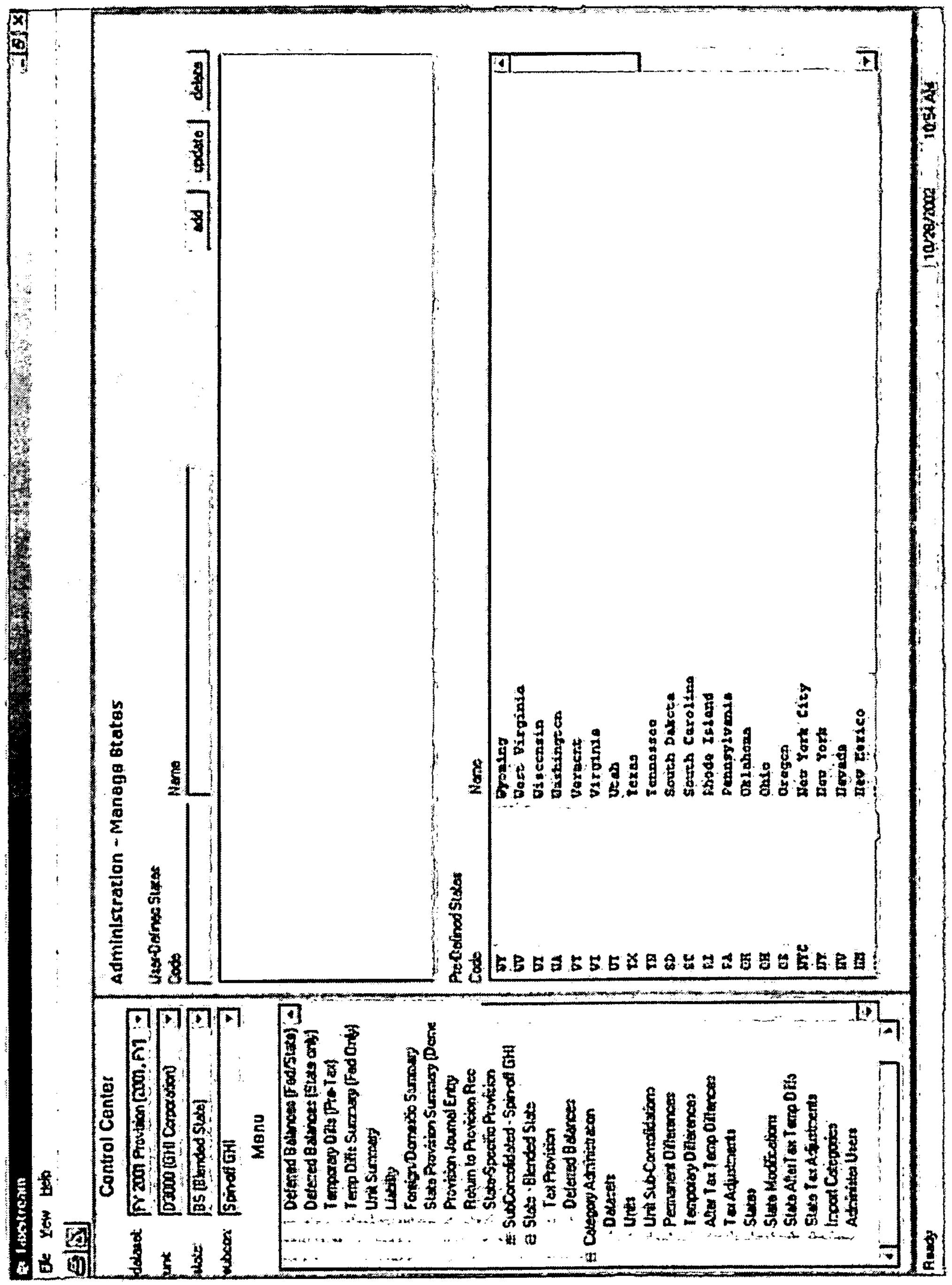
FIGS. 4A-4H are screen prints of a computer monitor display of the present invention and illustrate a preferred user interface for setting up categories to control state tax modifications and adjustments and spreadsheets to expedite this process with an electronic upload of this state data and which is provided with the system.
Figure 4B:
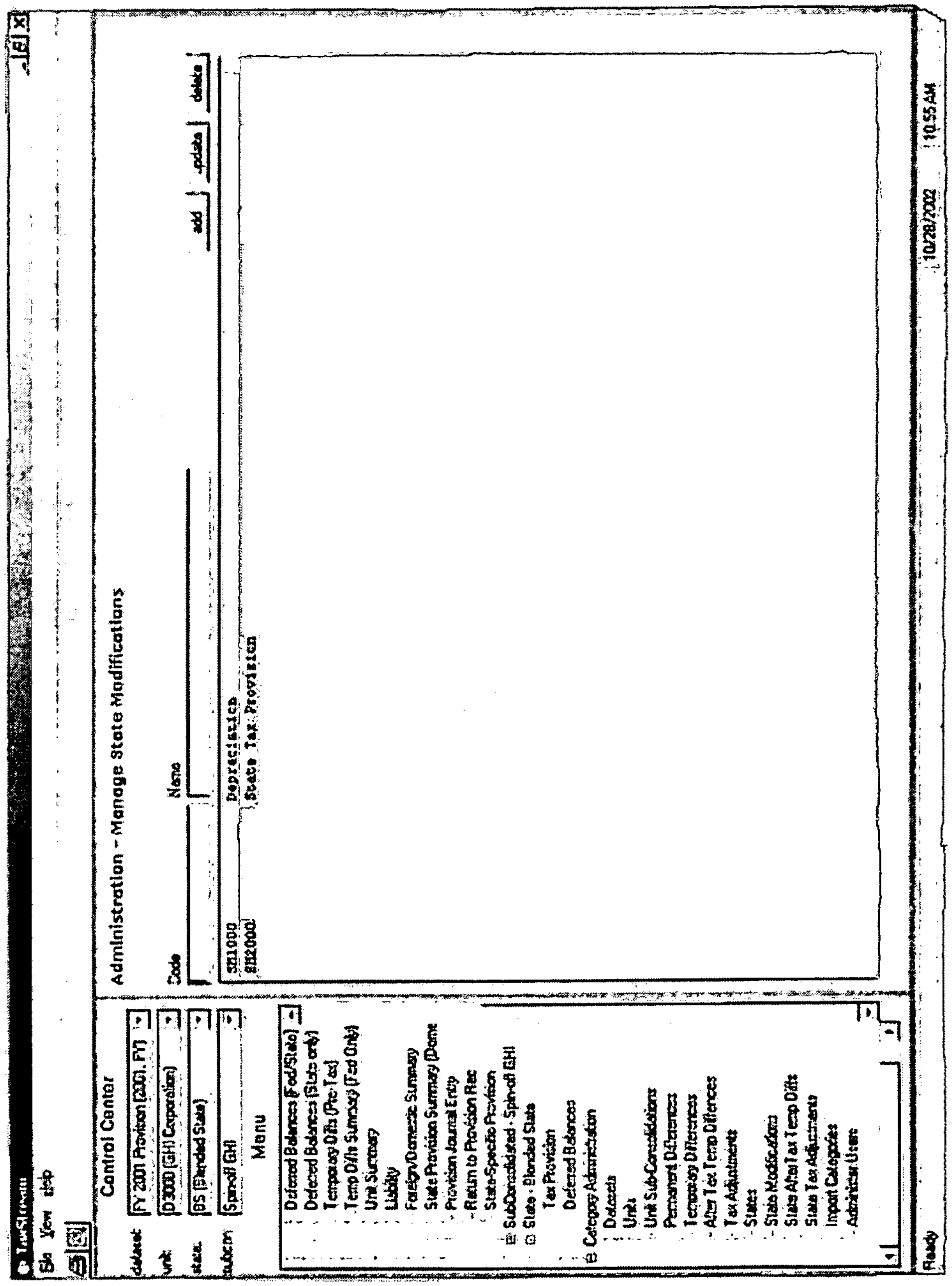
Figure 4C:
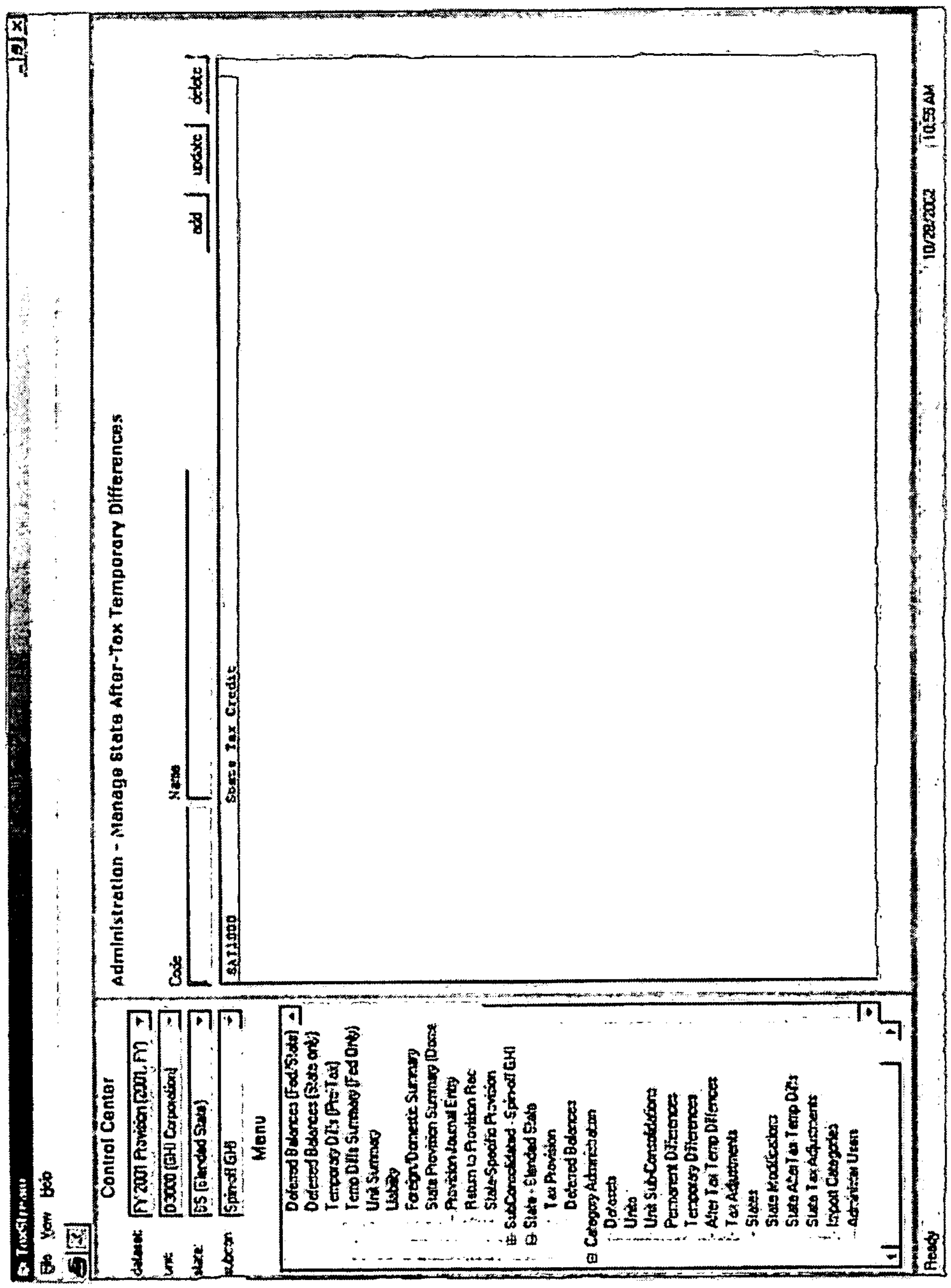
Figure 4D:
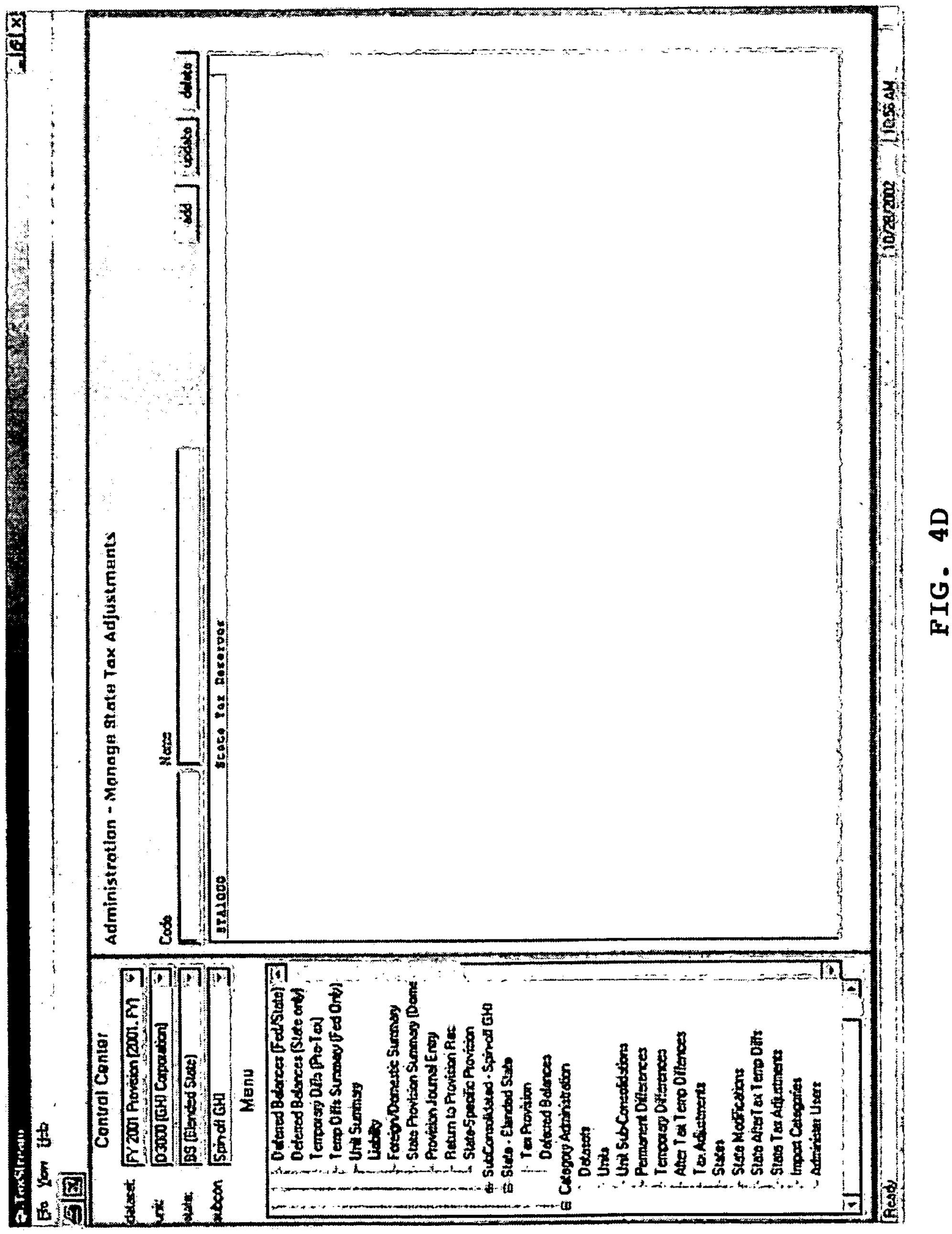
Figure 4E:
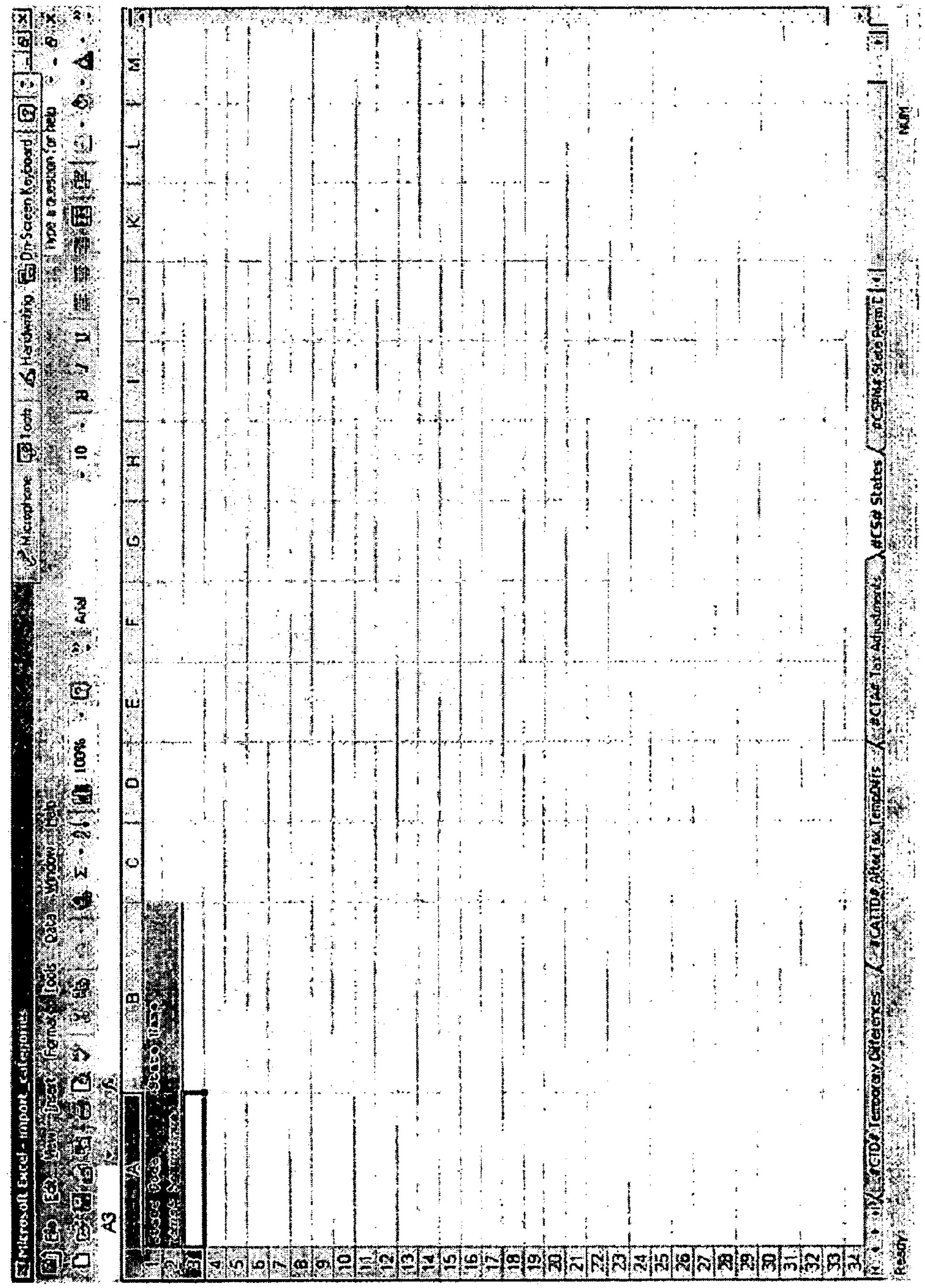
Figure 4F:
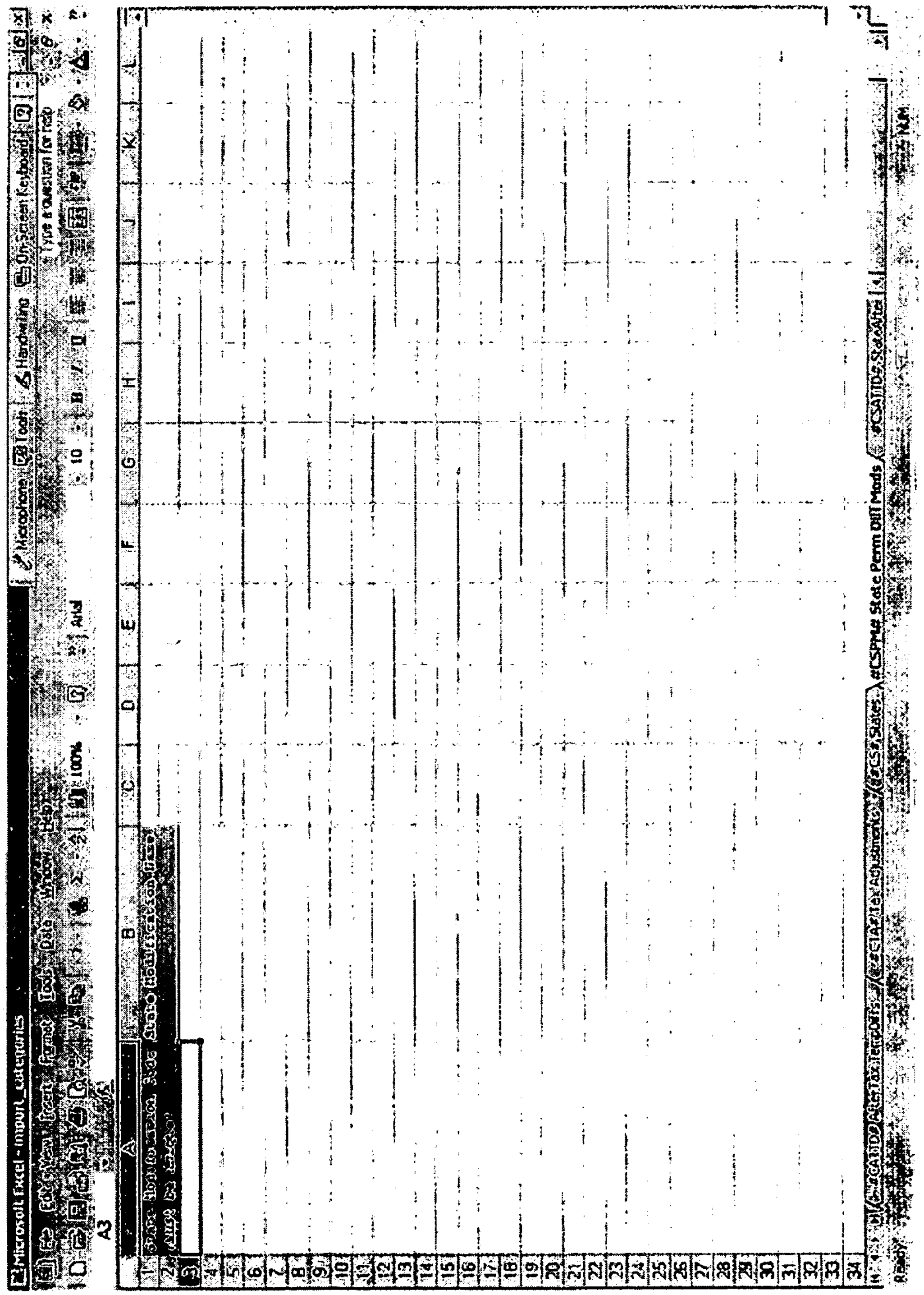
Figure 4G:
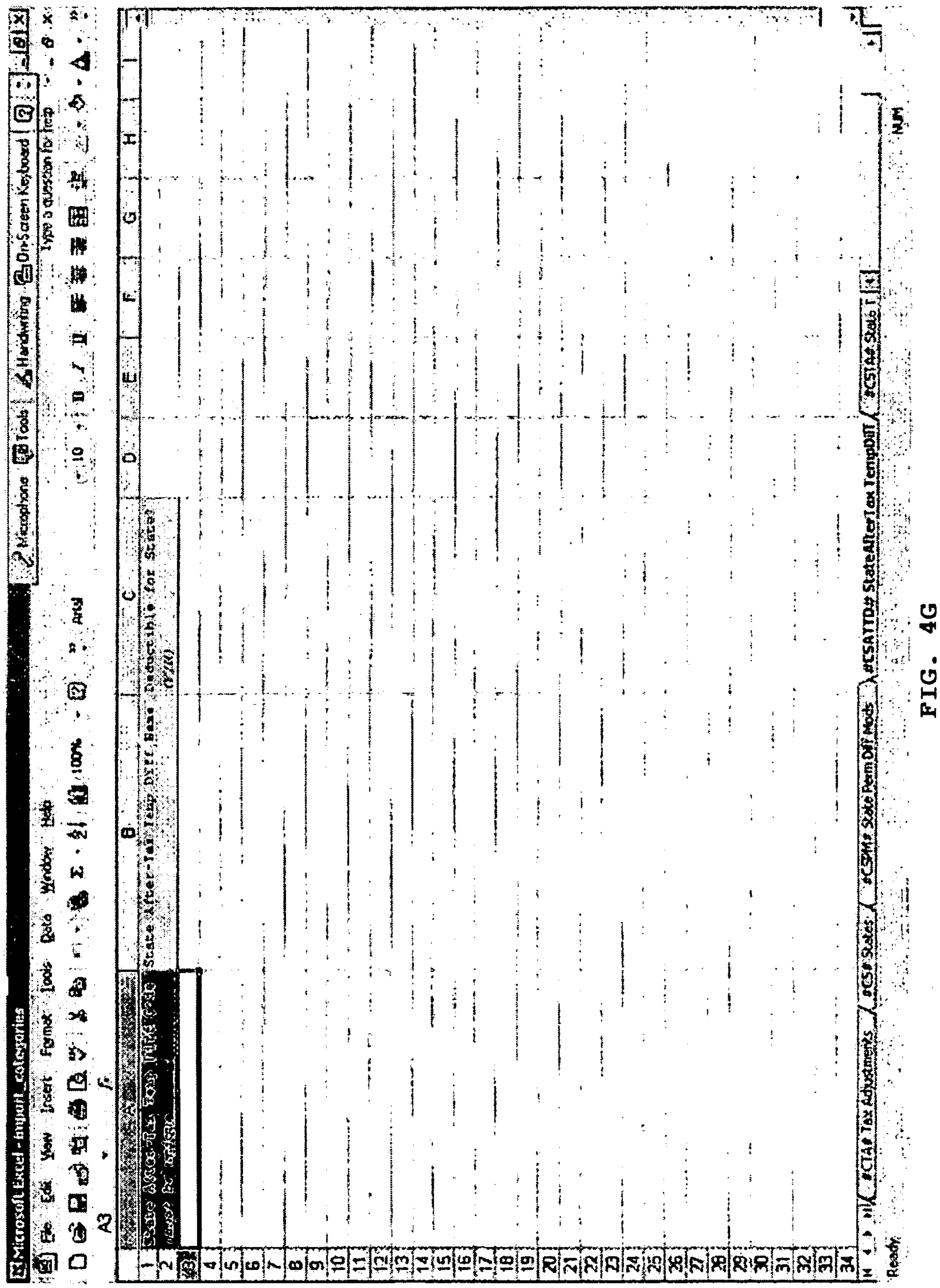
Figure 4H:
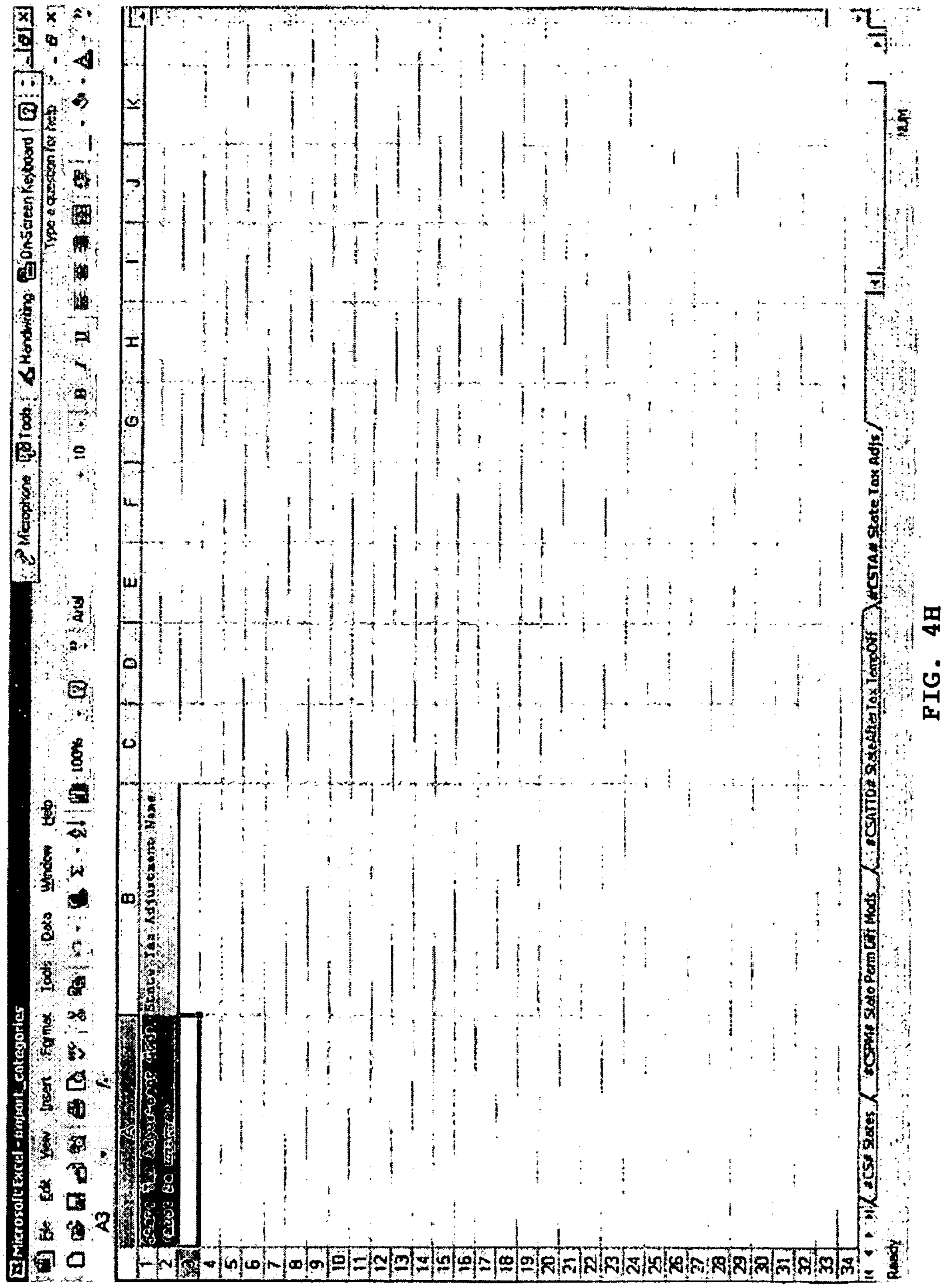

FIGS. 4A-4D illustrate an administrative interface used to set categories to control the user-defined modifications and after tax adjustments needed to simulate the state tax accounts. These categories, once established, can be used for all states. FIG. 4A illustrate an administrative screen for managing the setup and maintenance of state information by allowing entry and modification of a user-defined states code, a user-defined states name, a pre-defined states code and a pre-defined states name. FIG. 4B illustrates an administrative screen for managing the setup and maintenance of state modifications information by allowing entry and modification of a state modification code and a state modification name. FIG. 4C illustrates an administrative screen for managing the setup and maintenance of state after-tax temporary differences by allowing entry and modification of a state after-tax temporary difference code and a state after-tax temporary differences name. FIG. 4D illustrates an administrative screen for managing the setup and maintenance of state tax adjustments by allowing entry and modification of a state tax adjustments code and a state tax adjustment name. State modifications are in effect pre-tax permanent differences made to adjusted federal taxable income. The categories for state tax modifications and state tax adjustments are setup for all states, but can be viewed for any single unit. Federal taxable income must be modified to arrive at income apportionable to the state. The apportionment percentages control the income to be apportioned. The state tax rates and the state tax credits are used to create the final state tax liability. The after tax adjustments made at the state level are similar to the tax adjustments noted above which are made at the federal level in that they only affect the current tax provision. As in the case of setting up federal categories, spreadsheets are available to setup the state categories. In this regard, see FIGS. 4E-4H.

Figure 5:
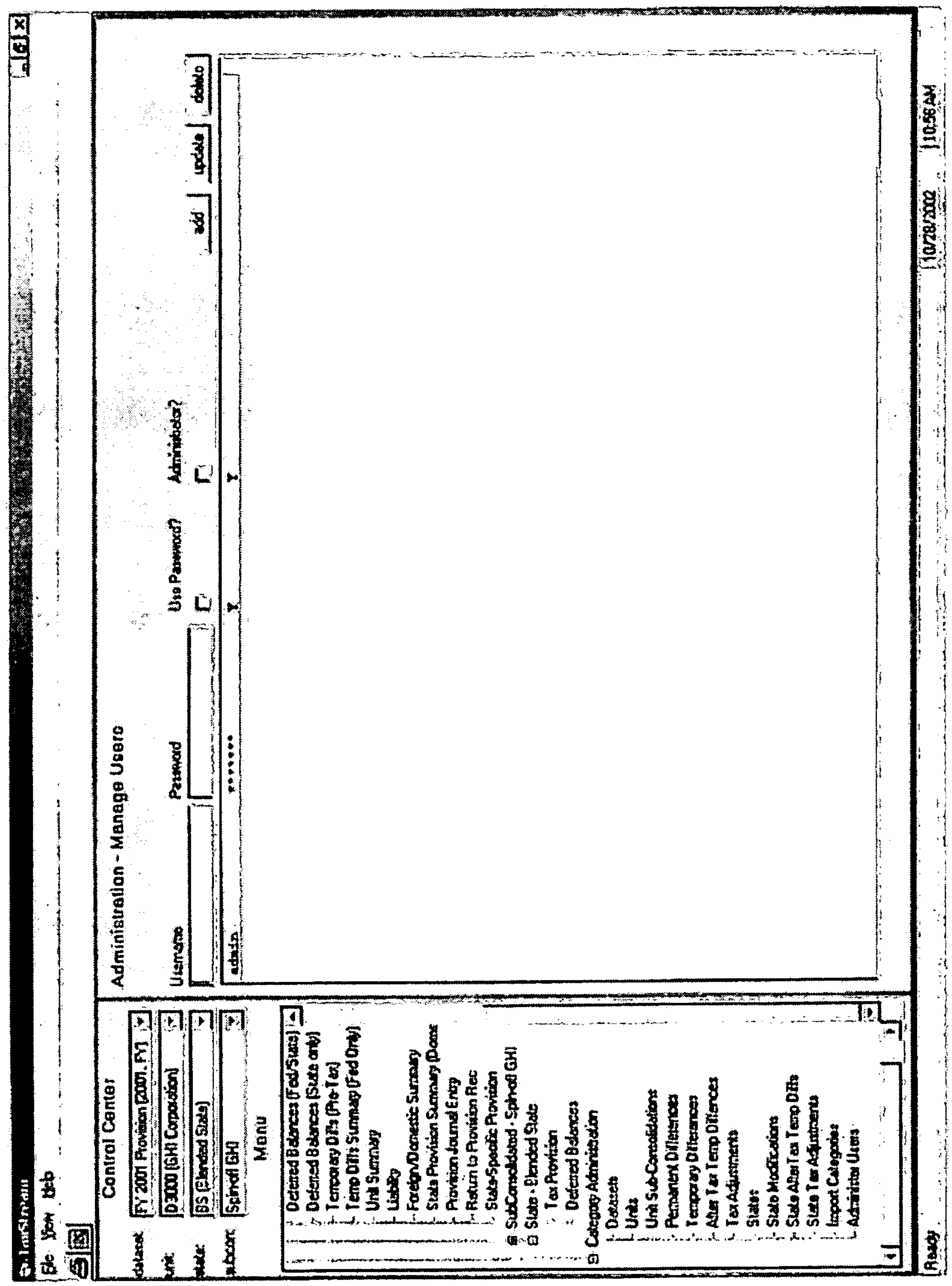
FIG. 5 is a screen print of a computer monitor display of the present invention and illustrates a preferred interface for setting up users.

FIG. 5 illustrates an administrative screen for managing the setup and maintenance of user information by allowing entry and modification of a username, password, a designation of whether or not the user uses a password and a designation of whether or not the user is an administrator.

The sub-consolidation functionality is a key compliance and planning feature of the system of the present invention. Sub-consolidations are used to simulate different reporting structures and what-if scenarios by including or excluding the units established in the system. For example, if 8 out of 10 units are included in a certain business group, a sub-consolidation that includes only those 8 entities will produce a set of tax accounts that are relevant to the management of that business group. Similarly, if management of the entire affiliated group desires to know the tax consequences of spinning off one unit, a sub-consolidation, which excludes that unit will produce the appropriate what-if scenario. The functionality of the sub-consolidation feature increases with the level of detail established in the initial setup of the database. For example, if the management needs to see the tax attributes of specific divisions or products within a given legal entity, business units could be defined as divisions or products. This would allow for reporting to take place across products, divisions, legal entities, or groups of all three. This provides significant analytical capabilities that can closely parallel the actual information structures of the business.

Data is entered in any of four ways: (a) through a bridge which links the system to the external data source such as the general ledger, (b) using EXCEL spreadsheets which allow you to upload data, (c) manual overrides using the Review Screens under the Menu, (d) over the internet.

To upload data from EXCEL spreadsheets under the template subdirectory, the user will find two spreadsheets, “Import Categories” (used to load in categories) and “Import Numbers” (used to load in numbers). Data from legacy systems can be cut and pasted into the spreadsheets for easy loading.

To enter data over the internet—Reports and Review Screens can be viewed and operated as a website. A user working in a remote area can log onto a website and enter data directly through the Review Screens. The user can toggle between Reports and Review Screens, entering data and then viewing its effect on the financial results. The Internet application can be used to allow foreign reporting units to enter their data over the Internet in local currency. The system will convert these results into the functional currency used in the consolidation. All data imported through the bridge or EXCEL spreadsheets can be modified or overridden on the Review Screen.

Figure 6A:
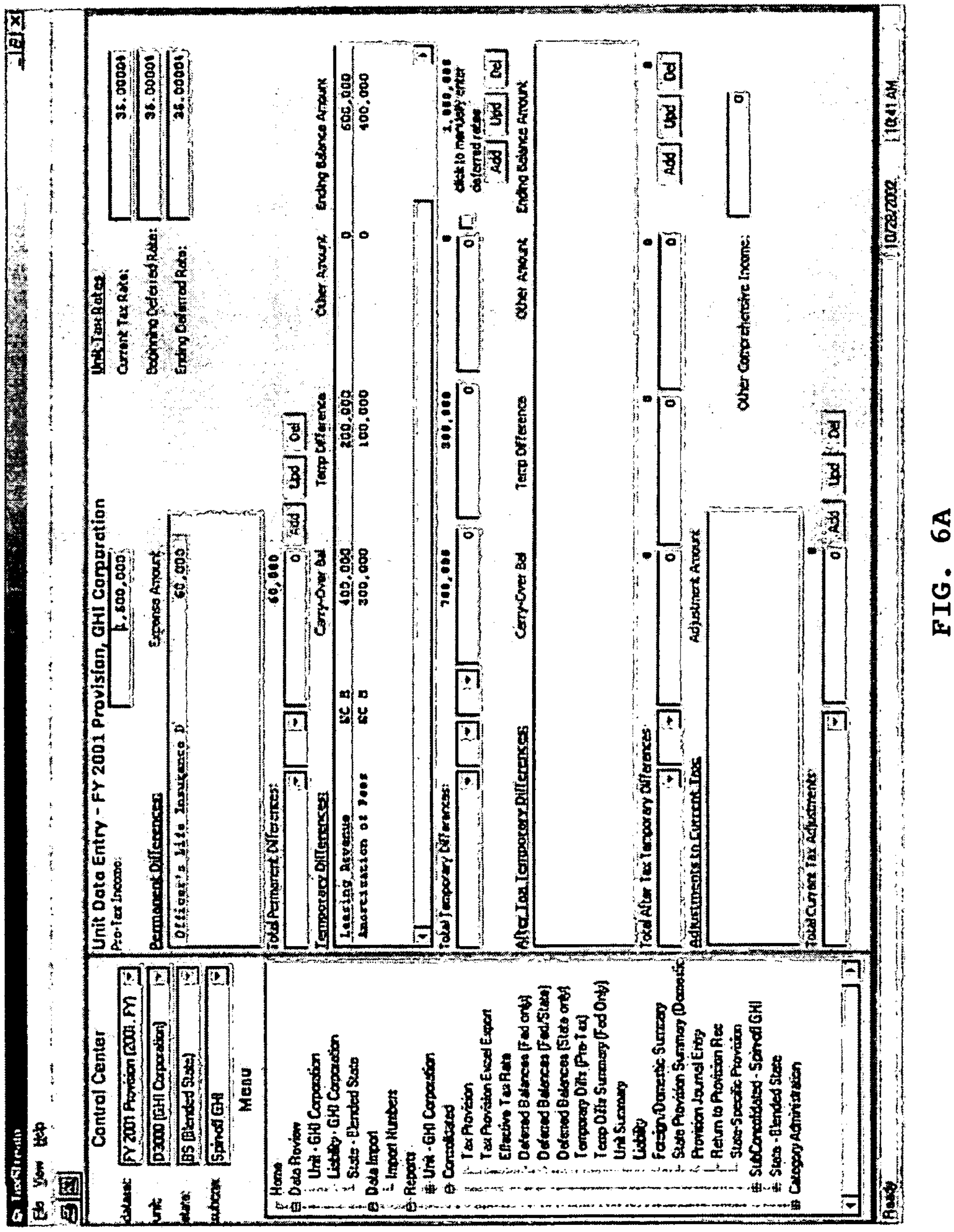
FIGS. 6A-6E are screen prints of a computer monitor display of the present invention and illustrate a preferred user interface for setting up unit information and illustrates a preferred user interface for entering, viewing and modifying business unit tax rate, temporary differences, permanent differences, different tax rates used to compute deferred tax items and tax adjustments and a spreadsheet designed to expedite the importation of figures with an electronic upload and which is provided with the system.
Figure 6B:
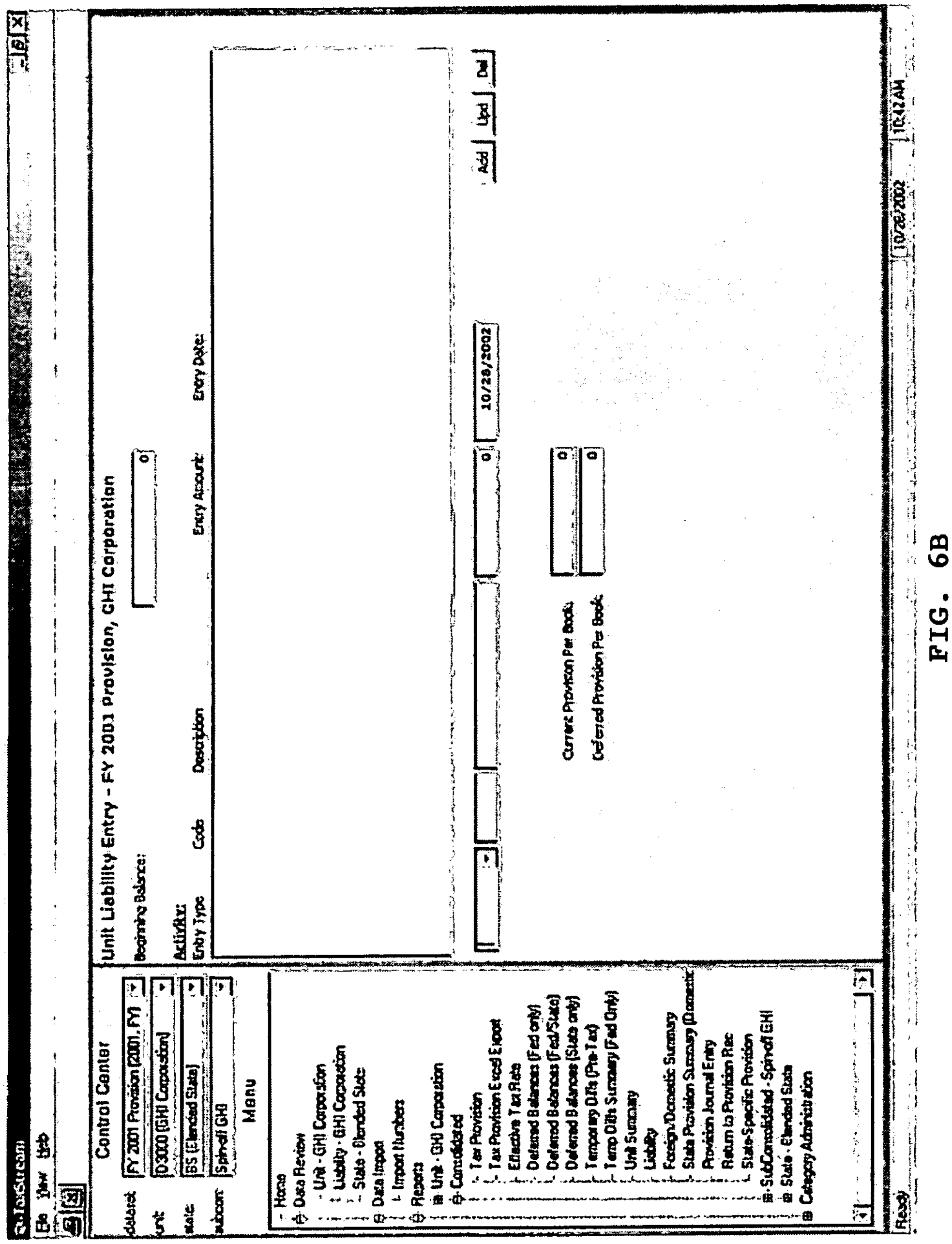
Figure 6C:
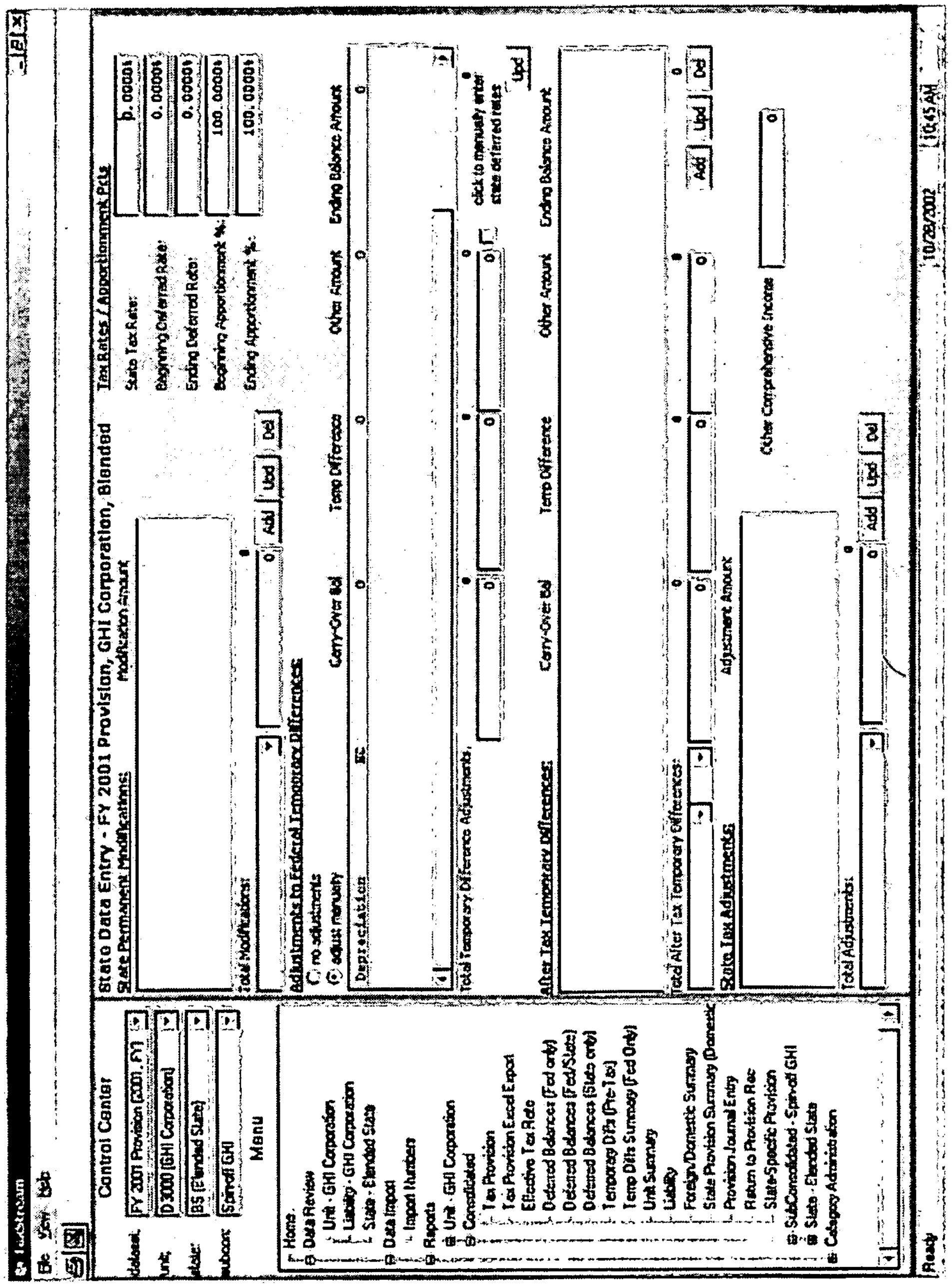

FIGS. 6A-6C illustrate a preferred user interface for entering, viewing and modifying the group tax rate, units, temporary differences, permanent differences, different tax rates used to compute deferred tax items and tax adjustments. Further, FIGS. 6A-6C illustrate the method of viewing and controlling federal current and deferred data at the unit level through the use of review/input screens. The first three clusters within the control center and beneath the drop down boxes control the choice of review/input screens for the federal tax data related to the selected unit. Review/Input screens related to the current liability are in the second tree cluster. Review/Input screens for state tax data are controlled in the third tree cluster. These screens provide the user with a dynamic interface that allows the user to view and modify the data for the unit. Separate Review/Input screens are provided for the computation of the current and deferred provisions, the taxes payable account and each individual state or local taxing authority.

FIG. 6A is a review/input screen that displays all of the federal tax information in the database (excluding the current tax liability account which is controlled by a separate Review/Input screen—FIG. 6B) and allows the user to make modifications. The user can enter and modify the following fields at the business unit level:

1. Pre-tax book income. This can be financial income or income computed for any other regulatory purpose.

2. Permanent differences. Separate controls are provided for each permanent difference between the tax return and the financial or management accounts whose tax effect is shown on the income statement, and those that are shown as equity adjustments on the balance sheet. For "Permanent Difference", a user may select either "D—Deductible on Income Statement" or "E—Equity Adjustment" for this entry. Entries marked "D" will be included in all federal and state current tax provision calculations. Entries marked "E" will be tracked separately and reversed out of the income statements. Examples of entries marked "E" include stock options not expenses on the financial statements, but deductible for tax purposes.

3. Temporary differences. The Carryover Balance is the prior period's ending deferred items, expressed as a pre-tax balance. The Temporary Difference column represents adjustments to book income, which are necessary to arrive at taxable income. Entries in this column are tax-effect and are automatically posted to both the current and deferred provisions. Entries in Other column are not offset against the current provision, but change the ending balance in the deferred balances and, ultimately the deferred provision reported on the income statement. Each line item is identified as a current or non-current temporary difference for later classification on the balance sheet. The Ending Balance is a computed figure and represents the pretax closing balance in the deferred tax accounts. The user can specify unique federal tax rates at which any given temporary difference is expected to reverse. This is done by clicking on the "Manual Override" button that allows the user to enter a tax rate different than the default rate shown in the upper right hand corner of the Review/Input screen. For Temporary Difference, a user may select either current or non-current ("C" or "NC") for the Permanent Difference. The user may enter the Carryover Balance, Temporary Difference and Other amounts on a pre-tax basis.

4. After-tax temporary differences. These are after-tax federal adjustments, such as tax credits, to be used in a future period that need to be computed and tracked on an after-tax basis. An After-Tax Temporary Difference is a temporary difference, such as a tax credit to be utilized in the future that is recorded on an after-tax basis. Valuation allowances are also often recorded as an after tax line item.

5. Adjustments to Current Tax. These are after tax adjustments to the current federal tax provision that is computed by the system. Tax Adjustments are after-tax changes made to the current provision at the federal level only.

6. Tax Rates. Beginning federal tax rates are used to value the beginning deferred tax balances. Ending federal tax rates are used to value the ending deferred tax balances and the computation of the current tax expense.

7. Foreign Currency Translation Rates. On Review/Input screens for foreign units that do not use the U.S. dollar as their functional currency, the translation rates for beginning balances, ending balances and the weighted average rates to be used in the computation of the current and deferred provisions, are entered in this area. The CTA is a foreign currency adjustment made to foreign units that use a currency different than the functional currency of the consolidation. The deferred tax provision is computed by taking the difference between the beginning balance in the deferred accounts (translated at the exchange rates in effect at the beginning of the year) and the ending balance in the deferred accounts (translated at the exchange rates in effect at the end of the year). The CTA appears on the Tax Provision report as a line item adjusting the deferred tax provision so that it is reported at the weighted average exchange rate for the year. The ending balance in the deferred accounts is not affected by the CTA and is carried at the exchange rates in effect at the end of the year.

FIG. 6B illustrates a review/input screen for the current tax liability of a selected business unit. This screen tracks the balances, the tax payments, tax refunds, and adjustments that are made throughout the year, in either local currency or in US dollars.

FIG. 6C is a review/input screen for each individual state. The screen displays the computed federal taxable income for the unit (which is the starting point for most state computations), modifications, apportionment percentages, state tax rates and state tax credits and surcharges. Beginning and ending tax rates are shown, and are used to value deferred tax balances at the state level; apportionment factors are used to apportion federal taxable income to individual states. State Modifications are pre-tax changes that will be made to the current state tax provision. State Tax Credits are after-tax changes that will be made to the current state tax provision. An After-Tax State Temporary Differences is a temporary difference, such as a state tax credit to be utilized in the future, which is recorded on an after tax basis. Valuation allowances set up against state deferred tax balances are often recorded on an after tax basis.

Figure 6D:
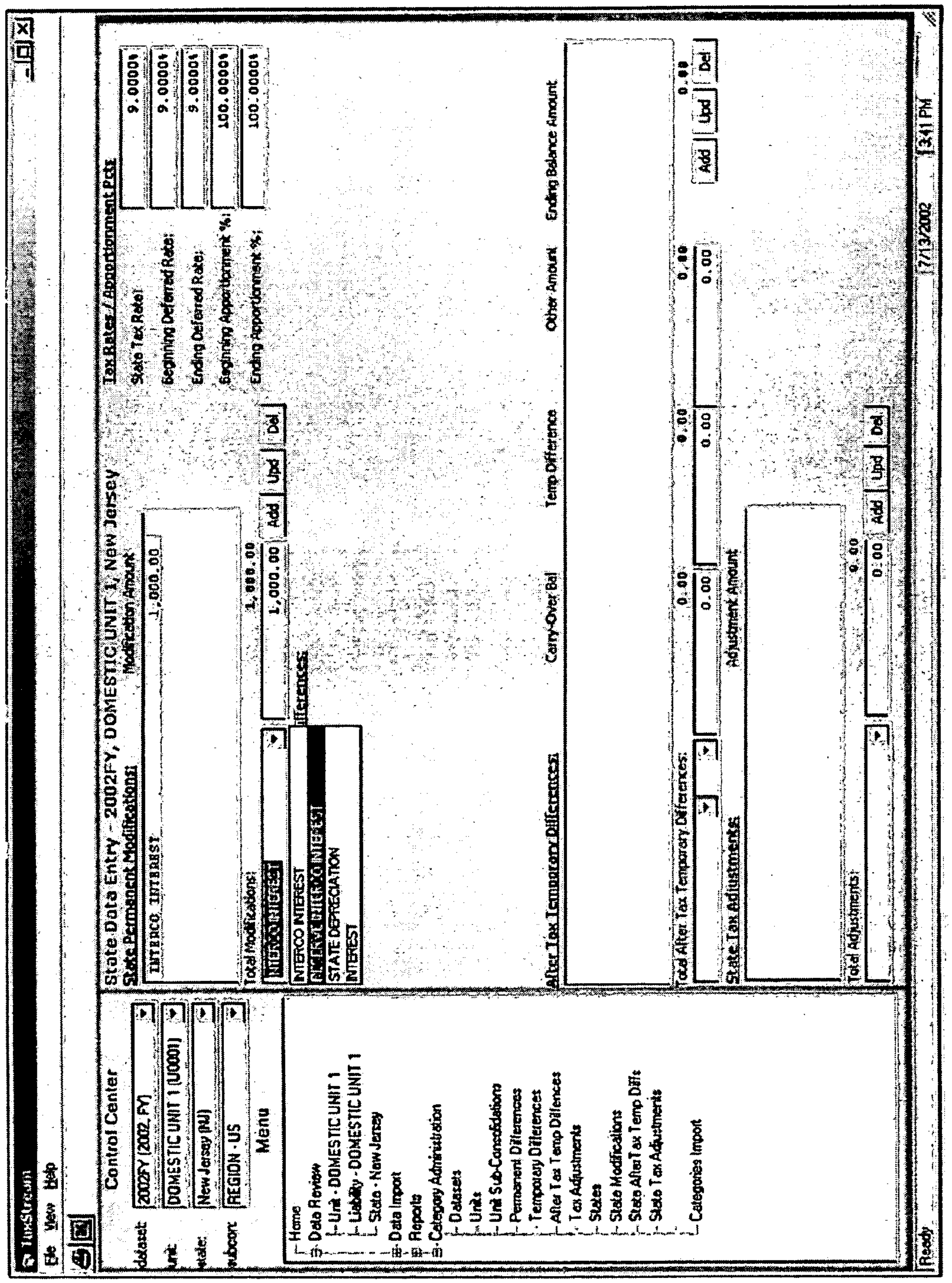
Figure 6E:
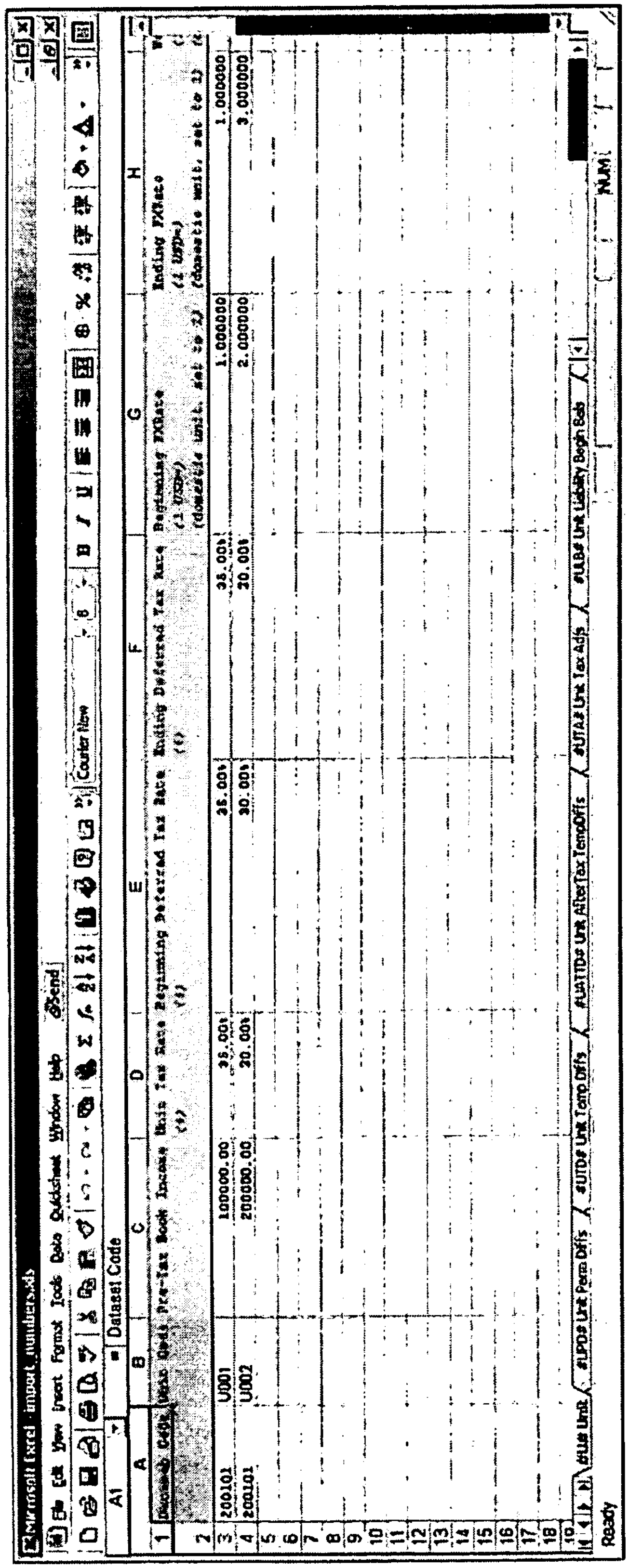

If the user requires the ability to track additional temporary difference between the federal tax return and the state tax return, the box shown on the state modification screen is checked and the user can add or subtract incremental changes to the book/federal return differences. This is often used where a state requires a method of depreciation that is different from both the financial statements and the federal tax return. This functionality is illustrated on FIG. 6D. As was the case in the federal screen where each temporary difference can be tax-effected at a different rate, so too the user can choose to tax effect a temporary difference at a different state rate. As in the case of the federal entries, the state entries can be loaded with a spreadsheet designed for that purpose. In this regard, see FIG. 6E.

The second tree cluster controls the reports that can be viewed at the consolidated, sub consolidated or single unit level. Individual state reports are available at the entity level. The dataset, unit and sub consolidated reports to be viewed are controlled by the corresponding drop down boxes shown above in the Control Center.

FIGS. 7A-7K are examples of sample unit reports, which provide the data needed to report and analyze the tax profile of a given unit at the entity level. The reports are formatted in a manner that will help to meet the financial reporting requirements for the unit and analyze the components of the effective tax rate.

FIGS. 8A-8J are examples of sample consolidated reports which provide the data needed to report and analyze the tax profile of the entire consolidated group. These reports would most likely support the consolidated tax footnote of the entire affiliated group, which is presented in the tax footnote section of the financial statements.

FIGS. 9A-9K are examples of a sample sub-consolidation with the same reports that were generated at the unit and consolidated level. These reports provide a detailed analysis of specific groupings of units, which simulate potential business combinations, such as mergers and spin-offs. These sub-consolidated reports could also simulate combinations of units which are done for management reporting, such as lines of business or geographic regions.

FIGS. 10A and 10B are examples of state reports that illustrate the detailed analysis of a specific state within a specific unit. The state reports are prepared in sufficient detail so that an actual state tax return can be simulated.

At the Review/Input Screen for a selected unit, entering an amount in "Other Comprehensive Income" will appear as an adjustment to the deferred provision, but will not affect the ending deferred balance.

Figure 11:
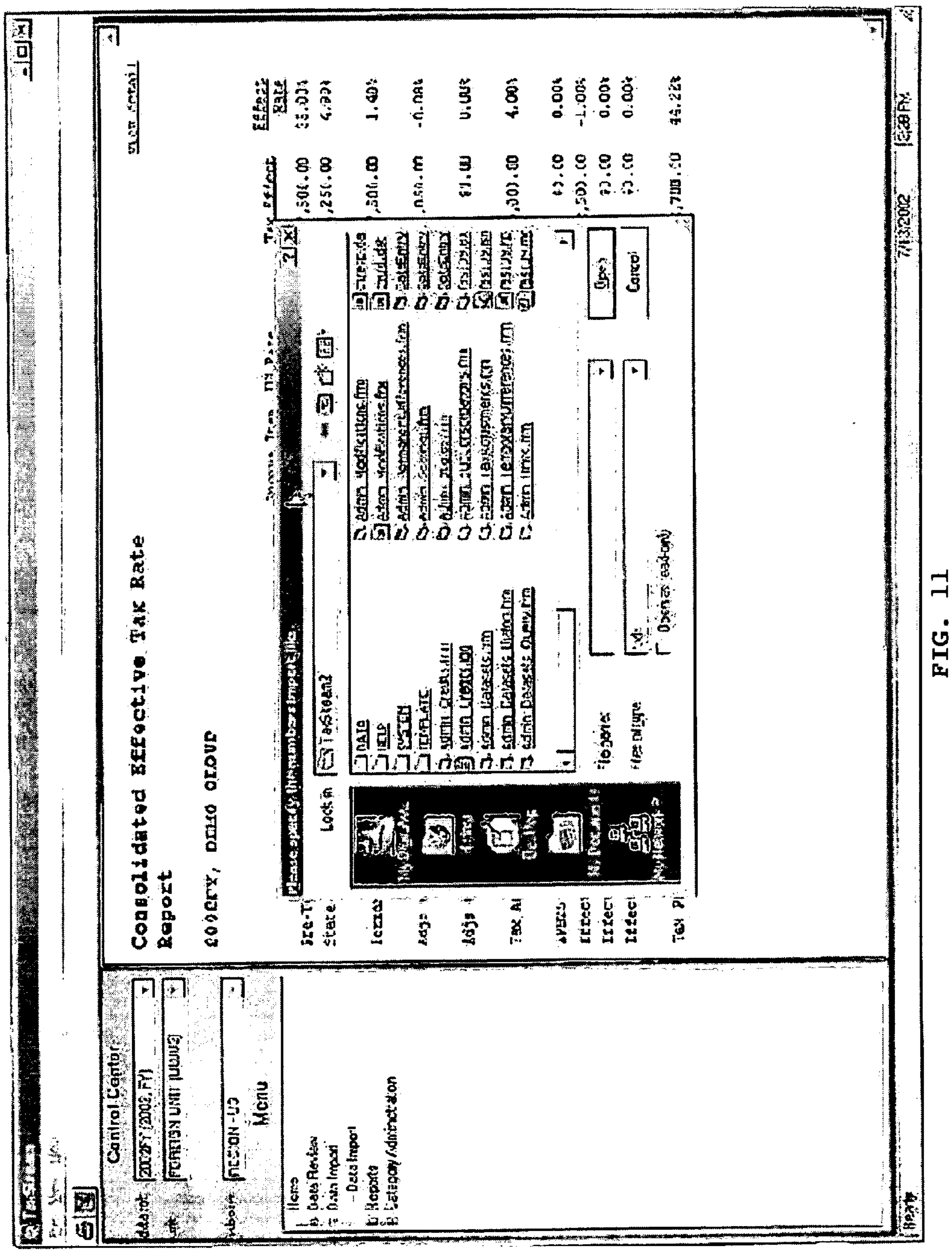
FIG. 11 is a screen print of a computer monitor display of the present invention and illustrates a preferred interface for importing number information.

Reports in the system can be viewed as print reports, Microsoft EXCEL spreadsheet files or XML screens. The print icon in the upper left hand corner controls standard print features. The EXCEL icon in the upper left hand corner converts each report in the working area of the screen into an Excel file that is stored in a location determined by the user. In this regard, see FIG. 11A.

The reports viewed in the working area of the monitor screen are XML screens viewed through a browser. This enables the user to place the reports on a website without further changes to the system configuration.

Figure 12A:
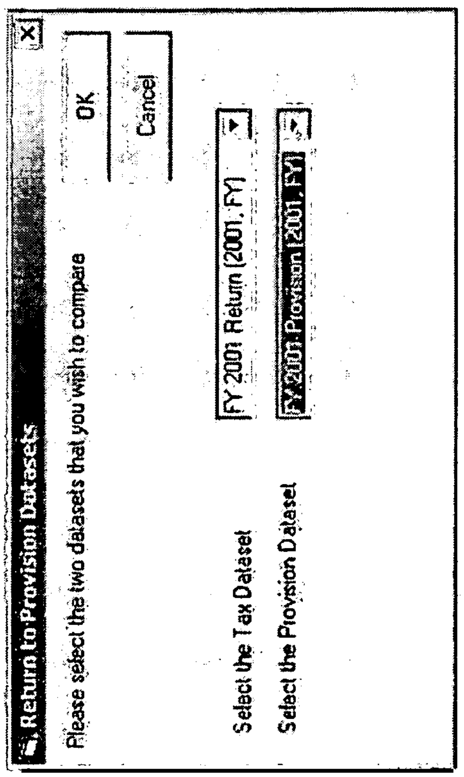

FIGS. 12A-12C illustrate a screen for selecting tax return to tax provision datasets (FIG. 12A) and sample reports of tax return to tax provision comparisons (FIGS. 12B and 12C.)

FIG. 12A illustrates a screen for selecting a tax return dataset and for selecting a tax provision dataset for comparison.

FIG. 12B illustrates a report comparing selected tax return information and selected tax provision information and setting forth the differences between the two for a business.

FIG. 12C illustrates a report comparing, for several business units, selected tax return information and selected tax provision information and setting forth the differences between the two for each business unit.

The features of the invention illustrated and described herein is the preferred embodiment. Therefore, it is understood that the appended claims are intended to cover unforeseeable embodiments with insubstantial differences that are within the spirit of the claims.

What is claimed is:

1. An information processing system for use by a plurality of users associated with a multi jurisdictional entity for managing said entity's data in a data storage for determining tax returns information and tax provision information and for tax planning purposes, based on data originating from at least one jurisdiction, the system comprising:
- a. means for collecting said data from each jurisdiction of said multi jurisdictional entity;
- b. means for calculating:
  - i. the tax returns information of said entity, in accordance with a jurisdiction's governmental tax authority, from said data stored in a data storage; and
  - ii. the tax provision information of said entity, in accordance with a pre-determined, non-governmental, accounting standard, from said data stored in the data storage;
- c. means for reconciling said tax provision information with said tax returns information;
- d. means for creating at least one dataset from said tax provision information;
- e. means for manipulating said tax provision information of each of said dataset for tax planning purposes; and
- f. means for reporting said tax returns information and said tax provision information.

2. The information processing system of claim 1 wherein said creating means creates first and second datasets from said tax provision information wherein said first dataset contains information different from said second dataset.

3. The information processing system of claim 1 wherein said creating means creates first and second datasets from said tax provision information and wherein said second dataset contains the same, plus additional, information as said first dataset.

4. The information processing system of claim 1 wherein said creating means creates a plurality of datasets from said tax provision information wherein each of said dataset covers a different time period.

5. The information processing system of claim 1 further comprising means for adjusting said data after manipulation of said tax provision information.

6. The information processing system of claim 5 further comprising means for automatically tracking adjustments made to said data.

7. The information processing system of claim 6 wherein said tracking means comprising means for recording manipulation of said tax provision information of each of said dataset.

8. The information processing system of claim 1 further comprising means for accessing the data storage by said plurality of users.

9. The information processing system of claim 1 wherein said calculating means calculates tax returns information for more than one jurisdiction's governmental tax authority.

10. The information processing system of claim 1 wherein said manipulating means manipulates different datasets of tax provision information for planning purposes.

11. The information processing system of claim 1 wherein said data includes more than one year of data.

12. An information processing system for use by a plurality of users associated with a multi jurisdictional entity for managing said entity's tax information for determining tax returns information and tax provision information, based on tax information data originating from at least one jurisdiction, the system comprising:
- a. means for collecting said data from each jurisdiction of said multi jurisdictional entity;
- b. means for storing said data;
- c. means for calculating:
  - i. the tax returns information of said entity, in accordance with a jurisdiction's governmental tax authority, from said data stored in said storing means; and
  - ii. the tax provision information of said entity, in accordance with a pre-determined, non-governmental, accounting standard, from said data stored in said storing means;
- d. means for reconciling said tax provision information with said tax returns information; and
- e. means for reporting said tax returns information and said tax provision information.

13. An information processing system for use by a plurality of users associated with a multi jurisdictional entity for managing said entity's tax information for tax planning purposes, based on data originating from at least one jurisdiction, the system comprising:
- a. means for collecting said data from each jurisdiction of said multi jurisdictional entity;
- b. means for storing said data;

c. means for calculating the tax provision information of said entity, in accordance with a pre-determined, non-governmental, accounting standard, from said data stored in said storing means;

d. means for creating at least one dataset from said tax provision information; and e. means for manipulating said tax provision information of each of said dataset for tax planning purposes.

14. A multi-user information processing method for a multi-jurisdictional entity for managing said entity's data for determining tax returns information and tax provision information and for tax planning purposes, based on data originating from at least one jurisdiction, comprising the steps of:

a. collecting said data from each jurisdiction of said multi jurisdictional entity with an import engine;

b. storing said data in a data storage;

c. calculating said tax returns information of said entity, in accordance with a jurisdiction's governmental tax authority, from said data stored in the data storage with a calculation engine;

d. calculating said tax provision information of said entity, in accordance with a pre-determined, non-governmental, accounting standard, from said data stored in the data storage with said calculation engine;

e. creating at least one dataset from said tax provision information with a user interface unit;

f. manipulating said tax provision information of each of said dataset for tax planning purposes with said user interface unit; and g. producing reports in connection with said tax returns information and said tax provision information with a report engine for reconciliation of said tax provision information with said tax returns information.

15. The information processing method of claim 14 further comprising the step of:

h. adjusting said data after manipulation of said tax provision information with said user interface.

16. The information processing method of claim 15 further comprising the step of:

i. automatically tracking said adjustments made to said data with a tracking engine.

17. The information processing method of claim 14 further comprising the step of:

j. automatically recording said manipulation of said tax provision information of each of said dataset with a tracking engine.

18. The information processing method of claim 14 further comprising the step of:

k. accessing the data storage with said user interface unit.

19. An information processing system for use with a data storage by a plurality of users associated with a multi jurisdictional entity for managing said entity's tax information for determining tax returns information and tax provision information, based on tax information data originating from at least one jurisdiction, the system comprising:

a. means for collecting said data from each jurisdiction of said multi jurisdictional entity;

b. means for calculating:

i. the tax returns information of said entity, in accordance with a jurisdiction's governmental tax authority, from said data stored in a data storage; and ii. the tax provision information of said entity, in accordance with a pre-determined, non-governmental, accounting standard, from said data stored the data storage;

c. means for reconciling said tax provision information with said tax returns information; and d. means for reporting said tax returns information and said tax provision information.

20. An information processing system for use with a data storage by a plurality of users associated with a multi jurisdictional entity for managing said entity's tax information for tax planning purposes, based on data originating from at least one jurisdiction, the system comprising:

a. means for collecting said data from each jurisdiction of said multi jurisdictional entity;

b. means for calculating the tax provision information of said entity, in accordance with a pre-determined, non-governmental, accounting standard, from said data stored in a data storage;

c. means for creating at least one dataset from said tax provision information; and d. means for manipulating said tax provision information of each of said dataset for tax planning purposes.

21. An information processing system for use by a plurality of users associated with a multi jurisdictional entity for managing said entity's data in a data storage for determining tax returns information and tax provision information and for tax planning purposes, based on data originating from at least one jurisdiction, the system comprising:

a. an import engine for collecting said data from each jurisdiction of said multi-jurisdictional entity;

b. a calculation engine for:

i. calculating the tax returns information of said entity, in accordance with a jurisdiction's governmental tax authority from said data stored in the data storage, ii. calculating the tax provision information of said entity, in accordance with a pre-determined, non-governmental, accounting standard, from said data stored in the data storage;

iii. reconciling said tax provision information with said tax returns information;

iv. creating at least one dataset from said tax provision information; and v. manipulating said tax provision information of each of said dataset for tax planning purposes; and c. a reporting engine for reporting said tax returns information and said tax provision information.

22. An information processing system for use by a plurality of users associated with a multi jurisdictional entity for managing said entity's tax provision based on data originating from at least one jurisdiction, the system comprises a. means for collecting said data from each jurisdiction of said multi jurisdictional entity;

b. a source database for storing said data for determining the tax provision of said multi-jurisdictional entity, wherein said tax provision comprising current and deferred tax provision, which are estimated tax expenses that may be later adjusted based on required changes to the entity's filed tax return, for its tax return to be filed for the current year, and that are certain to come due in the future, respectively;

c. means for calculating the tax provision of said multi jurisdictional entity in accordance to a predetermined, non-governmental, accounting standard from said data stored in said source database;

d. a transformed database for storing the tax provision of said multi jurisdictional entity as determined by said calculating means; and e. a reporting engine for producing reports for the entity's financial statement to be filed with and as required by a regulatory authority using the tax provision from said transformed database;

f. means for accessing said source database and said transformed database by said plurality of users;

g. means for testing different scenarios of said tax provision for tax planning purposes by changing said tax provision stored in said transformed database;

h. means for automatically tracking the changes made to said tax provision stored in said transformed database for reconciliation of said tax provision to the filed tax return; and i. means for automatically tracking the origination of said tax provision to support the financial statement to be filed with the regulatory authority.

23. An information processing system for use by a plurality of users associated with a multi jurisdictional entity for managing said entity's tax provision based on data originating from at least one jurisdiction, the system comprises:

a. means for collecting said data from each jurisdiction of said multi jurisdictional entity;

b. means for transforming said data into transformed data;

c. a source database for storing said transformed data for determining the tax provision of said multi jurisdictional entity, wherein said tax provision comprising current and deferred tax provision, which are estimated tax expenses that may be later adjusted based on required changes to the entity's filed tax return, for its tax return to be filed for the current year, and that are certain to come due in the future, respectively;

d. means for calculating the tax provision of said multi jurisdictional entity in accordance to a predetermined, non-governmental, accounting standard from said transformed data stored in said source database;

e. a transformed database for storing the tax provision of said multi jurisdictional entity as determined by said calculating means;

f. a reporting engine for producing reports for the entity's financial statement to be filed with and as required by a regulatory authority using the tax provision from said transformed database;

g. means for accessing said source database and said transformed database by said plurality of users;

h. means for testing different scenarios of said tax provision for tax planning purposes by changing said tax provision stored in said transformed database;

i. means for automatically tracking the changes made to said tax provision stored in said transformed database for reconciliation of said tax provision to the filed tax return; and j. means for automatically tracking the origination of said tax provision to support the financial statement to be filed with the regulatory authority.

24. An information processing system for use by a plurality of users associated with a multi jurisdictional entity for managing said entity's current tax provision based on data originating from at least one jurisdiction, the system comprises:

a. means for collecting said data from each jurisdiction of said multi jurisdictional entity;

b. a source database for storing said data for determining the current tax provision of said multi jurisdictional entity, wherein said current tax provision being an estimated tax expense that may be later adjusted based on required changes to its filed tax return, for its tax return to be filed for the current year;

c. means for calculating the current tax provision of said multi jurisdictional entity in accordance to a predetermined, non-governmental, accounting standard from said data stored in said source database;

d. a transformed database for storing the current tax provision of said multi jurisdictional entity as determined by said calculating means;

e. a reporting engine for producing reports for the entity's financial statement to be filed with and as required by a regulatory authority using the current tax provision from said transformed database;

f. means for accessing said source database and said transformed database by said plurality of users;

g. means for testing different scenarios of said current tax provision for tax planning purposes by changing said current tax provision stored in said transformed database;

h. means for automatically tracking the changes made to said current tax provision stored in said transformed database for reconciliation of said current tax provision to the filed tax return; and i. means for automatically tracking the origination of said current tax provision to support the financial statement to be filed with the regulatory authority.

25. An information processing system for use by a plurality of users associated with a multi jurisdictional entity for managing said entity's deferred tax provision based on data originating from at least one jurisdiction, the system comprises:

a. means for collecting said data from each jurisdiction of said multi jurisdictional entity;

b. a source database for storing said data for determining the deferred tax provision of said multi jurisdictional entity, wherein said deferred tax provision being an estimated tax expenses that are certain to come due in the future;

c. means for calculating the deferred tax provision of said multi jurisdictional entity in accordance to a predetermined, non-governmental, accounting standard from said data stored in said source database;

d. a transformed database for storing the deferred tax provision of said multi-jurisdictional entity as determined by said calculating means;

e. a reporting engine for producing reports for the entity's financial statement to be filed with and as required by a regulatory authority using the deferred tax provision from said transformed database;

f. means for accessing said source database and said transformed database by said plurality of users;

g. means for testing different scenarios of said deferred tax provision for tax planning purposes by changing said deferred tax provision stored in said transformed database;

h. means for automatically tracking the changes made to said deferred tax provision stored in said transformed database for reconciliation of said deferred tax provision to the filed tax return; and i. means for automatically tracking the origination of said deferred tax provision to support the financial statement to be filed with the regulatory authority.

* * * * *